United States Patent [19]
Allen et al.

[11] Patent Number: 6,111,696
[45] Date of Patent: Aug. 29, 2000

[54] BRIGHTNESS ENHANCEMENT FILM

[75] Inventors: Richard C. Allen, Mendota Heights; Lockwood W. Carlson, Stillwater; Andrew J. Ouderkirk, Woodbury; Michael F. Weber, Shoreview; Arthur L. Kotz, White Bear Lake; Timothy J. Nevitt, Red Wing; Carl A. Stover, St. Paul, all of Minn.; Biswaroop Majumdar, Delmar, N.Y.

[73] Assignee: 3M Innovative Properties Company, St. Paul, Minn.

[21] Appl. No.: 08/807,262

[22] Filed: Feb. 28, 1997

Related U.S. Application Data

[63] Continuation-in-part of application No. 08/610,092, Feb. 29, 1996, Pat. No. 5,825,543.

[51] Int. Cl.$^7$ ........................................................ G02B 5/30
[52] U.S. Cl. .......................... 359/495; 359/494; 359/500; 349/96
[58] Field of Search .................................. 359/494, 495, 359/500; 349/5, 96

[56] References Cited

U.S. PATENT DOCUMENTS

| Re. 34,605 | 5/1994 | Schrenk et al. . |
| 2,604,817 | 7/1952 | Schupp, Jr. . |
| 2,803,552 | 8/1957 | Stedman . |

(List continued on next page.)

FOREIGN PATENT DOCUMENTS

| 0 469 732 A3 | 2/1992 | European Pat. Off. . |
| 0 488 544 A1 | 6/1992 | European Pat. Off. . |
| 0 506 176 A1 | 9/1992 | European Pat. Off. . |
| 0 514 223 A1 | 11/1992 | European Pat. Off. . |
| 591 055 A2 | 4/1994 | European Pat. Off. . |
| 592 284 A2 | 4/1994 | European Pat. Off. . |
| 0 597 261 A1 | 5/1994 | European Pat. Off. . |

(List continued on next page.)

OTHER PUBLICATIONS

2244 Research Disclosure (1993), Jul., No. 351, Emsworth, GB, "Polarizer", pp. 452–453.

*Lighting Futures*, vol. 1, No. 3 (1995), a publication of the Lighting Research Center, Rensselaer Polytechnic Institute, Troy, N.Y.

Schrenk et al., Nanolayer polymeric optical films, Tappi Journal, pp. 169–174, Jun., 1992.

Land, E. H., "Some Aspects of the Development of Sheet Polarizers", ©1951 Optical Society of America, Reprinted from *Journal of the Optical Society of America*, vol. 41(12), 957–963, Dec. 1951, pp. 45–51.

Alfrey et al., "Physical Optics of Iridescent Multilayered Plastic Films", *Polymer Engineering and Science*, Nov. 1969, vol. 9, No. 6, pp. 400–404.

Radford et al., Reflectivity of Iridescent Coextruded Multi-layered Plastic Films, *Polymer Engineering and Science*, May 1973, vol. 13, No. 3, pp. 216–221.

Kirk–Othmer Encyclopedia of Chemical Technology, 4$^{th}$ Ed., Deuterium and Tritium to Elastomers, Polyethers, "Dyes, Anthraquinone", John Wiley & Sons, 1993, pp. 652–661.

(List continued on next page.)

*Primary Examiner*—Darren E. Schuberg
*Attorney, Agent, or Firm*—John A. Fortkort

[57] ABSTRACT

An optical film is provided which comprises a disperse phase of polymeric particles disposed within a continuous birefringent matrix in combination with light directing materials to enable control of light emitted from a lighting fixture or display. The film is oriented, typically by stretching, in one or more directions. The size and shape of the disperse phase particles, the volume fraction of the disperse phase, the film thickness, and the amount of orientation are chosen to attain a desired degree of diffuse reflection and total transmission of electromagnetic radiation of a desired wavelength in the resulting film, and the light directing materials are chosen to control the direction of polarized light reflected from or transmitted by the optical film.

56 Claims, 17 Drawing Sheets

U.S. PATENT DOCUMENTS

| | | | |
|---|---|---|---|
| 3,022,178 | 2/1962 | Park et al. . | |
| 3,075,228 | 1/1963 | Ellias . | |
| 3,124,639 | 3/1964 | Kahn . | |
| 3,212,909 | 10/1965 | Leigh . | |
| 3,213,753 | 10/1965 | Rogers . | |
| 3,438,691 | 4/1969 | Makas . | |
| 3,480,502 | 11/1969 | Schrenk . | |
| 3,565,985 | 2/1971 | Schrenk et al. . | |
| 3,585,255 | 6/1971 | Sevenich . | |
| 3,610,729 | 10/1971 | Rogers . | |
| 3,711,176 | 1/1973 | Alfrey, Jr. et al. . | |
| 3,759,647 | 9/1973 | Schrenk et al. . | |
| 3,772,128 | 11/1973 | Kahn et al. . | |
| 3,819,522 | 6/1974 | Zmoda et al. . | |
| 3,847,585 | 11/1974 | Chisholm . | |
| 3,860,036 | 1/1975 | Newman, Jr. | 138/45 |
| 3,897,356 | 7/1975 | Pociluyko . | |
| 4,025,688 | 5/1977 | Nagy et al. . | |
| 4,249,011 | 2/1981 | Wendling . | |
| 4,268,127 | 5/1981 | Oshima et al. . | |
| 4,281,084 | 7/1981 | Fellmann et al. . | |
| 4,310,584 | 1/1982 | Cooper et al. . | |
| 4,446,305 | 5/1984 | Rogers et al. . | |
| 4,478,909 | 10/1984 | Taniguchi et al. . | |
| 4,520,189 | 5/1985 | Rogers et al. | 528/331 |
| 4,521,588 | 6/1985 | Rogers et al. | 528/363 |
| 4,525,413 | 6/1985 | Rogers et al. . | |
| 4,680,353 | 7/1987 | Ishihara et al. . | |
| 4,688,900 | 8/1987 | Doane et al. . | |
| 4,717,225 | 1/1988 | Feth et al. . | |
| 4,720,426 | 1/1988 | Englert et al. | 428/344 |
| 4,796,160 | 1/1989 | Kahn . | |
| 4,871,784 | 10/1989 | Otonari et al. . | |
| 5,077,121 | 12/1991 | Harrison et al. . | |
| 5,088,807 | 2/1992 | Waters et al. . | |
| 5,094,788 | 3/1992 | Schrenk et al. . | |
| 5,094,793 | 3/1992 | Schrenk et al. . | |
| 5,103,337 | 4/1992 | Schrenk et al. . | |
| 5,122,905 | 6/1992 | Wheatley et al. . | |
| 5,122,906 | 6/1992 | Wheatley . | |
| 5,126,880 | 6/1992 | Wheatley et al. . | |
| 5,138,474 | 8/1992 | Arakawa . | |
| 5,149,578 | 9/1992 | Wheatley et al. . | |
| 5,157,526 | 10/1992 | Kondo et al. . | |
| 5,166,817 | 11/1992 | Ota et al. . | |
| 5,175,030 | 12/1992 | Lu et al. . | |
| 5,184,881 | 2/1993 | Karpen . | |
| 5,188,760 | 2/1993 | Hikmet et al. | 252/299.01 |
| 5,202,938 | 4/1993 | Man et al. . | |
| 5,211,878 | 5/1993 | Reiffenrath et al. | 252/299.63 |
| 5,217,794 | 6/1993 | Schrenk . | |
| 5,221,982 | 6/1993 | Faris . | |
| 5,222,795 | 6/1993 | Hed . | |
| 5,233,465 | 8/1993 | Wheatley et al. . | |
| 5,235,443 | 8/1993 | Barnik et al. | 359/37 |
| 5,238,738 | 8/1993 | Miller . | |
| 5,245,456 | 9/1993 | Yoshimi et al. . | |
| 5,262,894 | 11/1993 | Wheatley et al. . | |
| 5,268,225 | 12/1993 | Isayev . | |
| 5,269,995 | 12/1993 | Ramanathan et al. . | |
| 5,278,694 | 1/1994 | Wheatley et al. . | |
| 5,294,657 | 3/1994 | Melendy et al. | 524/270 |
| 5,301,046 | 4/1994 | Konuma et al. . | |
| 5,316,703 | 5/1994 | Schrenk | 264/1.3 |
| 5,319,478 | 6/1994 | Fijnfschilling et al. | 359/53 |
| 5,337,174 | 8/1994 | Wada et al. . | |
| 5,359,498 | 10/1994 | Karpen . | |
| 5,389,324 | 2/1995 | Lewis et al. | 264/171 |
| 5,394,255 | 2/1995 | Yokota et al. . | |
| 5,422,756 | 6/1995 | Weber . | |
| 5,448,404 | 9/1995 | Schrenk et al. | 359/584 |
| 5,486,935 | 1/1996 | Kalmanash | 359/37 |
| 5,486,949 | 1/1996 | Schrenk et al. | 359/498 |
| 5,552,907 | 9/1996 | Yokota et al. . | |
| 5,576,697 | 11/1996 | Nagashima et al. . | |
| 5,587,816 | 12/1996 | Gunjima et al. | 349/62 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |

FOREIGN PATENT DOCUMENTS

| | | |
|---|---|---|
| 0 627 638 A1 | 12/1994 | European Pat. Off. . |
| 0 684 423 A2 | 11/1995 | European Pat. Off. . |
| 41 21 861 A1 | 1/1992 | Germany . |
| 4-141603 | 5/1992 | Japan . |
| 6-41335 | 3/1993 | Japan . |
| WO 94/29765 | 12/1994 | WIPO . |
| WO 95/17303 | 6/1995 | WIPO . |
| WO 95/17691 | 6/1995 | WIPO . |
| WO 95/17692 | 6/1995 | WIPO . |
| WO 95/17699 | 6/1995 | WIPO . |
| WO 95/27919 | 10/1995 | WIPO . |
| WO 96/18691 | 6/1996 | WIPO . |
| WO 96/19347 | 6/1996 | WIPO . |
| WO 96/31794 | 10/1996 | WIPO . |
| WO 97/01440 | 1/1997 | WIPO . |
| WO 97/01774 | 1/1997 | WIPO . |
| WO 97/32226 | 9/1997 | WIPO . |

OTHER PUBLICATIONS

Hodgkinson et al., "Effective Principal Refractive Indices and Column Angles for Periodic Stacks of Thin Birefringent Films", *J. Opt. Soc. Am. A.*, vol. 10, No. 9, Sep. 1993, pp. 2065–2071.

Aphonin, O. A., "Optical Properties of Stretched Polymer Dispersed Liquid Crystal Films: Angle–Dependent Polarized Light Scattering", *Liquid Crystals*, vol. 19, No. 4, 1995, pp. 469–480.

A. Leclair and B.D. Favis, "The role of interfacial contact in immiscible binary polymer blends and its influence on mechanical properties", *Polymer*, vol. 37, No. 21, 4723–4728, 1996 (polycarbonate/polyethylene blends).

D. Bourry and B.D. Favis, "Co–Continuity and Phase Inversion in HDPE/PS Blends: The Role of Interfacial Modification", *1995 Annual Technical Conference of the Society of Plastics Engineers ANTEC*, vol. 53, No. 2, 2001–2009.

D. Klempner and L. Berkowski, "Interpenetrating Polymer Networks", *Encyclopedia of Polymer Science and Engineering*, vol. 8, 278–341.

H. Y. Tsai and K. Min, "Reactive Blends of Functionalized Polystyrene and Polyethylene Terephthalate", *1995 Annual Technical Conference of the Society of Plastics Engineers ANTEC*, vol. 53, No. 2, 1858–1865.

J. Stover, "Optical Scattering Measurement and Analysis" (1990), pp. 14–17.

L.H. Sperling, "Microphase Structure", *Encyclopedia of Polymer Science and Engineering*, 2nd Ed., vol. 9, 760–788.

L.H. Sperling and V. Mishra, "Current Status of Interpenetrating Polymer Networks", *Polymers for Advanced Technologies*, vol. 7, No. 4, 197–208, Apr. 1996.

L.H. Sperling, "Interpenetrating Polymer Networks: An Overview", *Interpenetrating Polymer Networks*, edited by D. Klempner, L.H. Sperling, and L.A. Utracki, Advances in Chemistry Series #239, 3–38, 1994).

N. Mekhilef, B.D. Favis and P.J. Carreau, "Morphological Stability of Polystyrene Polyethylene Blends", *1995 Annual Technical Conference of the Society of Plastics Engineers ANTEC*, vol. 53, No. 2, 1572–1579).

Polymer Processes, "Chemical Technology of Plastics, Resins, Rubbers, Adhesives and Fibers", vol. 10, Chap. 3, pp. 69–109 (1956)(Ed. by Calvin E. Schildknecht).

BRIGHTNESS ENHANCEMENT FILM

CROSS REFERENCE TO RELATED APPLICATION

This is a continuation-in-part application of U.S. application Ser. No. 08/610,092, filed Feb. 29, 1996 now U.S. Pat. No. 5,825,543.

FIELD OF THE INVENTION

This invention relates to optical materials which contain structures suitable for controlling optical characteristics, such as reflectance and transmission. In a further aspect, it relates to control of specific polarizations of reflected or transmitted light.

BACKGROUND

Optical films are known to the art which are constructed from inclusions dispersed within a continuous matrix. The characteristics of these inclusions can be manipulated to provide a range of reflective and transmissive properties to the film. These characteristics include inclusion size with respect to wavelength within the film, inclusion shape and alignment, inclusion volumetric fill factor and the degree of refractive index mismatch with the continuous matrix along the film's three orthogonal axes.

Conventional absorbing (dichroic) polarizers have, as their inclusion phase, inorganic rod-like chains of light-absorbing iodine which are aligned within a polymer matrix. Such a film will tend to absorb light polarized with its electric field vector aligned parallel to the rod-like iodine chains, and to transmit light polarized perpendicular to the rods. Because the iodine chains have two or more dimensions that are small compared to the wavelength of visible light, and because the number of chains per cubic wavelength of light is large, the optical properties of such a film are predominately specular, with very little diffuse transmission through the film or diffuse reflection from the film surfaces. Like most other commercially available polarizers, these polarizing films are based on polarization-selective absorption.

Films filled with inorganic inclusions with different characteristics can provide other optical transmission and reflective properties. For example, coated mica flakes with two or more dimensions that are large compared with visible wavelengths, have been incorporated into polymeric films and into paints to impart a metallic glitter. These flakes can be manipulated to lie in the plane of the film, thereby imparting a strong directional dependence to the reflective appearance. Such an effect can be used to produce security screens that are highly reflective for certain viewing angles, and transmissive for other viewing angles. Large flakes having a coloration (specularly selective reflection) that depends on alignment with respect to incident light, can be incorporated into a film to provide evidence of tampering. In this application, it is necessary that all the flakes in the film be similarly aligned with respect to each other.

However, optical films made from polymers filled with inorganic inclusions suffer from a variety of infirmities. Typically, adhesion between the inorganic particles and the polymer matrix is poor. Consequently, the optical properties of the film decline when stress or strain is applied across the matrix, both because the bond between the matrix and the inclusions is compromised, and because the rigid inorganic inclusions may be fractured. Furthermore, alignment of inorganic inclusions requires process steps and considerations that complicate manufacturing.

Other films, such as that disclosed in U.S. Pat. No. 4,688,900 (Doane et. al.), consists of a clear light-transmitting continuous polymer matrix, with droplets of light modulating liquid crystals dispersed within. Stretching of the material reportedly results in a distortion of the liquid crystal droplet from a spherical to an ellipsoidal shape, with the long axis of the ellipsoid parallel to the direction of stretch. U.S. Pat. No. 5,301,046 (Konuma et al.) make a similar disclosure, but achieve the distortion of the liquid crystal droplet through the application of pressure. A. Aphonin, "Optical Properties of Stretched Polymer Dispersed Liquid Crystal Films: Angle-Dependent Polarized Light Scattering, *Liquid Crystals,* Vol. 19, No. 4, 469–480 (1995), discusses the optical properties of stretched films consisting of liquid crystal droplets disposed within a polymer matrix. He reports that the elongation of the droplets into an ellipsoidal shape, with their long axes parallel to the stretch direction, imparts an oriented birefringence (refractive index difference among the dimensional axes of the droplet) to the droplets, resulting in a relative refractive index mismatch between the dispersed and continuous phases along certain film axes, and a relative index match along the other film axes. Such liquid crystal droplets are not small as compared to visible wavelengths in the film, and thus the optical properties of such films have a substantial diffuse component to their reflective and transmissive properties. Aphonin suggests the use of these materials as a polarizing diffuser for backlit twisted nematic LCDs. However, optical films employing liquid crystals as the disperse phase are substantially limited in the degree of refractive index mismatch between the matrix phase and the dispersed phase. Furthermore, the birefringence of the liquid crystal component of such films is typically sensitive to temperature.

U.S. Pat. No. 5,268,225 (Isayev) discloses a composite laminate made from thermotropic liquid crystal polymer blends. The blend consists of two liquid crystal polymers which are immiscible with each other. The blends may be cast into a film consisting of a dispersed inclusion phase and a continuous phase. When the film is stretched, the dispersed phase forms a series of fibers whose axes are aligned in the direction of stretch. While the film is described as having improved mechanical properties, no mention is made of the optical properties of the film. However, due to their liquid crystal nature, films of this type would suffer from the infirmities of other liquid crystal materials discussed above.

Still other films have been made to exhibit desirable optical properties through the application of electric or magnetic fields. For example, U.S. Pat. No. 5,088,807 (Waters et al.) describes a liquid crystal device which consists of a layer of fibers permeated with liquid crystal material and disposed between two electrodes. A voltage across the electrodes produces an electric field which changes the birefringent properties of the liquid crystal material, resulting in various degrees of mismatch between the refractive indices of the fibers and the liquid crystal. However, the requirement of an electric or magnetic field is inconvenient and undesirable in many applications, particularly those where existing fields might produce interference.

Other optical films have been made by incorporating a dispersion of inclusions of a first polymer into a second polymer, and then stretching the resulting composite in one or two directions. U.S. Pat. No. 4,871,784 (Otonari et al.) is exemplative of this technology. The polymers are selected such that there is low adhesion between the dispersed phase and the surrounding matrix polymer, so that an elliptical void is formed around each inclusion when the film is stretched. Such voids have dimensions of the order of visible wavelengths. The refractive index mismatch between the void and the polymer in these "microvoided" films is typically quite large (about 0.5), causing substantial diffuse reflection. However, the optical properties of microvoided materials are difficult to control because of variations of the geometry of the interfaces, and it is not possible to produce a film axis for which refractive indices are relatively matched, as would be useful for polarization-sensitive optical properties. Furthermore, the voids in such material can be easily collapsed through exposure to heat and pressure.

Optical films have also been made wherein a dispersed phase is deterministically arranged in an ordered pattern within a continuous matrix. U.S. Pat. No. 5,217,794 (Schrenk) is exemplative of this technology. There, a lamellar polymeric film is disclosed which is made of polymeric inclusions which are large compared with wavelength on two axes, disposed within a continuous matrix of another polymeric material. The refractive index of the dispersed phase differs significantly from that of the continuous phase along one or more of the laminate's axes, and is relatively well matched along another. Because of the ordering of the dispersed phase, films of this type exhibit strong iridescence (i.e., interference-based angle dependent coloring) for instances in which they are substantially reflective. As a result, such films have seen limited use for optical applications where optical diffusion is desirable.

There thus remains a need in the art for an optical material consisting of a continuous and a dispersed phase, wherein the refractive index mismatch between the two phases along the material's three dimensional axes can be conveniently and permanently manipulated to achieve desirable degrees of diffuse and specular reflection and transmission, wherein the optical material is stable with respect to stress, strain, temperature differences, and electric and magnetic fields, and wherein the optical material has an insignificant level of iridescence. These and other needs are met by the present invention, as hereinafter disclosed.

SUMMARY OF THE INVENTION

Figure 1:
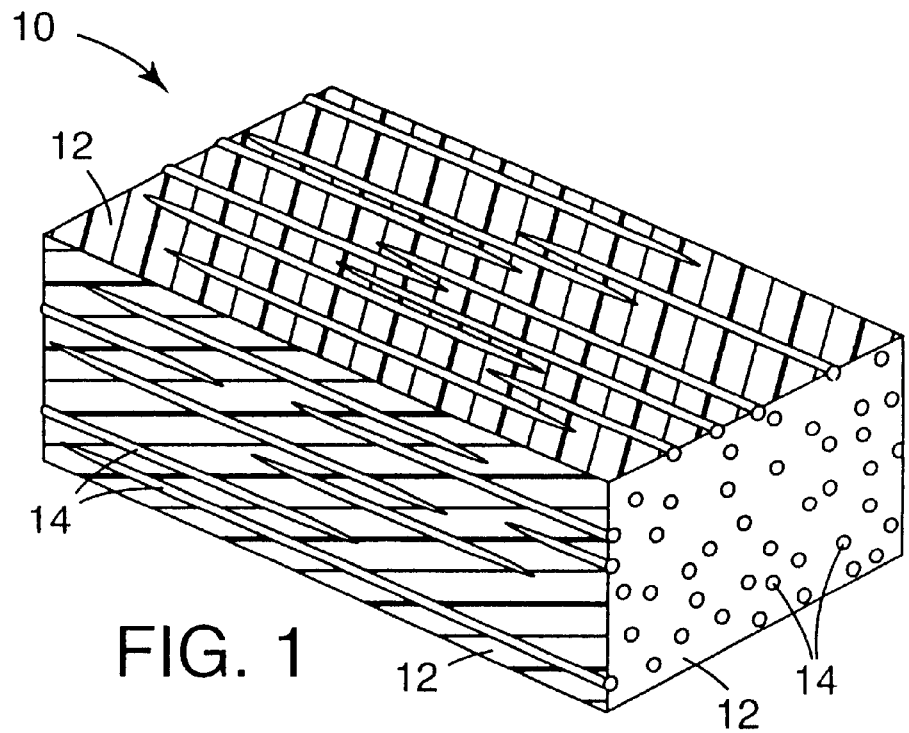
FIG. 1 is a schematic drawing illustrating an optical body made in accordance with the present invention, wherein the disperse phase is arranged as a series of elongated masses having an essentially circular cross-section.

In one aspect, the present invention relates to a diffusely reflective film or other optical body comprising a birefringent continuous polymeric phase and a substantially nonbirefringent disperse phase disposed within the continuous phase. The indices of refraction of the continuous and disperse phases are substantially mismatched (i.e., differ from one another by more than about 0.05) along a first of three mutually orthogonal axes, and are substantially matched (i.e., differ by less than about 0.05) along a second of three mutually orthogonal axes. In some embodiments, the indices of refraction of the continuous and disperse phases can be substantially matched or mismatched along, or parallel to, a third of three mutually orthogonal axes to produce a mirror or a polarizer. Incident light polarized along, or parallel to, a mismatched axis is scattered, resulting in significant diffuse reflection. Incident light polarized along a matched axis is scattered to a much lesser degree and is significantly spectrally transmitted. These properties can be used to make optical films for a variety of uses, including low loss (significantly nonabsorbing) reflective polarizers for which polarizations of light that are not significantly transmitted are diffusely reflected.

In a related aspect, the present invention relates to an optical film or other optical body comprising a birefringent continuous phase and a disperse phase, wherein the indices of refraction of the continuous and disperse phases are substantially matched (i.e., wherein the index difference between the continuous and disperse phases is less than about 0.05) along an axis perpendicular to a surface of the optical body.

In another aspect, the present invention relates to a composite optical body comprising a polymeric continuous birefringent first phase in which the disperse second phase may be birefringent, but in which the degree of match and mismatch in at least two orthogonal directions is primarily due to the birefringence of the first phase.

In still another aspect, the present invention relates to a method for obtaining a diffuse reflective polarizer, comprising the steps of: providing a first resin, whose degree of birefringence can be altered by application of a force field, as through dimensional orientation or an applied electric field, such that the resulting resin material has, for at least two orthogonal directions, an index of refraction difference of more than about 0.05; providing a second resin, dispersed within the first resin; and applying said force field to the composite of both resins such that the indices of the two resins are approximately matched to within less than about 0.05 in one of two directions, and the index difference between first and second resins in the other of two directions is greater than about 0.05. In a related embodiment, the second resin is dispersed in the first resin after imposition of the force field and subsequent alteration of the birefringence of the first resin.

In yet another aspect, the present invention relates to an optical body acting as a reflective polarizer with a high extinction ratio. In this aspect, the index difference in the match direction is chosen as small as possible and the difference in the mismatch direction is maximized. The volume fraction, thickness, and disperse phase particle size and shape can be chosen to maximize the extinction ratio, although the relative importance of optical transmission and reflection for the different polarizations may vary for different applications.

In another aspect, the present invention relates to an optical body comprising a continuous phase, a disperse phase whose index of refraction differs from said continuous phase by greater than about 0.05 along a first axis and by less than about 0.05 along a second axis orthogonal to said first axis, and a dichroic dye. The optical body is preferably oriented along at least one axis. The dichroic dye improves the extinction coefficient of the optical body by absorbing, in addition to scattering, light polarized parallel to the axis of orientation.

In another aspect of the present invention, an optical body is provided which has at least first and second phases that are co-continuous along at least one axis. The index of refraction of the first phase differs from that of the second phase by greater than about 0.05 along a first axis and by less than about 0.05 along a second axis orthogonal to said first axis. In other embodiments, three or more co-continuous phases may be used to achieve the same or similar matches and mismatches along mutually perpendicular axes.

In still another aspect of the present invention, an optical body is provided which comprises a film having a continuous and disperse phase, with an antireflective layer disposed thereon. Such films exhibit a flat transmission curve as a function of the wavelength of light, which tends to minimize any changes in color to a resultant display device into which the reflective polarizer is incorporated.

In the various aspects of the present invention, the reflection and transmission properties for at least two orthogonal polarizations of incident light are determined by the selection or manipulation of various parameters, including the optical indices of the continuous and disperse phases, the size and shape of the disperse phase particles, the volume fraction of the disperse phase, the thickness of the optical body through which some fraction of the incident light is to pass, and the wavelength or wavelength band of electromagnetic radiation of interest.

The magnitude of the index match or mismatch along a particular axis will directly affect the degree of scattering of light polarized along that axis. In general, scattering power varies as the square of the index mismatch. Thus, the larger the index mismatch along a particular axis, the stronger the scattering of light polarized along that axis. Conversely, when the mismatch along a particular axis is small, light polarized along that axis is scattered to a lesser extent and is thereby transmitted specularly through the volume of the body.

The size of the disperse phase also can have a significant effect on scattering. If the disperse phase particles are too small (i.e., less than about 1/30 the wavelength of light in the medium of interest) and if there are many particles per cubic wavelength, the optical body behaves as a medium with an effective index of refraction somewhat between the indices of the two phases along any given axis. In such a case, very little light is scattered. If the particles are too large, the light is specularly reflected from the particle surface, with very little diffusion into other directions. When the particles are too large in at least two orthogonal directions, undesirable iridescence effects can also occur. Practical limits may also be reached when particles become large in that the thickness of the optical body becomes greater and desirable mechanical properties are compromised.

The shape of the particles of the disperse phase can also have an effect on the scattering of light. The depolarization factors of the particles for the electric field in the index of refraction match and mismatch directions can reduce or enhance the amount of scattering in a given direction. The effect can either add or detract from the amount of scattering from the index mismatch, but generally has a small influence on scattering in the preferred range of properties in the present invention.

The shape of the particles can also influence the degree of diffusion of light scattered from the particles. This shape effect is generally small but increases as the aspect ratio of the geometrical cross-section of the particle in the plane perpendicular to the direction of incidence of the light increases and as the particles get relatively larger. In general, in the operation of this invention, the disperse phase particles should be sized less than several wavelengths of light in one or two mutually orthogonal dimensions if diffuse, rather than specular, reflection is preferred.

Dimensional alignment is also found to have an effect on the scattering behavior of the disperse phase. In particular, it has been observed, in optical bodies made in accordance with the present invention, that aligned scatterers will not scatter light symmetrically about the directions of specular transmission or reflection as randomly aligned scatterers would. In particular, inclusions that have been elongated by orientation to resemble rods scatter light primarily along (or near) a cone centered on the orientation direction and having an edge along the specularly transmitted direction. For example, for light incident on such an elongated rod in a direction perpendicular to the orientation direction, the scattered light appears as a band of light in the plane perpendicular to the orientation direction with an intensity that decreases with increasing angle away from the specular directions. By tailoring the geometry of the inclusions, some control over the distribution of scattered light can be achieved both in the transmissive hemisphere and in the reflective hemisphere.

The volume fraction of the disperse phase also affects the scattering of light in the optical bodies of the present invention. Within certain limits, increasing the volume fraction of the disperse phase tends to increase the amount of scattering that a light ray experiences after entering the body for both the match and mismatch directions of polarized light. This factor is important for controlling the reflection and transmission properties for a given application. However, if the volume fraction of the disperse phase becomes too large, light scattering diminishes. Without wishing to be bound by theory, this appears to be due to the fact that the disperse phase particles are closer together, in terms of the wavelength of light, so that the particles tend to act together as a smaller number of large effective particles.

The thickness of the optical body is also an important control parameter which can be manipulated to affect reflection and transmission properties in the present invention. As the thickness of the optical body increases, diffuse reflection also increases, and transmission, both specular and diffuse, decreases.

While the present invention will often be described herein with reference to the visible region of the spectrum, various embodiments of the present invention can be used to operate at different wavelengths (and thus frequencies) of electromagnetic radiation through appropriate scaling of the components of the optical body. Thus, as the wavelength increases, the linear size of the components of the optical body are increased so that the dimensions, measured in units of wavelength, remain approximately constant. Another major effect of changing wavelength is that, for most materials of interest, the index of refraction and the absorption coefficient change. However, the principles of index match and mismatch still apply at each wavelength of interest.

DETAILED DESCRIPTION OF THE INVENTION

Introduction

As used herein, the terms "specular reflection" and "specular reflectance" refer to the reflectance of light rays into an emergent cone with a vertex angle of 16 degrees centered around the specular angle. The terms "diffuse reflection" or "diffuse reflectance" refer to the reflection of rays that are outside the specular cone defined above. The terms "total reflectance" or "total reflection" refer to the combined reflectance of all light from a surface. Thus, total reflection is the sum of specular and diffuse reflection.

Similarly, the terms "specular transmission" and "specular transmittance" are used herein in reference to the transmission of rays into an emergent cone with a vertex angle of 16 degrees centered around the specular direction. The terms "diffuse transmission" and "diffuse transmittance" are used herein in reference to the transmission of all rays that are outside the specular cone defined above. The terms "total transmission" or "total transmittance" refer to the combined transmission of all light through an optical body. Thus, total transmission is the sum of specular and diffuse transmission.

As used herein, the term "extinction ratio" is defined to mean the ratio of total light transmitted in one polarization to the light transmitted in an orthogonal polarization.

Figure 2:
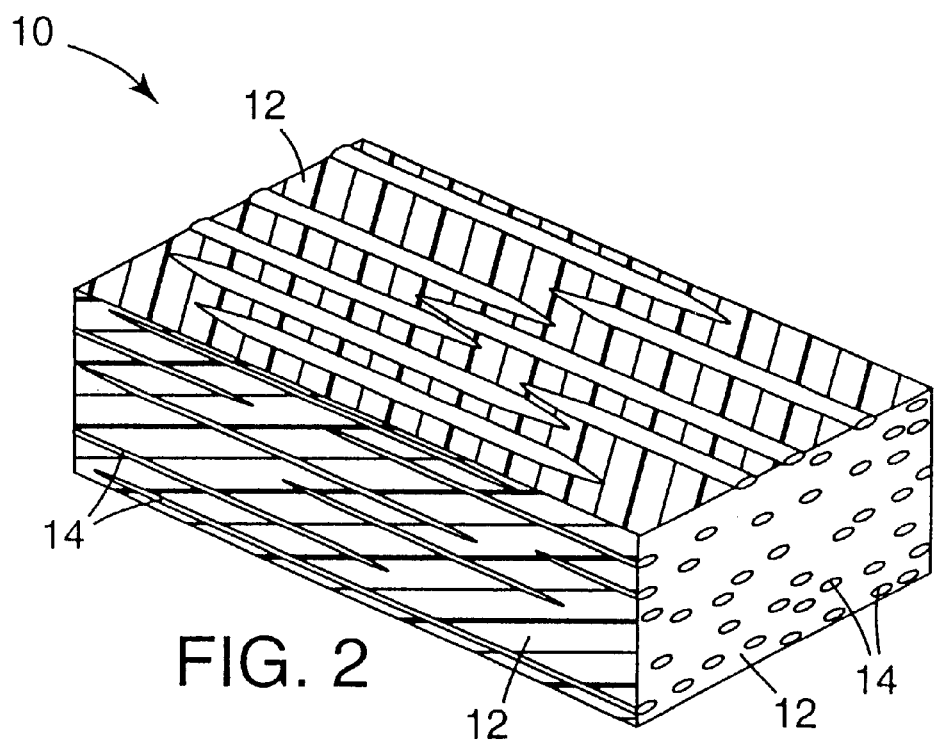
FIG. 2 is a schematic drawing illustrating an optical body made in accordance with the present invention, wherein the disperse phase is arranged as a series of elongated masses having an essentially elliptical cross-section.
Figure 3A:
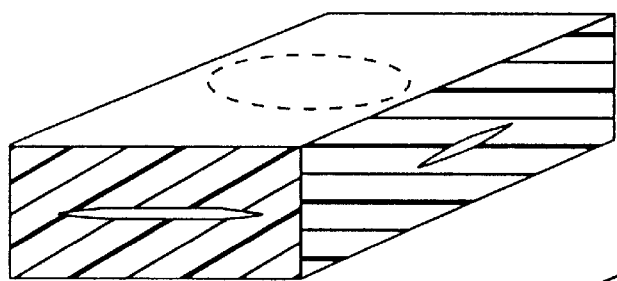
FIGS. 3a–e are schematic drawings illustrating various shapes of the disperse phase in an optical body made in accordance with the present invention.
Figure 3B:
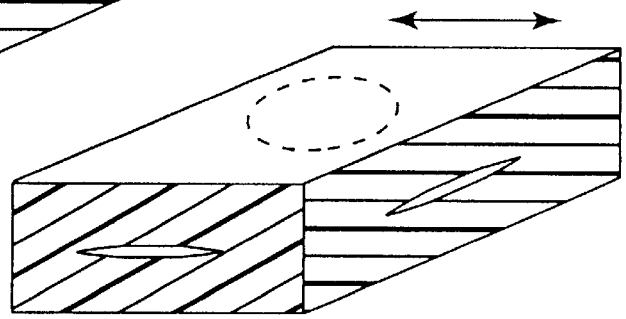
Figure 3C:
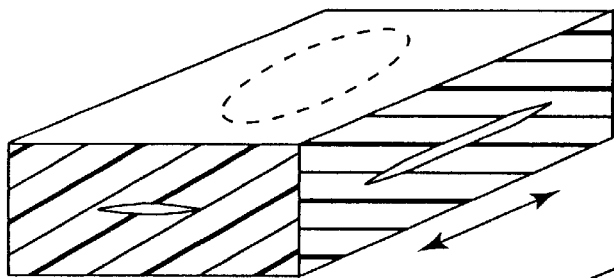
Figure 3D:
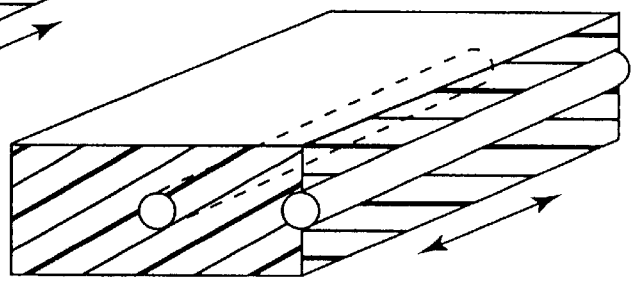
Figure 3E:
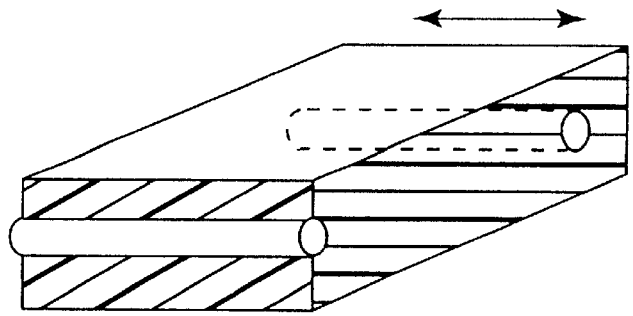

FIGS. 1–2 illustrate a first embodiment of the present invention. In accordance with the invention, a diffusely reflective optical film 10 or other optical body is produced which consists of a birefringent matrix or continuous phase 12 and a discontinuous or disperse phase 14. The birefringence of the continuous phase is typically at least about 0.05, preferably at least about 0.1, more preferably at least about 0.15, and most preferably at least about 0.2.

The indices of refraction of the continuous and disperse phases are substantially matched (i.e., differ by less than about 0.05) along a first of three mutually orthogonal axes, and are substantially mismatched (i.e., differ by more than about 0.05) along a second of three mutually orthogonal axes. Preferably, the indices of refraction of the continuous and disperse phases differ by less than about 0.03 in the match direction, more preferably, less than about 0.02, and most preferably, less than about 0.01. The indices of refraction of the continuous and disperse phases preferably differ in the mismatch direction by at least about 0.07, more preferably, by at least about 0.1, and most preferably, by at least about 0.2.

The mismatch in refractive indices along a particular axis has the effect that incident light polarized along that axis will be substantially scattered, resulting in a significant amount of reflection. By contrast, incident light polarized along an axis in which the refractive indices are matched will be spectrally transmitted or reflected with a much lesser degree of scattering. This effect can be utilized to make a variety of optical devices, including reflective polarizers and mirrors.

The present invention provides a practical and simple optical body and method for making a reflective polarizer, and also provides a means of obtaining a continuous range of optical properties according to the principles described herein. Also, very efficient low loss polarizers can be obtained with high extinction ratios. Other advantages are a wide range of practical materials for the disperse phase and the continuous phase, and a high degree of control in providing optical bodies of consistent and predictable high quality performance.

Effect of Index Match/Mismatch

In the preferred embodiment, the materials of at least one of the continuous and disperse phases are of a type that undergoes a change in refractive index upon orientation. Consequently, as the film is oriented in one or more directions, refractive index matches or mismatches are produced along one or more axes. By careful manipulation of orientation parameters and other processing conditions, the positive or negative birefringence of the matrix can be used to induce diffuse reflection or transmission of one or both polarizations of light along a given axis. The relative ratio between transmission and diffuse reflection is dependent on the concentration of the disperse phase inclusions, the thickness of the film, the square of the difference in the index of refraction between the continuous and disperse phases, the size and geometry of the disperse phase inclusions, and the wavelength or wavelength band of the incident radiation.

The magnitude of the index match or mismatch along a particular axis directly affects the degree of scattering of light polarized along that axis. In general, scattering power varies as the square of the index mismatch. Thus, the larger the index mismatch along a particular axis, the stronger the scattering of light polarized along that axis. Conversely, when the mismatch along a particular axis is small, light polarized along that axis is scattered to a lesser extent and is thereby transmitted specularly through the volume of the body.

Figure 4A:
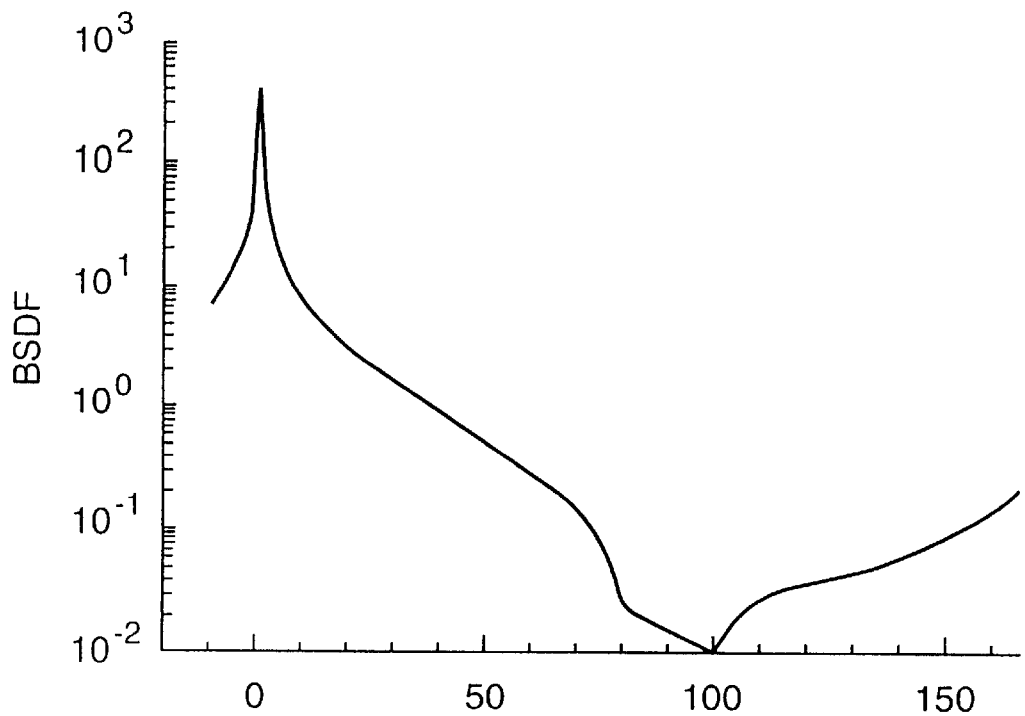
FIG. 4a is a graph of the bidirectional scatter distribution as a function of scattered angle for an oriented film in accordance with the present invention for light polarized perpendicular to orientation direction.
Figure 4B:
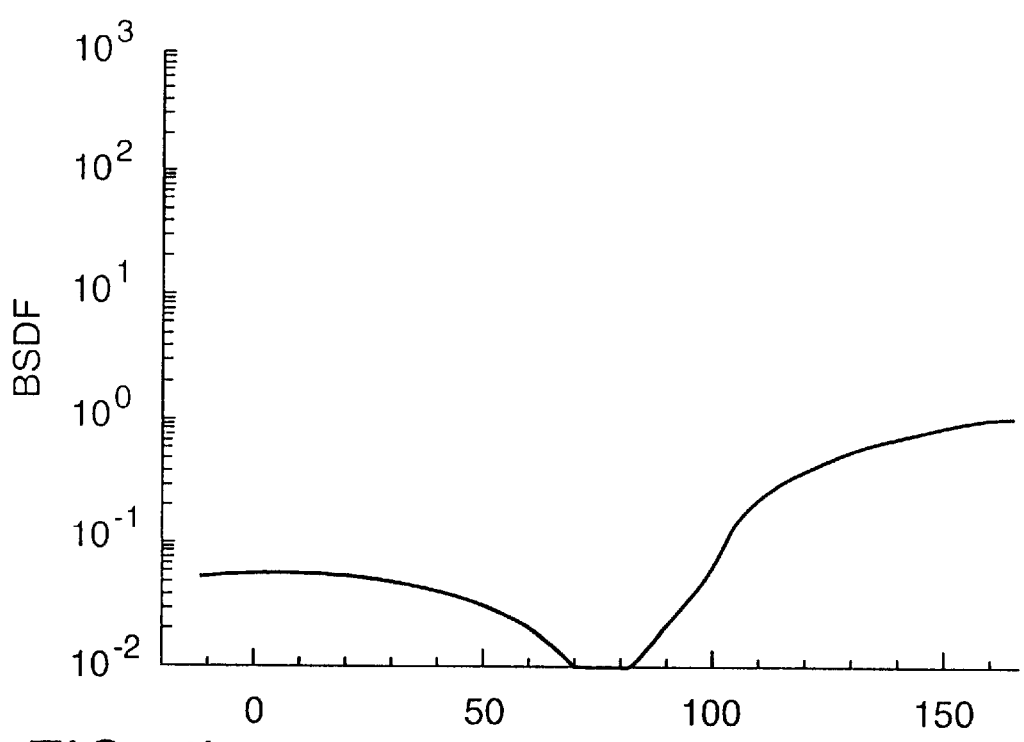
FIG. 4b is a graph of the bidirectional scatter distribution as a function of scattered angle for an oriented film in accordance with the present invention for light polarized parallel to orientation direction.

FIGS. 4a–b demonstrate this effect in oriented films made in accordance with the present invention. There, a typical Bidirectional Scatter Distribution Function (BSDF) measurement is shown for normally incident light at 632.8 nm. The BSDF is described in J. Stover, "Optical Scattering Measurement and Analysis" (1990). The BSDF is shown as a function of scattered angle for polarizations of light both perpendicular and parallel to the axis of orientation. A scattered angle of zero corresponds to unscattered (spectrally transmitted) light. For light polarized in the index match direction (that is, perpendicular to the orientation direction) as in FIG. 4a, there is a significant specularly transmitted peak with a sizable component of diffusely transmitted light (scattering angle between 8 and 80 degrees), and a small component of diffusely reflected light (scattering angle larger than 100 degrees). For light polarized in the index mismatch direction (that is, parallel to the orientation direction) as in FIG. 4b, there is negligible specularly transmitted light and a greatly reduced component of diffusely transmitted light, and a sizable diffusely reflected component. It should be noted that the plane of scattering shown by these graphs is the plane perpendicular to the orientation direction where most of the scattered light exists for these elongated inclusions. Scattered light contributions outside of this plane are greatly reduced.

If the index of refraction of the inclusions (i.e., the disperse phase) matches that of the continuous host media along some axis, then incident light polarized with electric fields parallel to this axis will pass through unscattered regardless of the size, shape, and density of inclusions. If the indices are not matched along some axis, then the inclusions will scatter light polarized along this axis. For scatterers of a given cross-sectional area with dimensions larger than approximately $\lambda/30$ (where $\lambda$ is the wavelength of light in the media), the strength of the scattering is largely determined by the index mismatch. The exact size, shape and alignment of a mismatched inclusion play a role in determining how much light will be scattered into various directions from that inclusion. If the density and thickness of the scattering layer is sufficient, according to multiple scattering theory, incident light will be either reflected or absorbed, but not transmitted, regardless of the details of the scatterer size and shape.

When the material is to be used as a polarizer, it is preferably processed, as by stretching and allowing some dimensional relaxation in the cross stretch in-plane direction, so that the index of refraction difference between the continuous and disperse phases is large along a first axis in a plane parallel to a surface of the material and small along the other two orthogonal axes. This results in a large optical anisotropy for electromagnetic radiation of different polarizations.

Some of the polarizers within the scope of the present invention are elliptical polarizers. In general, elliptical polarizers will have a difference in index of refraction between the disperse phase and the continuous phase for both the stretch and cross-stretch directions. The ratio of forward to back scattering is dependent on the difference in refractive index between the disperse and continuous phases, the concentration of the disperse phase, the size and shape of the disperse phase, and the overall thickness of the film. In general, elliptical diffusers have a relatively small difference in index of refraction between the particles of the disperse and continuous phases. By using a birefringent polymer-based diffuser, highly elliptical polarization sensitivity (i.e., diffuse reflectivity depending on the polarization of light) can be achieved. At an extreme, where the index of refraction of the polymers match on one axis, the elliptical polarizer will be a diffuse reflecting polarizer.

Methods of Obtaining Index Match/Mismatch

The materials selected for use in a polarizer in accordance with the present invention, and the degree of orientation of these materials, are preferably chosen so that the phases in the finished polarizer have at least one axis for which the associated indices of refraction are substantially equal. The match of refractive indices associated with that axis, which typically, but not necessarily, is an axis transverse to the direction of orientation, results in substantially no reflection of light in that plane of polarization.

The disperse phase may also exhibit a decrease in the refractive index associated with the direction of orientation after stretching. If the birefringence of the host is positive, a negative strain induced birefringence of the disperse phase has the advantage of increasing the difference between indices of refraction of the adjoining phases associated with the orientation axis while the reflection of light with its plane of polarization perpendicular to the orientation direction is still negligible. Differences between the indices of refraction of adjoining phases in the direction orthogonal to the orientation direction should be less than about 0.05 after orientation, and preferably, less than about 0.02.

The disperse phase may also exhibit a positive strain induced birefringence. However, this can be altered by means of heat treatment to match the refractive index of the axis perpendicular to the orientation direction of the continuous phase. The temperature of the heat treatment should not be so high as to relax the birefringence in the continuous phase.

Size of Disperse Phase

The size of the disperse phase also can have a significant effect on scattering. If the disperse phase particles are too small (i.e., less than about 1/30 the wavelength of light in the medium of interest) and if there are many particles per cubic wavelength, the optical body behaves as a medium with an effective index of refraction somewhat between the indices of the two phases along any given axis. In such a case, very little light is scattered. If the particles are too large, the light is specularly reflected from the surface of the particle, with very little diffusion into other directions. When the particles are too large in at least two orthogonal directions, undesirable iridescence effects can also occur. Practical limits may also be reached when particles become large in that the thickness of the optical body becomes greater and desirable mechanical properties are compromised.

The dimensions of the particles of the disperse phase after alignment can vary depending on the desired use of the optical material. Thus, for example, the dimensions of the particles may vary depending on the wavelength of electromagnetic radiation that is of interest in a particular application, with different dimensions required for reflecting or transmitting visible, ultraviolet, infrared, and microwave radiation. Generally, however, the length of the particles should be such that they are approximately greater than the wavelength of electromagnetic radiation of interest in the medium, divided by 30.

Preferably, in applications where the optical body is to be used as a low loss reflective polarizer, the particles will have a length that is greater than about 2 times the wavelength of the electromagnetic radiation over the wavelength range of interest, and preferably over 4 times the wavelength. The average diameter of the particles is preferably equal or less than the wavelength of the electromagnetic radiation over the wavelength range of interest, and preferably less than 0.5 of the desired wavelength. While the dimensions of the disperse phase are a secondary consideration in most applications, they become of greater importance in thin film applications, where there is comparatively little diffuse reflection.

Geometry of Disperse Phase

While the index mismatch is the predominant factor relied upon to promote scattering in the films of the present invention (i.e., a diffuse mirror or polarizer made in accordance with the present invention has a substantial mismatch in the indices of refraction of the continuous and disperse phases along at least one axis), the geometry of the particles of the disperse phase can have a secondary effect on scattering. Thus, the depolarization factors of the particles for the electric field in the index of refraction match and mismatch directions can reduce or enhance the amount of scattering in a given direction. For example, when the disperse phase is elliptical in a cross-section taken along a plane perpendicular to the axis of orientation, the elliptical cross-sectional shape of the disperse phase contributes to the asymmetric diffusion in both back scattered light and forward scattered light. The effect can either add or detract from the amount of scattering from the index mismatch, but generally has a small influence on scattering in the preferred range of properties in the present invention.

The shape of the disperse phase particles can also influence the degree of diffusion of light scattered from the particles. This shape effect is generally small but increases as the aspect ratio of the geometrical cross-section of the particle in the plane perpendicular to the direction of incidence of the light increases and as the particles get relatively larger. In general, in the operation of this invention, the disperse phase particles should be sized less than several wavelengths of light in one or two mutually orthogonal dimensions if diffuse, rather than specular, reflection is preferred.

Preferably, for a low loss reflective polarizer, the preferred embodiment consists of a disperse phase disposed within the continuous phase as a series of rod-like structures which, as a consequence of orientation, have a high aspect ratio which can enhance reflection for polarizations parallel to the orientation direction by increasing the scattering strength and dispersion for that polarization relative to polarizations perpendicular to the orientation direction. However, as indicated in FIGS. 3a–e, the disperse phase may be provided with many different geometries. Thus, the disperse phase may be disk-shaped or elongated disk-shaped, as in FIGS. 3a–c, rod-shaped, as in FIGS. 3d–e, or spherical. Other embodiments are contemplated wherein the disperse phase has cross sections which are approximately elliptical (including circular), polygonal, irregular, or a combination of one or more of these shapes. The cross-sectional shape and size of the particles of the disperse phase may also vary from one particle to another, or from one region of the film to another (i.e., from the surface to the core).

In some embodiments, the disperse phase may have a core and shell construction, wherein the core and shell are made out of the same or different materials, or wherein the core is hollow. Thus, for example, the disperse phase may consist of hollow fibers of equal or random lengths, and of uniform or non-uniform cross section. The interior space of the fibers may be empty, or may be occupied by a suitable medium which may be a solid, liquid, or gas, and may be organic or inorganic. The refractive index of the medium may be chosen in consideration of the refractive indices of the disperse phase and the continuous phase so as to achieve a desired optical effect (i.e., reflection or polarization along a given axis).

The geometry of the disperse phase may be arrived at through suitable orientation or processing of the optical material, through the use of particles having a particular geometry, or through a combination of the two. Thus, for example, a disperse phase having a substantially rod-like structure can be produced by orienting a film consisting of approximately spherical disperse phase particles along a single axis. The rod-like structures can be given an elliptical cross-section by orienting the film in a second direction perpendicular to the first. As a further example, a disperse phase having a substantially rod-like structure in which the rods are rectangular in cross-section can be produced by orienting in a single direction a film having a disperse phase consisting of a series of essentially rectangular flakes.

Stretching is one convenient manner for arriving at a desired geometry, since stretching can also be used to induce a difference in indices of refraction within the material. As indicated above, the orientation of films in accordance with the invention may be in more than one direction, and may be sequential or simultaneous.

In another example, the components of the continuous and disperse phases may be extruded such that the disperse phase is rod-like in one axis in the unoriented film. Rods with a high aspect ratio may be generated by orienting in the direction of the major axis of the rods in the extruded film. Plate-like structures may be generated by orienting in an orthogonal direction to the major axis of the rods in the extruded film.

The structure in FIG. 2 can be produced by asymmetric biaxial orientation of a blend of essentially spherical particles within a continuous matrix. Alternatively, the structure may be obtained by incorporating a plurality of fibrous structures into the matrix material, aligning the structures along a single axis, and orienting the mixture in a direction transverse to that axis. Still another method for obtaining this structure is by controlling the relative viscosities, shear, or surface tension of the components of a polymer blend so as to give rise to a fibrous disperse phase when the blend is extruded into a film. In general, it is found that the best results are obtained when the shear is applied in the direction of extrusion.

Dimensional Alignment of Disperse Phase

Dimensional alignment is also found to have an effect on the scattering behavior of the disperse phase. In particular, it has been observed in optical bodies made in accordance with the present invention that aligned scatterers will not scatter light symmetrically about the directions of specular transmission or reflection as randomly aligned scatterers would. In particular, inclusions that have been elongated through orientation to resemble rods scatter light primarily along (or near) the surface of a cone centered on the orientation direction and along the specularly transmitted direction. This may result in an anisotropic distribution of scattered light about the specular reflection and specular transmission directions. For example, for light incident on such an elongated rod in a direction perpendicular to the orientation direction, the scattered light appears as a band of light in the plane perpendicular to the orientation direction with an intensity that decreases with increasing angle away from the specular directions. By tailoring the geometry of the inclusions, some control over the distribution of scattered light can be achieved both in the transmissive hemisphere and in the reflective hemisphere.

Dimensions of Disperse Phase

In applications where the optical body is to be used as a low loss reflective polarizer, the structures of the disperse phase preferably have a high aspect ratio, i.e., the structures are substantially larger in one dimension than in any other dimension. The aspect ratio is preferably at least 2, and more preferably at least 5. The largest dimension (i.e., the length) is preferably at least 2 times the wavelength of the electromagnetic radiation over the wavelength range of interest, and more preferably at least 4 times the desired wavelength. On the other hand, the smaller (i.e., cross-sectional) dimensions of the structures of the disperse phase are preferably less than or equal to the wavelength of interest, and more preferably less than 0.5 times the wavelength of interest.

Volume Fraction of Disperse Phase

The volume fraction of the disperse phase also affects the scattering of light in the optical bodies of the present invention. Within certain limits, increasing the volume fraction of the disperse phase tends to increase the amount of scattering that a light ray experiences after entering the body for both the match and mismatch directions of polarized light. This factor is important for controlling the reflection and transmission properties for a given application.

The desired volume fraction of the disperse phase will depend on many factors, including the specific choice of materials for the continuous and disperse phase. However, the volume fraction of the disperse phase will typically be at least about 1% by volume relative to the continuous phase, more preferably within the range of about 5 to about 15%, and most preferably within the range of about 15 to about 30%.

Co-Continuous Phases

When the volume fraction for binary blends of high polymers of roughly equivalent viscosity approaches 50%, the distinction between the disperse and continuous phases becomes difficult, as each phase becomes continuous in space. Depending upon the materials of choice, there may also be regions where the first phase appears to be dispersed within the second, and vice versa. For a description of a variety of co-continuous morphologies and for methods of evaluating, analyzing, and characterizing them, see Sperling and the references cited therein (L. H. Sperling, "Microphase Structure", *Encyclopedia of Polymer Science and Engineering,* 2nd Ed., Vol. 9, 760–788, and L. H. Sperling, Chapter 1 "Interpenetrating Polymer Networks: An Overview", *Interpenetrating Polymer Networks,* edited by D. Klempner, L. H. Sperling, and L. A. Utracki, Advances in Chemistry Series #239, 3–38, 1994).

Materials having co-continuous phases may be made in accordance with the present invention by a number of different methods. Thus, for example, the polymeric first phase material may be mechanically blended with the polymeric second phase material to achieve a co-continuous system. Examples of co-continuous morphologies achieved by blending are described, for example, in D. Bourry and B. D. Favis, "Co-Continuity and Phase Inversion in HDPE/PS Blends: The Role of Interfacial Modification", 1995 *Annual Technical Conference of the Society of Plastics Engineers ANTEC,* Vol. 53, No. 2, 2001–2009 (polystyrene/polyethylene blends), and in A. Leclair and B. D. Favis, "The role of interfacial contact in immiscible binary polymer blends and its influence on mechanical properties", *Polymer,* Vol. 37, No. 21, 4723–4728, 1996 (polycarbonate/polyethylene blends).

Co-continuous phases may also be formed in accordance with the present invention by first by dissolving them out of supercritical fluid extractions, such as that disclosed for blends of polystyrene and poly(methyl methacrylate) in U.S. Pat. No. 4,281,084, and then allowing them to phase separate following exposure to heat and/or mechanical shear, as described by in N. Mekhilef, B. D. Favis and P. J. Carreau, "Morphological Stability of Polystyrene Polyethylene Blends", 1995 *Annual Technical Conference of the Society of Plastics Engineers ANTEC,* Vol. 53, No. 2, 1572–1579).

A further method of producing co-continuous phases in accordance with the present invention is through the creation of interpenetrating polymer networks (IPNs). Some of the more important IPNs include simultaneous IPNs, sequential IPNs, gradient IPNs, latex IPNs, thermoplastic IPNs, and semi-IPNs. These and other types of IPNs, their physical properties (e.g., phase diagrams), and methods for their preparation and characterization, are described, for example, in L. H. Sperling and V. Mishra, "Current Status of Interpenetrating Polymer Networks", *Polymers for Advanced Technologies,* Vol. 7, No. 4, 197–208, April 1996, and in L. H. Sperling, "Interpenetrating Polymer Networks: An Overview", *Interpenetrating Polymer Networks,* edited by D. Klempner, L. H. Sperling, and L. A. Utracki, Advances in Chemistry Series #239, 3–38, 1994). Some of the major methods for preparing these systems are summarized below.

Simultaneous IPNs may be made by mixing together the respective monomers or prepolymers, plus the crosslinkers and activators, of two or more polymer networks. The respective monomers or prepolymers are then reacted simultaneously, but in a non-interfering manner. Thus, for example, one reaction may be made to proceed by way of chain polymerization kinetics, and the other reaction may be made to proceed through step polymerization kinetics.

Sequential IPNs are made by first forming an initial polymer network. Then, the monomers, crosslinkers, and activators of one or more additional networks are swollen into the initial polymer network, where they are reacted in situ to yield additional polymer networks.

Gradient IPNs are synthesized in such a manner that the overall composition or crosslink density of the IPN varies macroscopically in the material from one location to another. Such systems may be made, for example, by forming a first polymer network predominantly on one surface of a film and a second polymer network predominantly on another surface of the film, with a gradient in composition throughout the interior of the film.

Latex IPNs are made in the form of latexes (e.g., with a core and shell structure). In some variations, two or more latexes may be mixed and formed into a film, which crosslinks the polymers.

Thermoplastic IPNs are hybrids between polymer blends and IPNs that involve physical crosslinks instead of chemical crosslinks. As a result, these materials can be made to flow at elevated temperatures in a manner similar to that of thermoplastic elastomers, but are crosslinked and behave as IPNs at the temperatures of normal use.

Semi-IPNs are compositions of two or more polymers in which one or more of the polymers are crosslinked and one or more of the polymers are linear or branched.

As indicated above, co-continuity can be achieved in multicomponent systems as well as in binary systems. For example, three or more materials may be used in combination to give desired optical properties (e.g., transmission and reflectivity) and/or improved physical properties. All components may be immiscible, or two or more components may demonstrate miscibility. A number of ternary systems exhibiting co-continuity are described, for example, in L. H. Sperling, Chapter 1 "Interpenetrating Polymer Networks: An Overview", *Interpenetrating Polymer Networks,* edited by D. Klempner, L. H. Sperling, and L. A. Utracki, Advances in Chemistry Series #239, 3–38, 1994).

Characteristic sizes of the phase structures, ranges of volume fraction over which co-continuity may be observed, and stability of the morphology may all be influenced by additives, such as compatibilizers, graft or block copolymers, or reactive components, such as maleic anhydride or glycidyl methacrylate. Such effects are described, for example, for blends of polystyrene and poly(ethylene terephthalate) in H. Y. Tsai and K. Min, "Reactive Blends of Functionalized Polystyrene and Polyethylene Terephthalate", 1995 *Annual Technical Conference of the Society of Plastics Engineers ANTEC,* Vol. 53, No. 2, 1858–1865. However, for particular systems, phase diagrams may be constructed through routine experimentation and used to produce co-continuous systems in accordance with the present invention.

The microscopic structure of co-continuous systems made in accordance with the present invention can vary significantly, depending on the method of preparation, the miscibility of the phases, the presence of additives, and other factors as are known to the art. Thus, for example, one or more of the phases in the co-continuous system may be fibrillar, with the fibers either randomly oriented or oriented along a common axis. Other co-continuous systems may comprise an open-celled matrix of a first phase, with a second phase disposed in a co-continuous manner within the cells of the matrix. The phases in these systems may be co-continuous along a single axis, along two axes, or along three axes.

Optical bodies made in accordance with the present invention and having co-continuous phases (particularly IPNs) will, in several instances, have properties that are advantageous over the properties of similar optical bodies that are made with only a single continuous phase, depending, of course, on the properties of the individual polymers and the method by which they are combined. Thus, for example, the co-continuous systems of the present invention allow for the chemical and physical combination of structurally dissimilar polymers, thereby providing a convenient route by which the properties of the optical body may be modified to meet specific needs. Furthermore, co-continuous systems will frequently be easier to process, and may impart such properties as weatherability, reduced flammability, greater impact resistance and tensile strength, improved flexibility, and superior chemical resistance. IPNs are particularly advantageous in certain applications, since they typically swell (but do not dissolve) in solvents, and exhibit suppressed creep and flow compared to analogous non-IPN systems (see, e.g., D. Klempner and L. Berkowski, "Interpenetrating Polymer Networks", *Encyclopedia of Polymer Science and Engineering,* Vol. 8, 278–341.

One skilled in the art will appreciate that the principles of co-continuous systems as are known to the art may be applied in light of the teachings set forth herein to produce co-continuous morphologies having unique optical properties. Thus, for example, the refractive indices of known co-continuous morphologies may be manipulated as taught herein to produce new optical films in accordance with the present invention. Likewise, the principles taught herein may be applied to known optical systems to produce co-continuous morphologies.

Thickness of Optical Body

The thickness of the optical body is also an important parameter which can be manipulated to affect reflection and transmission properties in the present invention. As the thickness of the optical body increases, diffuse reflection also increases, and transmission, both specular and diffuse, decreases. Thus, while the thickness of the optical body will typically be chosen to achieve a desired degree of mechanical strength in the finished product, it can also be used to directly to control reflection and transmission properties.

Thickness can also be utilized to make final adjustments in reflection and transmission properties of the optical body. Thus, for example, in film applications, the device used to extrude the film can be controlled by a downstream optical device which measures transmission and reflection values in the extruded film, and which varies the thickness of the film (i.e., by adjusting extrusion rates or changing casting wheel speeds) so as to maintain the reflection and transmission values within a predetermined range.

Materials for Continuous/Disperse Phases

Many different materials may be used as the continuous or disperse phases in the optical bodies of the present invention, depending on the specific application to which the optical body is directed. Such materials include inorganic materials such as silica-based polymers, organic materials such as liquid crystals, and polymeric materials, including monomers, copolymers, grafted polymers, and mixtures or blends thereof. The exact choice of materials for a given application will be driven by the desired match and mismatch obtainable in the refractive indices of the continuous and disperse phases along a particular axis, as well as the desired physical properties in the resulting product. However, the materials of the continuous phase will generally be characterized by being substantially transparent in the region of the spectrum desired.

A further consideration in the choice of materials is that the resulting product must contain at least two distinct phases. This may be accomplished by casting the optical material from two or more materials which are immiscible with each other. Alternatively, if it is desired to make an optical material with a first and second material which are not immiscible with each other, and if the first material has a higher melting point than the second material, in some cases it may be possible to embed particles of appropriate dimensions of the first material within a molten matrix of the second material at a temperature below the melting point of the first material. The resulting mixture can then be cast into a film, with or without subsequent orientation, to produce an optical device.

Suitable polymeric materials for use as the continuous or disperse phase in the present invention may be amorphous, semicrystalline, or crystalline polymeric materials, including materials made from monomers based on carboxylic acids such as isophthalic, azelaic, adipic, sebacic, dibenzoic, terephthalic, 2,7-naphthalene dicarboxylic, 2,6-naphthalene dicarboxylic, cyclohexanedicarboxylic, and bibenzoic acids (including 4,4'-bibenzoic acid), or materials made from the corresponding esters of the aforementioned acids (i.e., dimethylterephthalate). Of these, 2,6-polyethylene naphthalate (PEN) is especially preferred because of its strain induced birefringence, and because of its ability to remain permanently birefringent after stretching. PEN has a refractive index for polarized incident light of 550 nm wavelength which increases after stretching when the plane of polarization is parallel to the axis of stretch from about 1.64 to as high as about 1.9, while the refractive index decreases for light polarized perpendicular to the axis of stretch. PEN exhibits a birefringence (in this case, the difference between the index of refraction along the stretch direction and the index perpendicular to the stretch direction) of 0.25 to 0.40 in the visible spectrum. The birefringence can be increased by increasing the molecular orientation. PEN may be substantially heat stable from about 155° C. up to about 230° C., depending upon the processing conditions utilized during the manufacture of the film.

Polybutylene naphthalate is also a suitable material as well as other crystalline naphthalene dicarboxylic polyesters. The crystalline naphthalene dicarboxylic polyesters exhibit a difference in refractive indices associated with different in-plane axes of at least 0.05 and preferably above 0.20.

When PEN is used as one phase in the optical material of the present invention, the other phase is preferably polymethylmethacrylate (PMMA) or a syndiotactic vinyl aromatic polymer such as polystyrene (sPS). Other preferred polymers for use with PEN are based on terephthalic, isophthalic, sebacic, azelaic or cyclohexanedicarboxylic acid or the related alkyl esters of these materials. Naphthalene dicarboxylic acid may also be employed in minor amounts to improve adhesion between the phases. The diol component may be ethylene glycol or a related diol. Preferably, the index of refraction of the selected polymer is less than about 1.65, and more preferably, less than about 1.55, although a similar result may be obtainable by using a polymer having a higher index of refraction if the same index difference is achieved.

Syndiotactic-vinyl aromatic polymers useful in the current invention include poly(styrene), poly(alkyl styrene), poly(styrene halide), poly(alkyl styrene), poly(vinyl ester benzoate), and these hydrogenated polymers and mixtures, or copolymers containing these structural units. Examples of poly(alkyl styrenes) include: poly(methyl styrene), poly(ethyl styrene), poly(propyl styrene), poly(butyl styrene), poly(phenyl styrene), poly(vinyl naphthalene), poly(vinylstyrene), and poly(acenaphthalene) may be mentioned. As for the poly(styrene halides), examples include: poly(chlorostyrene), poly(bromostyrene), and poly(fluorostyrene). Examples of poly(alkoxy styrene) include: poly(methoxy styrene), and poly(ethoxy styrene). Among these examples, as particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene may be mentioned.

Furthermore, as comonomers of syndiotactic vinyl-aromatic group copolymers, besides monomers of above explained styrene group polymer, olefin monomers such as ethylene, propylene, butene, hexene, or octene; diene monomers such as butadiene, isoprene; polar vinyl monomers such as cyclic diene monomer, methyl methacrylate, maleic acid anhydride, or acrylonitrile may be mentioned.

The syndiotactic-vinyl aromatic polymers of the present invention may be block copolymers, random copolymers, or alternating copolymers.

The vinyl aromatic polymer having high level syndiotactic structure referred to in this invention generally includes polystyrene having syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of this syndiotactic-vinyl aromatic group polymer, preferably, the weight average molecular weight is greater than 10,000 and less than 1,000,000, and more preferably, greater than 50,000 and less than 800,000.

As for said other resins, various types may be mentioned, including, for instance, vinyl aromatic group polymers with atactic structures, vinyl aromatic group polymers with isotactic structures, and all polymers that are miscible. For example, polyphenylene ethers show good miscibility with the previous explained vinyl aromatic group polymers. Furthermore, the composition of these miscible resin components is preferably between 70 to 1 weight %, or more preferably, 50 to 2 weight %. When composition of miscible resin component exceeds 70 weight %, degradation on the heat resistance may occur, and is usually not desirable.

It is not required that the selected polymer for a particular phase be a copolyester or copolycarbonate. Vinyl polymers and copolymers made from monomers such as vinyl naphthalenes, styrenes, ethylene, maleic anhydride, acrylates, and methacrylates may also be employed. Condensation polymers, other than polyesters and polycarbonates, can also be utilized. Suitable condensation polymers include polysulfones, polyamides, polyurethanes, polyamic acids, and polyimides. Naphthalene groups and halogens such as chlorine, bromine and iodine are useful in increasing the refractive index of the selected polymer to the desired level (1.59 to 1.69) if needed to substantially match the refractive index if PEN is the host. Acrylate groups and fluorine are particularly useful in decreasing the refractive index.

Minor amounts of comonomers may be substituted into the naphthalene dicarboxylic acid polyester so long as the large refractive index difference in the orientation direction (s) is not substantially compromised. A smaller index difference (and therefore decreased reflectivity) may be counterbalanced by advantages in any of the following: improved adhesion between the continuous and disperse phase, lowered temperature of extrusion, and better match of melt viscosities.

Region of Spectrum

While the present invention is frequently described herein with reference to the visible region of the spectrum, various embodiments of the present invention can be used to operate at different wavelengths (and thus frequencies) of electromagnetic radiation through appropriate scaling of the components of the optical body. Thus, as the wavelength increases, the linear size of the components of the optical body may be increased so that the dimensions of these components, measured in units of wavelength, remain approximately constant.

Of course, one major effect of changing wavelength is that, for most materials of interest, the index of refraction and the absorption coefficient change. However, the principles of index match and mismatch still apply at each wavelength of interest, and may be utilized in the selection of materials for an optical device that will operate over a specific region of the spectrum. Thus, for example, proper scaling of dimensions will allow operation in the infrared, near-ultraviolet, and ultra-violet regions of the spectrum. In these cases, the indices of refraction refer to the values at these wavelengths of operation, and the body thickness and size of the disperse phase scattering components should also be approximately scaled with wavelength. Even more of the electromagnetic spectrum can be used, including very high, ultrahigh, microwave and millimeter wave frequencies. Polarizing and diffusing effects will be present with proper scaling to wavelength and the indices of refraction can be obtained from the square root of the dielectric function (including real and imaginary parts). Useful products in these longer wavelength bands can be diffuse reflective polarizers and partial polarizers.

In some embodiments of the present invention, the optical properties of the optical body vary across the wavelength band of interest. In these embodiments, materials may be utilized for the continuous and/or disperse phases whose indices of refraction, along one or more axes, varies from one wavelength region to another. The choice of continuous and disperse phase materials, and the optical properties (i.e., diffuse and disperse reflection or specular transmission) resulting from a specific choice of materials, will depend on the wavelength band of interest.

Skin Layers

A layer of material which is substantially free of a disperse phase may be coextensively disposed on one or both major surfaces of the film, i.e., the extruded blend of the disperse phase and the continuous phase. The composition of the layer, also called a skin layer, may be chosen, for example, to protect the integrity of the disperse phase within the extruded blend, to add mechanical or physical properties to the final film or to add optical functionality to the final film. Suitable materials of choice may include the material of the continuous phase or the material of the disperse phase. Other materials with a melt viscosity similar to the extruded blend may also be useful.

A skin layer or layers may reduce the wide range of shear intensities the extruded blend might experience within the extrusion process, particularly at the die. A high shear environment may cause undesirable surface voiding and may result in a textured surface. A broad range of shear values throughout the thickness of the film may also prevent the disperse phase from forming the desired particle size in the blend.

A skin layer or layers may also add physical strength to the resulting composite or reduce problems during processing, such as, for example, reducing the tendency for the film to split during the orientation process. Skin layer materials which remain amorphous may tend to make films with a higher toughness, while skin layer materials which are semicrystalline may tend to make films with a higher tensile modulus. Other functional components such as anti-static additives, UV absorbers, dyes, antioxidants, and pigments, may be added to the skin layer, provided they do not substantially interfere with the desired optical properties of the resulting product.

Skin layers or coatings may also be added to impart desired barrier properties to the resulting film or device. Thus, for example, barrier films or coatings may be added as skin layers, or as a component in skin layers, to alter the transmissive properties of the film or device towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film, provided, of course, that such a layer does not unduly compromise the optical properties required for the application to which the film is directed.

Skin layers or coatings may also be added to impart or improve puncture and/or tear resistance in the resulting article. Thus, for example, in embodiments in which the outer layer of the optical film contains coPEN as the major phase, a skin layer of monolithic coPEN may be coextruded with the optical layers to impart good tear resistance to the resulting film. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the optical film. Adhering these layers to the optical film during the manufacturing process, such as by a coextrusion process, provides the advantage that the optical film is protected during the manufacturing process. In some embodiments, one or more puncture or tear resistant layers may be provided within the optical film, either alone or in combination with a puncture or tear resistant skin layer.

The skin layers may be applied to one or two sides of the extruded blend at some point during the extrusion process, i.e., before the extruded blend and skin layer(s) exit the extrusion die. This may be accomplished using conventional coextrusion technology, which may include using a three-layer coextrusion die. Lamination of skin layer(s) to a previously formed film of an extruded blend is also possible. Total skin layer thicknesses may range from about 2% to about 50% of the total blend/skin layer thickness.

In some applications, additional layers may be coextruded or adhered on the outside of the skin layers during manufacture of the optical films. Such additional layers may also be extruded or coated onto the optical film in a separate coating operation, or may be laminated to the optical film as a separate film, foil, or rigid or semi-rigid substrate such as polyester (PET), acrylic (PMMA), polycarbonate, metal, or glass.

A wide range of polymers are suitable for skin layers. Of the predominantly amorphous polymers, suitable examples include copolyesters based on one or more of terephthalic acid, 2,6-naphthalene dicarboxylic acid, isophthalic acid, phthalic acid, or their alkyl ester counterparts, and alkylene diols, such as ethylene glycol. Examples of semicrystalline polymers suitable for use in skin layers include 2,6-polyethylene naphthalate, polyethylene terephthalate, and nylon materials. Skin layers that may be used to increase the toughness of the optical film include high elongation polyesters such as Ecdel™ and PCTG 5445 (available commercially from Eastman Chemical Co., Rochester, N.Y.) and polycarbonates. Polyolefins, such as polypropylene and polyethylene, may also be used for this purpose, especially if they are made to adhere to the optical film with a compatibilizer.

Functional layers

Various functional layers or coatings may be added to the optical films and devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, or substrates designed to improve the mechanical integrity or strength of the film or device.

The films and optical devices of the present invention may be given good slip properties by treating them with low friction coatings or slip agents, such as polymer beads coated onto the surface. Alternately, the morphology of the surfaces of these materials may be modified, as through manipulation of extrusion conditions, to impart a slippery surface to the film; methods by which surface morphology may be so modified are described in U.S. Ser. No. 08/612,710.

In some applications, as where the optical films of the present invention are to be used as a component in adhesive tapes, it may be desirable to treat the films with low adhesion backsize (LAB) coatings or films such as those based on urethane, silicone or fluorocarbon chemistry. Films treated in this manner will exhibit proper release properties towards pressure sensitive adhesives (PSAs), thereby enabling them to be treated with adhesive and wound into rolls. Adhesive tapes made in this manner can be used for decorative purposes or in any application where a diffusely reflective or transmissive surface on the tape is desirable.

The films and optical devices of the present invention may also be provided with one or more conductive layers. Such conductive layers may comprise metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

The films and optical devices of the present invention may also be provided with antistatic coatings or films. Such coatings or films include, for example, $V_2O_5$ and salts of sulfonic acid polymers, carbon or other conductive metal layers.

The optical films and devices of the present invention may also be provided with one or more barrier films or coatings that alter the transmissive properties of the optical film towards certain liquids or gases. Thus, for example, the devices and films of the present invention may be provided with films or coatings that inhibit the transmission of water vapor, organic solvents, $O_2$, or $CO_2$ through the film. Barrier coatings will be particularly desirable in high humidity environments, where components of the film or device would be subject to distortion due to moisture permeation.

The optical films and devices of the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

The optical films and devices of the present invention may also be provided with abrasion-resistant or hard coatings, which will frequently be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

The optical films and devices of the present invention may further be laminated to rigid or semi-rigid substrates, such as, for example, glass, metal, acrylic, polyester, and other polymer backings to provide structural rigidity, weatherability, or easier handling. For example, the optical films of the present invention may be laminated to a thin acrylic or metal backing so that it can be stamped or otherwise formed and maintained in a desired shape. For some applications, such as when the optical film is applied to other breakable backings, an additional layer comprising PET film or puncture-tear resistant film may be used.

The optical films and devices of the present invention may also be provided with shatter resistant films and coatings. Films and coatings suitable for this purpose are described, for example, in publications EP 592284 and EP 591055, and are available commercially from 3M Company, St. Paul, Minn.

Various optical layers, materials, and devices may also be applied to, or used in conjunction with, the films and devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent film for low emissivity applications; release films or release coated paper; and polarizers or mirrors.

Multiple additional layers on one or both major surfaces of the optical film are contemplated, and can be any combination of aforementioned coatings or films. For example, when an adhesive is applied to the optical film, the adhesive may contain a white pigment such as titanium dioxide to increase the overall reflectivity, or it may be optically transparent to allow the reflectivity of the substrate to add to the reflectivity of the optical film.

In order to improve roll formation and convertibility of the film, the optical films of the present invention may also comprise a slip agent that is incorporated into the film or added as a separate coating. In most applications, slip agents will be added to only one side of the film, ideally the side facing the rigid substrate in order to minimize haze.

Microvoiding

In some embodiments, the materials of the continuous and disperse phases may be chosen so that the interface between the two phases will be sufficiently weak to result in voiding when the film is oriented. The average dimensions of the voids may be controlled through careful manipulation of processing parameters and stretch ratios, or through selective use of compatibilizers. The voids may be back-filled in the finished product with a liquid, gas, or solid. Voiding may be used in conjunction with the aspect ratios and refractive indices of the disperse and continuous phases to produce desirable optical properties in the resulting film.

More Than Two Phases

The optical bodies made in accordance with the present invention may also consist of more than two phases. Thus, for example, an optical material made in accordance with the present invention can consist of two different disperse phases within the continuous phase. The second disperse phase could be randomly or non-randomly dispersed throughout the continuous phase, and can be randomly aligned or aligned along a common axis.

Optical bodies made in accordance with the present invention may also consist of more than one continuous phase. Thus, in some embodiments, the optical body may include, in addition to a first continuous phase and a disperse phase, a second phase which is co-continuous in at least one dimension with the first continuous phase. In one particular embodiment, the second continuous phase is a porous, sponge-like material which is coextensive with the first continuous phase (i.e., the first continuous phase extends through a network of channels or spaces extending through the second continuous phase, much as water extends through a network of channels in a wet sponge). In a related embodiment, the second continuous phase is in the form of a dendritic structure which is coextensive in at least one dimension with the first continuous phase.

Multilayer Combinations

If desired, one or more sheets of a continuous/disperse phase film made in accordance with the present invention may be used in combination with, or as a component in, a multilayered film (i.e., to increase reflectivity). Suitable multilayered films include those of the type described in WO 95/17303 (Ouderkirk et al.). In such a construction, the individual sheets may be laminated or otherwise adhered together or may be spaced apart. If the optical thicknesses of the phases within the sheets are substantially equal (that is, if the two sheets present a substantially equal and large number of scatterers to incident light along a given axis), the composite will reflect, at somewhat greater efficiency, substantially the same band width and spectral range of reflectivity (i.e., "band") as the individual sheets. If the optical thicknesses of phases within the sheets are not substantially equal, the composite will reflect across a broader band width than the individual phases. A composite combining mirror sheets with polarizer sheets is useful for increasing total reflectance while still polarizing transmitted light. Alternatively, a single sheet may be asymmetrically and biaxially oriented to produce a film having selective reflective and polarizing properties.

Figure 5:
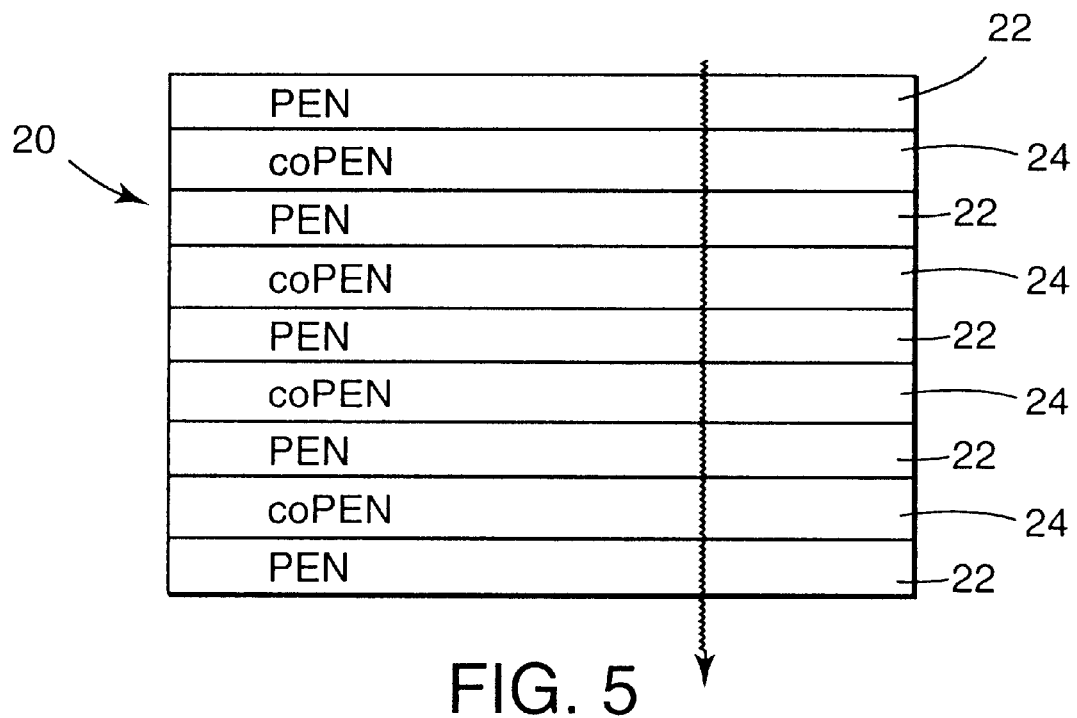
FIG. 5 is a schematic representation of a multilayer film made in accordance with the present invention.

FIG. 5 illustrates one example of this embodiment of the present invention. There, the optical body consists of a multilayer film 20 in which the layers alternate between layers of PEN 22 and layers of co-PEN 24. Each PEN layer includes a disperse phase of syndiotactic polystyrene (sPS) within a matrix of PEN. This type of construction is desirable in that it promotes lower off-angle color. Furthermore, since the layering or inclusion of scatterers averages out light leakage, control over layer thickness is less critical, allowing the film to be more tolerable of variations in processing parameters.

Any of the materials previously noted may be used as any of the layers in this embodiment, or as the continuous or disperse phase within a particular layer. However, PEN and co-PEN are particularly desirable as the major components of adjacent layers, since these materials promote good laminar adhesion.

Also, a number of variations are possible in the arrangement of the layers. Thus, for example, the layers can be made to follow a repeating sequence through part or all of the structure. One example of this is a construction having the layer pattern ... ABCABC ..., wherein A, B, and C are distinct materials or distinct blends or mixtures of the same or different materials, and wherein one or more of A, B, or C contains at least one disperse phase and at least one continuous phase. The skin layers are preferably the same or chemically similar materials.

Antireflection Layers

The films and other optical devices made in accordance with the invention may also include one or more antireflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching. A particular example of an antireflective coating is described in more detail in Examples 132–133.

In some embodiments of the present invention, it is desired to maximize the transmission and/or minimize the specular reflection for certain polarizations of light. In these embodiments, the optical body may comprise two or more layers in which at least one layer comprises an antireflection system in close contact with a layer providing the continuous and disperse phases. Such an anti-reflection system acts to reduce the specular reflection of the incident light and to increase the amount of incident light that enters the portion of the body comprising the continuous and disperse layers. Such a function can be accomplished by a variety of means well known in the art. Examples are quarter wave anti-reflection layers, two or more layer anti-reflective stack, graded index layers, and graded density layers. Such anti-reflection functions can also be used on the transmitted light side of the body to increase transmitted light if desired.

Anti-Fog Layers

The films and other optical devices made in accordance with the invention may be provided with a film or coating which imparts anti-fogging properties. In some cases, an anti-reflection layer as described above will serve the dual purpose of imparting both anti-reflection and anti-fogging properties to the film or device. Various anti-fogging agents are known to the art which are suitable for use with the present invention. Typically, however, these materials will substances, such as fatty acid esters, which impart hydrophobic properties to the film surface and which promote the formation of a continuous, less opaque film of water.

Coatings which reduce the tendency for surfaces to "fog" have been reported by several inventors. For example, U.S. Pat. No. 3,212,909 to Leigh discloses the use of ammonium soap, such as alkyl ammonium carboxylates in admixture with a surface active agent which is a sulfated or sulfonated fatty matterial, to produce a anti-fogging composition. U.S. Pat. No. 3,075,228 to Elias discloses the use of salts of sulfated alkyl aryloxypolyalkoxy alcohol, as well as alkylbenzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994] 41,335 discloses a clouding and drip preventive composition comprising colloidal alumina, colloidal silica and an anionic surfactant. U.S. Pat. No. 4,478,909 (Taniguchi et al) discloses a cured anti-fogging coating film which comprises polyvinyl alcohol, a finely divided silica, and an organic silicon compound, the carbon/silicon weight ratio apparently ebing important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. World Patent No. PCT 96/18,691 (Scholtz et al) discloses means by which coatings may impart both anti-fog and anti-reflective properties.

UV Protective Layers

The films and optical devices of the present invention may be protected from UV radiation through the use of UV stabilized films or coatings. Suitable UV stabilized films and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such films or coatings will be particularly important when the optical films and devices of the present invention are used in outdoor applications or in luminaires where the source emits significant light in the UV region of the spectrum.

Surface Treatments

The films and other optical devices made in accordance with the present invention may be subjected to various treatments which modify the surfaces of these materials, or any portion thereof, as by rendering them more conducive to subsequent treatments such as coating, dying, metallizing, or lamination. This may be accomplished through treatment with primers, such as PVDC, PMMA, epoxies, and aziridines, or through physical priming treatments such as corona, flame, plasma, flash lamp, sputter-etching, e-beam treatments, or amorphizing the surface layer to remove crystallinity, such as with a hot can.

Lubricants

Various lubricants may be used during the processing (e.g., extrusion) of the films of the present invention. Suitable lubricants for use in the present invention include calcium sterate, zinc sterate, copper sterate, cobalt sterate, molybdenum neodocanoate, and ruthenium (III) acetylacetonate.

Antioxidants

Antioxidants useful in the present invention include 4,4'-thiobis-(6-t-butyl-m-cresol), 2,2'-methylenebis-(4-methyl-6-t-butyl-butylphenol), octadecyl-3,5-di-t-butyl-4-hydroxyhydrocinnamate, bis-(2,4-di-t-butylphenyl) pentaerythritol diphosphite, Irganox™ 1093 (1979)(((3,5-bis(1,1-dimethylethyl)-4-hydroxyphenyl)methyl)-dioctadecyl ester phosphonic acid), Irganox™ 1098 (N,N'-1,6-hexanediylbis(3,5-bis(1,1-dimethyl)-4-hydroxy-benzenepropanamide), Naugaard™ 445 (aryl amine), Irganox™ L 57 (alkylated diphenylamine), Irganox™ L 115 (sulfur containing bisphenol), Irganox™ LO 6 (alkylated phenyl-delta-napthylamine), Ethanox 398 (flourophosphonite), and 2,2'-ethylidenebis(4,6-di-t-butylphenyl)fluorophosnite.

A group of antioxidants that are especially preferred are sterically hindered phenols, including butylated hydroxytoluene (BHT), Vitamin E (di-alpha-tocopherol), Irganox™ 1425WL(calcium bis-(O-ethyl(3,5-di-t-butyl-4-hydroxybenzyl))phosphonate), Irganox™ 1010 (tetrakis (methylene(3,5,di-t-butyl-4-hydroxyhydrocinnamate)) methane), Irganox™ 1076 (octadecyl 3,5-di-tert-butyl-4-hydroxyhydrocinnamate), Ethanox™ 702 (hindered bis phenolic), Etanox 330 (high molecular weight hindered phenolic), and Ethanox™ 703 (hindered phenolic amine).

Dyes, Pigments, Inks, and Imaging Layers

The films and optical devices of the present invention may be treated with inks, dyes, or pigments to alter their appearance or to customize them for specific applications. Thus, for example, the films may be treated with inks or other printed indicia such as those used to display product identification, advertisements, warnings, decoration, or other information. Various techniques can be used to print on the film, such as screenprinting, letterpress, offset, flexographic printing, stipple printing, laser printing, and so forth, and various types of ink can be used, including one and two component inks, oxidatively drying and UV-drying inks, dissolved inks, dispersed inks, and 100% ink systems.

The appearance of the optical film may also be altered by coloring the film, such as by laminating a dyed film to the optical film, applying a pigmented coating to the surface of the optical film, or including a pigment in one or more of the materials (e.g., the continuous or disperse phase) used to make the optical film.

Both visible and near IR dyes and pigments are contemplated in the present invention, and include, for example, optical brighteners such as dyes that absorb in the UV and fluoresce in the visible region of the color spectrum. Other additional layers that may be added to alter the appearance of the optical film include, for example, opacifying (black) layers, diffusing layers, holographic images or holographic diffusers, and metal layers. Each of these may be applied directly to one or both surfaces of the optical film, or may be a component of a second film or foil construction that is laminated to the optical film. Alternately, some components such as opacifying or diffusing agents, or colored pigments, may be included in an adhesive layer which is used to laminate the optical film to another surface.

The films and devices of the present invention may also be provided with metal coatings. Thus, for example, a metallic layer may be applied directly to the optical film by pyrolysis, powder coating, vapor deposition, cathode sputtering, ion plating, and the like. Metal foils or rigid metal plates may also be laminated to the optical film, or separate polymeric films or glass or plastic sheets may be first metallized using the aforementioned techniques and then laminated to the optical films and devices of the present invention.

Dichroic dyes are a particularly useful additive for many of the applications to which the films and optical devices of the present invention are directed, due to their ability to absorb light of a particular polarization when they are molecularly aligned within the material. When used in a film or other material which predominantly scatters only one polarization of light, the dichroic dye causes the material to absorb one polarization of light more than another. Suitable dichroic dyes for use in the present invention include Congo Red (sodium diphenyl-bis-α-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN.

Other suitable dyes include the following materials:

(1)

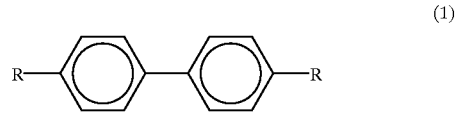

where R is

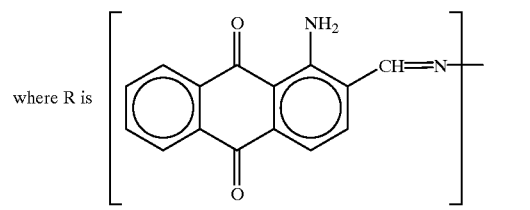

(2)

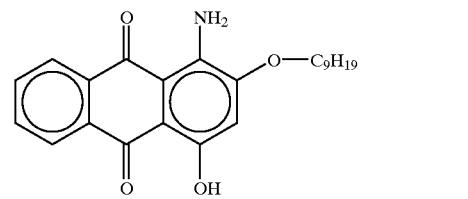

(3)

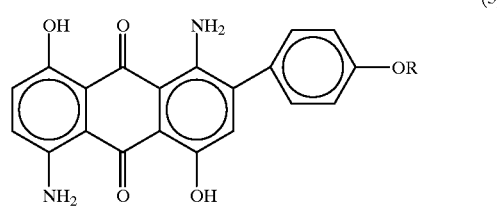

(4)

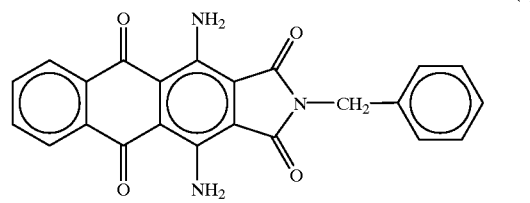

The properties of these dyes, and methods of making them, are discussed in the Kirk Othmer Encyclopedia of Chemical Technology, Vol. 8, pp. 652–661 (4th Ed. 1993), and in the references cited therein.

When a dichroic dye is used in the optical bodies of the present invention, it may be incorporated into either the continuous or disperse phase. However, it is preferred that the dichroic dye is incorporated into the disperse phase.

Dychroic dyes in combination with certain polymer systems exhibit the ability to polarize light to varying degrees. Polyvinyl alcohol and certain dichroic dyes may be used to make films with the ability to polarize light. Other polymers, such as polyethylene terephthalate or polyamides, such as nylon-6, do not exhibit as strong an ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light.

Molecular alignment of a dichroic dye within an optical body made in accordance with the present invention is preferably accomplished by stretching the optical body after the dye has been incorporated into it. However, other methods may also be used to achieve molecular alignment. Thus, in one method, the dichroic dye is crystallized, as through sublimation or by crystallization from solution, into a series of elongated notches that are cut, etched, or otherwise formed in the surface of a film or other optical body, either before or after the optical body has been oriented. The treated surface may then be coated with one or more surface layers, may be incorporated into a polymer matrix or used in a multilayer structure, or may be utilized as a component of another optical body. The notches may be created in accordance with a predetermined pattern or diagram, and with a predetermined amount of spacing between the notches, so as to achieve desirable optical properties.

In a related embodiment, the dichroic dye may be disposed within one or more hollow fibers or other conduits, either before or after the hollow fibers or conduits are disposed within the optical body. The hollow fibers or conduits may be constructed out of a material that is the same or different from the surrounding material of the optical body.

In yet another embodiment, the dichroic dye is disposed along the layer interface of a multilayer construction, as by sublimation onto the surface of a layer before it is incorporated into the multilayer construction. In still other embodiments, the dichroic dye is used to at least partially backfill the voids in a microvoided film made in accordance with the present invention.

Adhesives

Adhesives may be used to laminate the optical films and devices of the present invention to another film, surface, or substrate. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

Additionally, the adhesives can contain additives such as tackifiers, plasticizers, fillers, antioxidants, stabilizers, pigments, diffusing particles, curatives, and solvents. When a laminating adhesive is used to adhere an optical film of the present invention to another surface, the adhesive composition and thickness are preferably selected so as not to interfere with the optical properties of the optical film. For example, when laminating additional layers to an optical polarizer or mirror wherein a high degree of transmission is desired, the laminating adhesive should be optically clear in the wavelength region that the polarizer or mirror is designed to be transparent in.

Other Additives

In addition to the films, coatings, and additives noted above, the optical materials of the present invention may also comprise other materials or additives as are known to the art. Such materials include binders, coatings, fillers, compatibilizers, surfactants, antimicrobial agents, foaming agents, reinforcers, heat stabilizers, impact modifiers, plasticizers, viscosity modifiers, and other such materials.

General Applications of Present Invention

The optical bodies of the present invention are particularly useful as diffuse polarizers. However, optical bodies may also be made in accordance with the invention which operate as reflective polarizers or diffuse mirrors. In these applications, the construction of the optical material is similar to that in the diffuser applications described above. However, these reflectors will generally have a much larger difference in the index of refraction along at least one axis. This index difference is typically at least about 0.1, more preferably about 0.15, and most preferably about 0.2.

Reflective polarizers have a refractive index difference along one axis, and substantially matched indices along another. Reflective mirror films, on the other hand, differ in refractive index along at least two in-film plane orthogonal axes. However, the reflective properties of these embodiments need not be attained solely by reliance on refractive index mismatches. Thus, for example, the thickness of the films could be adjusted to attain a desired degree of reflection. In some cases, adjustment of the thickness of the film may cause the film to go from being a transmissive diffuser to a diffuse reflector.

The present optical body can also incorporate features to enable it to perform functions in addition to polarization of visible light. In particular, the optical body can be constructed out of PEN or similar materials which are good ultraviolet filters and which absorb ultraviolet light efficiently up to the edge of the visible spectrum. The optical body can also be used as a thin infrared sheet polarizer.

Fenestrations

The optical films and devices of the present invention are suitable for use in fenestrations, such as skylights or privacy windows, where diffuse transmission of light is desirable and transparency or clarity of the fenestration is either unnecessary or undesirable. In such applications, the optical films of the present invention may be used in conjunction with, or as components in, conventional glazing materials such as plastic or glass. Glazing materials prepared in this manner can be made to be polarization specific, so that the fenestration is essentially transparent to a first polarization of light but substantially reflects a second polarization of light, thereby eliminating or reducing glare. The physical properties of the optical films can also be modified as taught herein so that the glazing materials will reflect light of one or both polarizations within a certain region of the spectrum (e.g., the UV region), while transmitting light of one or both polarizations in another region (e.g., the visible region).

The optical films of the present invention may also be used to provide decorative fenestrations which transmit light of specific wavelengths. Such fenestrations may be used, for example, to impart a specific color or colors to a room (e.g., blue or gold), or may be used to accent the decor thereof, as through the use of wavelength specific lighting panels.

The optical films of the present invention may be incorporated into glazing materials in various manners as are known to the art, as through coating or extrusion. Thus, in one embodiment, the optical films are adhered to all, or a portion, of the outside surface of a glazing material, either by lamination or with the use of an optical adhesive. In another embodiment, the optical films of the present invention are sandwiched between two panes of glass or plastic, and the resulting composite is incorporated into a fenestration. Of course, the optical film may be given any additional layers or coatings (e.g., UV absorbing layers, antifogging layers, or antireflective layers) as are described herein to render it more suitable for the specific application to which it is directed.

Light Fixtures

The optical films of the present invention may be used in various light fixture applications, especially those in which polarized emitted light is preferred. A typical light fixture contains a light source and various other elements which may include a reflective element (typically placed behind the light source), a polarizing element (typically positioned at the output of the light fixture), and a diffusing element that obscures the light source from direct viewing. These elements may be arranged in various configurations within a housing as dictated by aesthetic and/or functional considerations.

The light sources most suitable for use with the optical films of the present invention are diffuse light sources which emit light having a high degree of scatter or randomization with respect to both polarization and direction. Such diffuse sources preferably include a light emitting region and a light reflecting, scattering, and/or depolarizing region. Depending upon the particular application to which the light fixture is directed, the diffuse source may be a fluorescent lamp, an incandescent lamp, a solid-state source or electroluminescent (EL) light source, or a metal halide lamp. The source may also be a randomizing, depolarizing surface used in combination with a point light source, a distant light source, or even solar illumination, the later being transmitted to the diffuse polarizer by free space propagation, a lens system, a light pipe, a polarization preserving light guide, or by other means as are known to the art.

In a fluorescent lamp, such as a hot or cold cathode lamp of the type used in a typical backlit LCD, the light emitting region and the light reflecting, scattering, and depolarizing regions are combined into the phosphors, which serve all of these functions. In the case where a highly collimated beam of light is desired, the reflective polarizing element can be optically configured to image the rejected polarization back onto the light emitting region, which will typically be a filament or arc. The light emitting region may serve both as the light source and the depolarizing region. Alternately, the light source may comprise a light emitting region and a separate randomizing reflector.

As described previously, the optical films of the present invention may be either a diffuse reflecting polarizing film (DRPF), in which light of one plane of polarization is transmitted and light of the other plane of polarization is diffusely reflected, or it may be a diffuse reflecting mirror film (DRMF) in which both planes of polarization are diffusely reflected from the film. As such, the optical film of the present invention may be used in a light fixture as the reflective element and/or the polarizing element. Since the film is diffusely reflective and optically translucent, a separate diffusing element is not necessary and the present optical film can function as both the diffusing element and the polarizing element.

Optical films of the present invention may be used in conventional luminairies that use louvers both to direct the light as well as to obscure the light source from direct view. If films of the present invention are laminated or otherwise juxtaposed to conventionally mirrored louvers, then one polarization of light could be diffusely reflected, whereas the second polarization of light could be directed (e.g., nearly vertically) to minimize glare throughout the illuminated area.

One could envision the use of at least two pieces of optical film of the present invention, where one is rotatable with respect to the other, used in lighting fixtures so that the intensity and/or degree of polarized light could be controlled or tuned for the specific needs of the immediate environment.

For those applications where polarized light is not required, such as in the typical luminaires used for office lighting, the light fixture generally consists of a housing containing a light source, such as a fluorescent bulb, a reflecting element behind the light source, and a diffusing element. The source may be any of the light sources noted above (e.g., a fluorescent lamp). The reflecting element may be any reflective surface, including, for example, a painted white reflector, a metallized film such as Silverlux™ brand reflective film (available commercially from 3M Company, St. Paul, Minn.), a reflective metal surface such as polished aluminum, or a reflective multilayered, birefringent mirror film such as that described in WO 95/17303 and WO 96/19347 and incorporated herein by reference. In one embodiment, the DRMF of the present film as herein described may be used as the reflective element in a non-polarized light fixture. The DRMF may additionally be metallized either by vapor coating or laminating a reflective metal to the back side of the DRMF to improve total reflectivity.

Many applications require polarized light to function properly. Examples of such an applications include optical displays, such as liquid crystal displays (LCDs), which are widely used for lap-top computers, hand-held calculators, digital watches, automobile dashboard displays and the like, and polarized luminaires and task lighting which make use of polarized light to increase contrast and reduce glare. For applications where polarized light is desired, the light fixture generally consists of a housing containing a light source and a polarizing element, and may additionally include a reflecting element and/or a diffusing element. The light source may be any of the light sources described above (e.g., a fluorescent lamp), but is preferably a diffuse light source which emits light having a high degree of scatter or randomization with respect to both polarization and direction. The reflecting element, if present, may be any of the reflective materials described above, or may also be the BRMF of the present invention. The polarizing element may include any polarizer, including absorbing dichroic, thin film dielectric or cholesteric polarizers, but is preferably the multilayer birefringent reflective polarizer described in WO 95/17303 and WO 96/19347.

Absorptive polarizers typically use dichroic dyes which transmit light of one polarization orientation more strongly than the orthogonal polarization orientation. When an absorptive polarizer is used in a display or polarized light fixture, for example, the absorbed light does not contribute to the illumination, and thus to the overall brightness, of the LCD or luminaire. The use of such polarizers in lighting applications is described in U.S. Pat. Nos. 3,124,639 (Kahn), 3,772,128 (Kahn), and 4,796,160 (Kahn), and in U.S. Pat. Nos. 5,184,881 (Karpen) and 5,359,498 (Karpen). Vacuum deposited, thin film dielectric polarizers are not absorbing, as are dichroic polarizers, but do suffer other disadvantages, such as poor angular response and poor spectral transmission for non-designed wavelengths. In addition, they are conventionally coated onto stable substrates, such as bulk optical glass or polymer substrates, and this may render them too bulky and heavy for use in lighting applications requiring light weight and small profile. For some lighting applications, these polarizers may be combined with a suitable light source and the DRMF of the present invention to provide a polarized light fixture.

The preferred reflective polarizers specularly transmit light of a desired polarization and reflect light of another polarization. Light produced by a diffuse source is randomly polarized and therefore has polarization components (a) and (b) present. This light is incident on the reflective polarizing element. The reflective polarizing element is adapted to transmit light having a first polarization component (polarization component (a) in this example), and reflect light having the orthogonal polarization component ((b) in this example). Consequently, light of polarization component (a) is transmitted by the reflective polarizing element, while light of polarization component (b) is reflected back into the light fixture where it is randomized. Some of the initially rejected light is thus converted into the desired polarization and is specularly transmitted through the reflective polarizing element. This process continues, and the repeated reflections and subsequent randomization of light of the undesired polarization increases the amount of light of the desired polarization that is emitted from the diffuse polarized light fixture. The result is a very efficient system for producing light of a desired polarization. The repeated reflections and randomizations effected by the combination of the diffuse source and the reflective polarizing element form an efficient mechanism for converting light from state (b) to state (a). The system is efficient in the sense that light which would otherwise have been absorbed, and therefore unavailable, is instead converted to the desired polarization. A light fixture using such a polarizing element thus makes much more efficient use of the light emitted from the source, since light of the rejected polarization is reflected back into the source and randomized. As a result, the total amount of light emitted from the fixture in the desired polarization is increased. The use of a multilayer birefringent reflective polarizing film (RPF) in lighting applications is described in applicants commonly assigned U.S. patent application Ser. Nos. 08/418,009 and 08/479,319, also incorporated herein by reference. These applications describe the use of the multilayer RPF in lighting applications, especially in LCD displays and polarized luminaires. The reflective polarizing element of these applications transmits light of a desired polarization and specularly reflects light of another polarization back into the diffuse source where it is randomized. When a multilayer RPF is used in this way, a separate diffuser film is typically used in luminaires or task lighting applications so that the light source is not directly visible. A reflective element is preferably also included in these polarized light fixtures, and the reflective element may comprise the BRMF of the present invention or any other suitable reflective surface that either randomizes the light reflected from the RPF or reflects the reflected light back into a diffusing source where it can be randomized and partially converted into the correct polarization to be transmitted by the polarizing element.

The DRPF of the present invention functions similar to the multilayer RPF to increase the amount of light of the desired polarization that is emitted by the polarized light fixture, however, the initially rejected light of the wrong polarization is diffusely reflected back into the light fixture where it may be randomized, partially converted to light of the correct polarization, and specularly transmitted through the polarizing element. The diffuse reflective polarizing film (DRPF) of the present invention is translucent so that a separate diffuser is not needed. When combined with the light source to make a diffuse reflecting polarized light fixture, a reflecting element is preferably also included to direct the reflected light back to the source and/or aid in the randomization and partial conversion of the reflected light into light of the correct polarization to be transmitted by the polarizing element. The reflecting element may be any suitable reflective material, as described above, and in particular may be the DRMF of the present invention. As such, the DRMF of the present invention may be used in one embodiment as the reflecting element and the DRPF of the present invention may be used as the polarizing element and/or the diffusing element.

In the light fixtures described herein, the light source may be coupled with the polarizing element and reflecting element in a variety of configurations. Some of the configurations will be described with respect to using the diffuse reflecting polarizing film (DRPF) of the present invention as the polarizing element and the diffuse reflecting mirror film (DRMF) of the present invention as the reflecting element, but it should be recognized that various combinations of DRPF with other materials as the reflecting element and DRMF with other materials as the polarizing element are envisioned. In one configuration, the DRPF may be wrapped around such that it completely encloses the diffuse source. A separate reflector may be used in addition to the light source and DRPF. The reflector may be a diffuse reflective film (DRMF) which randomizes the light of polarization (b) that is reflected from the DRPF, or it may be a specular reflector which redirects light to the light emitting region of a diffuse randomizing light source. The DRMF may be oriented around one side of the light source and may be laminated or otherwise attached to the light source. In this configuration, the DRPF may also be laminated or otherwise attached so that it partially encloses the other side of the light source.

The embodiments of the present polarized light source using the DRPF have several advantages. The reflection and randomization process achieved with the light source and DRPF gives a polarized light fixture that is very efficient. The broadband reflectivity provided by the DRPF means that efficiency is achieved over a broad spectral range. In addition, the DRPF provides high off-angle reflectivity of the rejected polarization. These features make the DRPF/diffuse source combination useful over a broader range of the optical spectrum and over a broader range of angles than the embodiments incorporating bulk optic components. In addition, the DRPF is lightweight, thin and flexible, which makes it good for applications requiring low bulk and light weight. The DRPF also conforms well to the lamp surface and could be incorporated into the lamp manufacture. Furthermore, since the DRPF is a diffuse reflector, its opaque appearance obviates the need for a separate diffuser film that is typically used in polarized luminaires and task lighting fixtures to obscure the light source from direct viewing.

In yet another application, optical films of the present invention may be used to generate polarized light used in smoke detection systems or in the analysis of the polarization of light scattered from smoke particles, including those smoke detection systems which attempt to define the nature or origin of the combustion as taught by U.S. Pat. No. 5,576,697 (Nagashima et al.).

Light Extractors

Figure 8:
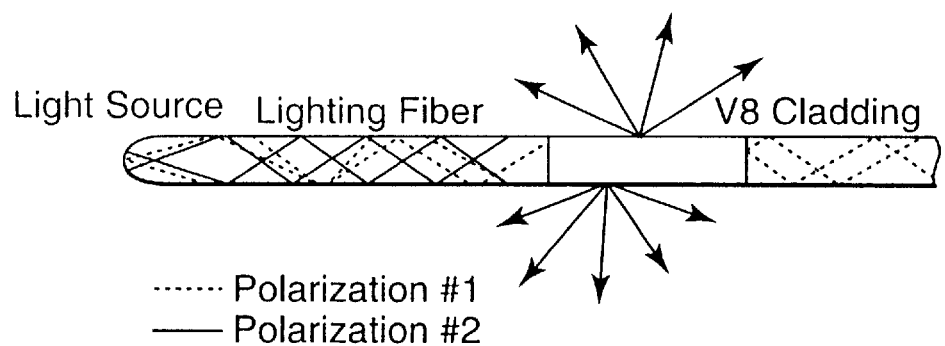
FIG. 8 is a schematic diagram illustrating the use of the films of the present invention as high efficiency light extractors for optical fibers.

The optical films of the present invention may be used as light extractors in various optical devices, including light guides such as the Large Core Optical Fiber (LCOF) illustrated in FIG. 8. The LCOF 50 uses very efficient total internal reflection (TIR) to guide light substantial distances from an illuminator or light source 52. However, when the optical films of the present invention are applied as an external cladding 54, they upset the light guiding at the fiber-to-air interface, thereby ejecting light out into the surroundings. This feature may be used advantageously in various remote source lighting applications, such as architectural highlighting, decorative lighting, medical lighting, signage, visual guidance (e.g., on landing strips or in aisles for airplanes or theatres), display (e.g., instrument displays, especially those in which excessive heating is a problem) and exhibit lighting, roadway lighting, automotive lighting, downlighting, task lighting, accent lighting, and ambient lighting. In some applications, the films of the present invention may be applied as a cladding at multiple locations along the length of the fiber, thereby illuminating multiple locations from a single light source. Furthermore, since these systems are commonly equipped with UV and IR filters, the lighting produced by such systems will not degrade UV sensitive materials, nor will the light guides heat up with use.

The films of the present invention can also be made to extract only a single polarization of light, thereby creating a polarization-specific source. With proper configuration of the light fiber system, substantially all of the light injected into the fiber will eventually make its way through the extractor in the desired polarization. Polarization-specific sources can be made, for example, by using an optical film of the present invention which is a strong diffuse scatterer for light of a first polarization, but is a non-scattering, specular material which maintains a total internal reflection (TIR) cladding-to-surface interface for light of a second polarization. Such a system is described in Example 134.

Suitable light guides for use in the present invention include both side emitting and end emitting fibers. The light guides themselves may be glass or plastic and may be of varying diameters, depending on such factors as the required efficiency at collecting light, required flexibility, and whether the light guides are to be used alone or in bundles. The light guides may also be fiber optic light guides or prism light guides, with the later being more suitable for large scale applications, and the former being more suitable for smaller scale applications where cost per lumen is less important.

Commercially available light guides that are suitable for use in the present invention include those made from films of low Tg acrylic polymers, such as the optical lighting film available commercially from 3M under the tradename Scotch Optical Lighting Film (SOLF). Such film, which acts like a mirror towards light striking it at certain angles, is a transparent plastic film which has a prismatic surface (typically microreplicated) on one side and a smooth surface on the other. The film is commonly used in conjunction with a tubing or backing of a transparent or opaque plastic or metal. Other suitable light guides include the linear illumination fiber optics available commercially from Lumenyte under the tradename Fiberescent™, and the end-emitting fibers available commercially from Fiberstars under the tradename FiberSpots™.

Various light sources may be used in conjunction with the light guides made in accordance with the present invention, depending on the application to which the light guide is directed. Such sources are described, for example, in *Lighting Futures*, Vol. 1, No. 3 (1995), a publication of the Lighting Research Center, Rensselaer Polytechnic Institute, Troy, N.Y. Typically, a low voltage 20–75 watt MR16 lamp used in conjunction with a fiber optic system will be suitable for applications such as museum, display and accent lighting, while a 70–250 watt metal halide lamp, used in conjunction with a fiber optic or prism light guide system, is suitable for applications such as architectural or outdoor lighting applications. For applications requiring 250 watts or greater, metal halide or high pressure sodium lamps may be used in conjunction with prism light guide systems. Other suitable light sources include 60 watt xenon metal halide lamps, commercially available from General Electric Company, Danbury, Conn., which are particularly useful for automotive applications, and sulfur lamps, commercially available from Fusion Lighting, Rockville, Md., which have been used successfully on an experimental basis in prism light guide systems. Compact and tubular fluorescent lamps may also be used where a larger diffuse light source is needed. Sunlight may also be used with fiber optic or prism light guide systems, and in conjunction with mirrors or lenses, as part of a sunlight harvesting system.

In some backlight display devices, such as those used in avionics applications where high levels of ambient light impinge on the front surface of the device, high intensities radiating from the display are required to provide sufficient contrast to the display. Consequently, excessive heating of the backlight assembly in such systems can occur unless means are provided to dissipate the unwanted heat. A variety of means are used in the art to eliminate the heat, such as the use of cold mirrors and filters and other means.

In most new aircraft, ambient sunlight potentially reduces contrast to the flat panel displays used, and spatial requirements for the ensemble of displays are critical desgin parameters. Therefore, in one form of the present invention, light is transported to the display(s) via fiber optics from a remotely located, but intense, source, where the latter can be cooled efficiently and the undesired heat not affect the operation of the display device. Since these displays typically work on the basis of polarized light propagating through a liquid crystal display, the optical films of the present invention may be used in such systems as light extractors of substantially one polarization. The second polarization would continue to reflect inside the optical fiber until its polarization is converted to the first polarization and can be emitted from the light extractor at the places where the light is needed.

The light directing material

Figure 14:
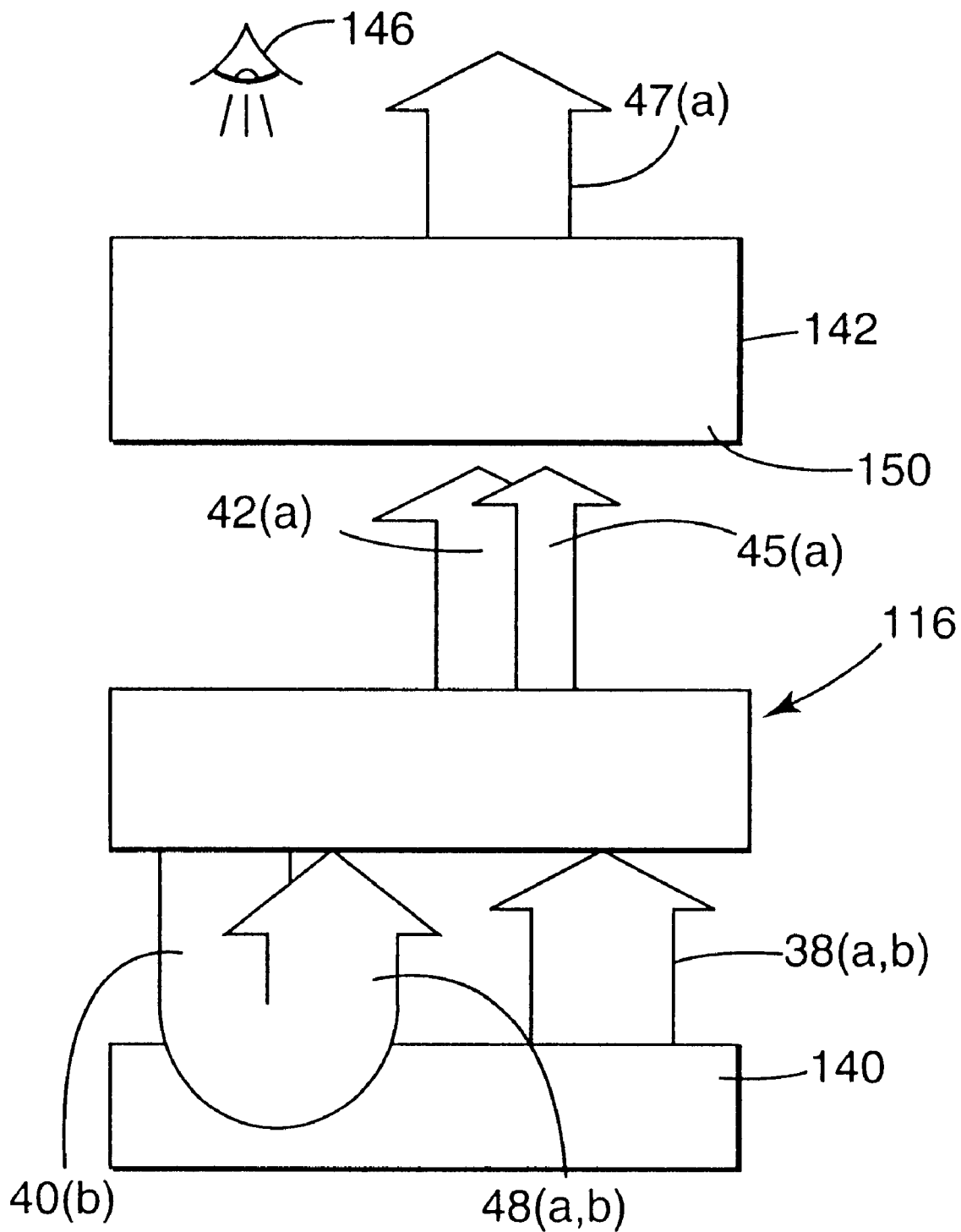
FIG. 14 shows a schematic side view of a display incorporating the diffusely reflecting specularly transmitting polarizer.

As described above with respect to FIGS. 4A and 4B, in one embodiment the optical body of the present invention demonstrates specular transmission of light polarized in the index match direction (in other words, perpendicular to the oriented direction), and diffuse reflection of light polarized in the index mismatch direction (in other words, parallel to the oriented direction). The diffuse polarizer of the present invention, or any other polarizer exhibiting this same functionality, can thus be referred to as a diffusely reflecting, specularly transmitting (DRST) polarizer. A DRST polarizer has utility in polarized light fixtures and liquid crystal displays (LCDs). An exemplary embodiment of such a display incorporating a DRST polarizer is described in more detail below with respect to FIG. 14.

A DRST polarizer can also be combined with light directing materials to produce desirable effects. These combined direction control polarizers, as they will hereinafter be referred to, are also advantageous for use in LCD applications as well as lighting fixtures such as the luminaires used in office lighting and task lighting.

The purpose of light directing material is to enable light which would have exited at angles where light is not useful in certain applications, or light having the wrong polarization to be used by the light fixture or LCD module, to be redirected or recycled into angles and polarizations that are useful. For many applications, such as in a LCD, for example, it is generally desirable that light be emitted generally toward the direction of a user. Thus, light exiting the LCD at very shallow angles to the plane of the LCD is not useful, as a user is typically not in such a position to view the display. It is desirable, therefore, to somehow redirect or recycle this light into a useable viewing zone. This is the function of the light directing material.

Figure 10:
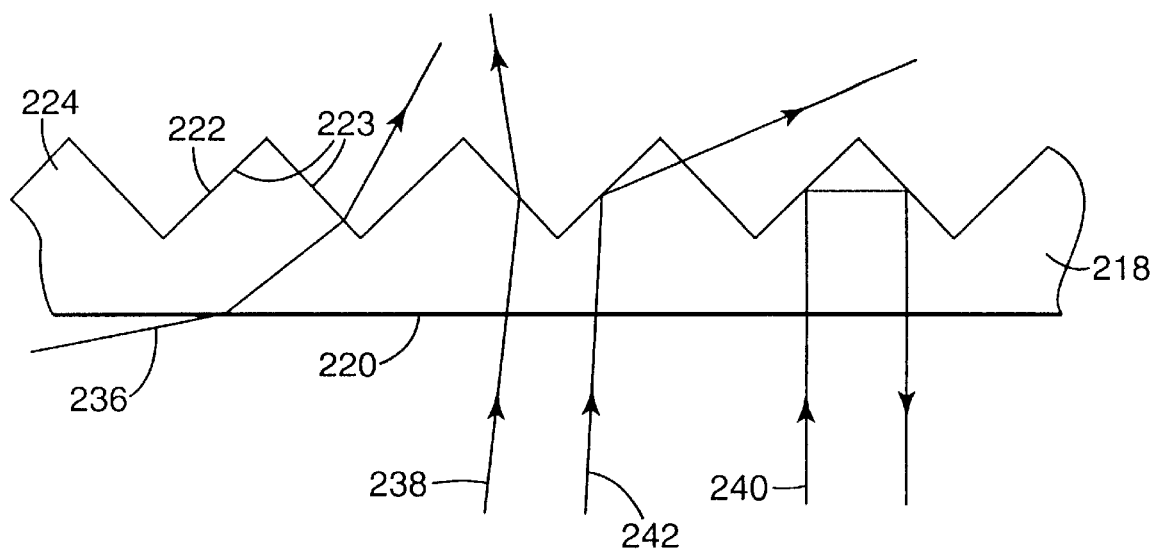
FIG. 10 shows a side view of one preferred light directing material.
Figure 11:
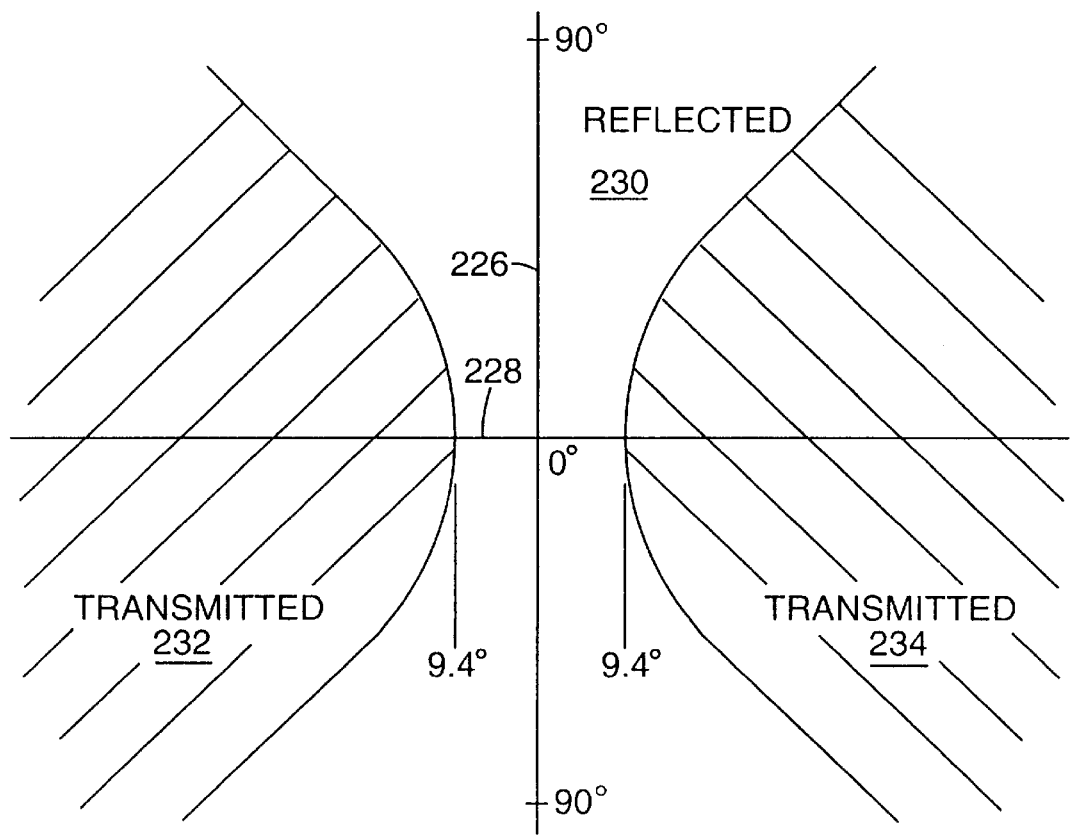
FIG. 11 shows a graph illustrating the performance of the preferred light directing material shown in FIG. 10.

The preferred light directing material 113 will now be described with respect to FIGS. 10 and 11. FIG. 10 shows a side view of one preferred light directing material, while FIG. 11 shows a graph illustrating the performance of the preferred light directing material shown in FIG. 10.

FIG. 10 is an enlargement of a structured surface material that is the preferred embodiment of the light directing material in the present invention. Structured surface material 218 has a smooth side 220 and a structured side 222. Structured side 222 includes a plurality of structures, such as structure 224. Several different structure types are possible. For example, the structures can be isosceles prisms, such as those shown in FIG. 10, saw tooth structures, structures having rounded peaks and/or rounded valleys (such as those described in U.S. Pat. Nos. 5,394,255 and 5,552,907) or other structure shapes as needed for the particular final application in which the light directing material will be used.

The preferred included angle 223 of the structure will vary depending upon where the light is to be directed in the final application of the light directing material. Generally, included angles in the range of 60–120 degrees are preferred, with included angles in the ranges of 70–100 degrees, 80–90 degrees, 85–95 degrees or about 90 degrees being preferred for different applications.

Structured surface material 218 may be made of any transparent material having an index of refraction greater than that of air, but, in general, the materials with higher indices of refraction are preferred. Polycarbonate, which has an index of refraction of 1.586, has shown to work very effectively.

Exemplary structured surface materials which may be appropriate for different applications include Brightness Enhancement Film (BEF I or BEF II), Transparent Right Angle Film (TRAF), Optical Lighting Film (OLF or SOLF), or Diamond Grade Sheeting, all of which are available from the assignee of the present invention, Minnesota Mining and Manufacturing Company (3M) St. Paul, Minn. Other exemplary structured surface materials include the rounded peak/valley films described in the above-mentioned U.S. Pat. Nos. 5,394,255 and 5,552,907, available from Sekisui Chemical Co. Ltd., Japan.

Although any of the above variations of the light directing material may be appropriate or preferred for different end uses, for purposes of illustration, the structured surface material 218 will be assumed to made of polycarbonate and include isosceles prism shaped structures having included angles of between 85–95 degrees.

FIG. 11 illustrates the operation of the illustrative structured surface material 218. FIG. 11 is a graph having two axes 226 and 228. These axes represent the angle that a light ray makes to a normal to smooth surface 220. Specifically, axis 226 represents the angle that the light ray makes when the direction of the light ray is projected into a plane parallel to the linear extent of the structures on structured surface 222. Similarly axis 228 represents the angle that the light ray makes to a normal to smooth surface 220 when the direction of the light ray is projected into a plane perpendicular to the linear extent of the structures on structured surface 222. Thus a light ray striking perpendicular to smooth surface 220 would be represented by the origin, labeled 0 degrees, of the graph of FIG. 8. As may be seen, FIG. 8 is divided into regions 230, 232, and 234. Light striking at angles that fall within region 230 will enter structured surface material 218 but be totally internally reflected by structured surface 222 so that they pass through smooth surface 220 a second time and reenter the optical cavity. Light rays striking smooth surface 220 at an angle such that they fall in region 232 or 234 will be transmitted but refracted to a different angle with respect to the normal. As may be seen from FIG. 8, which represents the performance of polycarbonate with a 90 degree included prism angle, any light ray striking smooth surface 220 at an angle of less than 9.4 degrees to the normal, will be reflected. The angle to the normal to smooth surface 220 below which rays striking smooth surface 220 are reflected by optically structured material 213 will hereinafter be called the cutoff angle.

Returning to FIG. 10, four exemplary light rays are shown emanating from an optical cavity, which is not shown. The first, light ray 236, approaches smooth surface 220 at a grazing angle, i.e., an angle to the normal approaching 90 degrees. If light ray 236 makes an angle of 89.9 degrees to the normal to surface 220 when it strikes structured surface material 218, it will be refracted such that it makes an angle of 39.1 degrees to the normal as it travels through structured surface material 218. Upon reaching structured surface 222, it will be refracted again. Because of the structures on structured surface 222, it will be refracted so that again it will make a smaller angle to the normal to structured surface 220. In the example it will make an angle of 35.6 degrees.

Light ray 238 approaches smooth surface 220 at an angle much closer to the cut off angle. It also is refracted as it passes through smooth surface 220, but to a lesser extent. If light ray 238 approaches smooth surface 220 at an angle of 10 degrees to the normal to smooth surface 220, it will emerge from structured surface 222 at an angle of 37.7 degrees to the normal to smooth surface 220 but on the opposite side of that normal.

Light ray 240 approaches at an angle less than the cut off angle and is totally internally reflected twice by structured surface 222 and exits back out the smooth side 220.

Finally, light ray 242 approaches smooth surface 220 at an angle similar to that of light ray 238, but in a location such that it is totally internally reflected by one side of a prism on structured surface 222 but not by the second side. As a result it emerges at a large angle to the normal to smooth surface 220. Because such a reflection only occurs to a light ray that is travelling in a direction that forms a high incidence angle to the side it strikes, the prisms provide a very small cross section to such rays.

A fifth class of light ray is not shown in FIG. 10. This is the set of light rays that are reflected by smooth surface 220 and do not enter structured surface material 218. Such light rays simply join the others that are reflected back into the optical cavity. As may be seen from this discussion, light that, absent structured surface material 218, would have emerged from the display at a high angle to the axis of the display, where the axis of the display is taken to be the normal to smooth surface 220, is redirected into a direction closer to that axis. A small amount of light will be directed out at a large angle to the axis. Thus, we may say that light that enters structured surface material 218 through smooth surface 220 with an angle of incidence greater than a predetermined angle is directed into an output wedge that is narrower than the input wedge and the majority of the light that enters structured surface material 218 through smooth surface 220 at an angle of incidence of less than that predetermined angle will be reflected back out the smooth side 220 of the structured surface material 218.

Although the preferred structured surface material 218 functions as a geometric optic, it is well known that diffractive or holographic optical elements may be designed to effectively mimic the light directing qualities exhibited by geometric optics. Therefore the term structured surface should be understood to include both geometric and diffractive optical systems that serve to transmit light within a desired angular zone and to reflect light which would not exit the light directing film within a desired angular zone.

The direction control polarizer

Figure 12A:
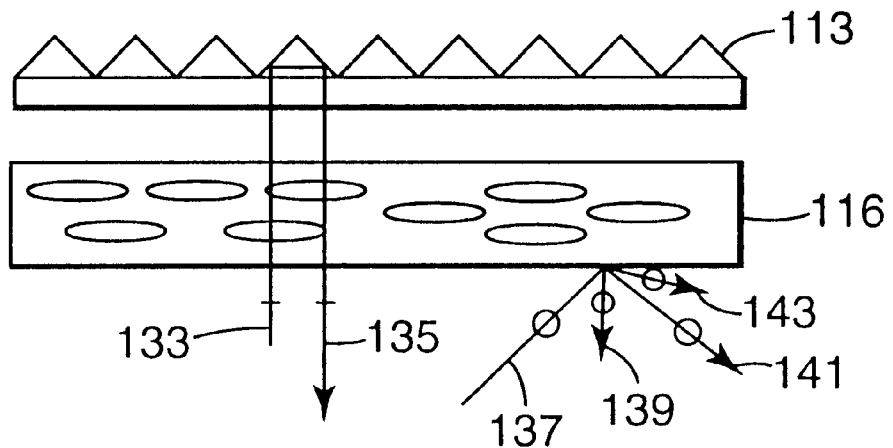
FIGS. 12A and 12B show the reflectance and the transmittance properties, respectively, of a a first preferred embodiment of the direction control polarizer.
Figure 12B:
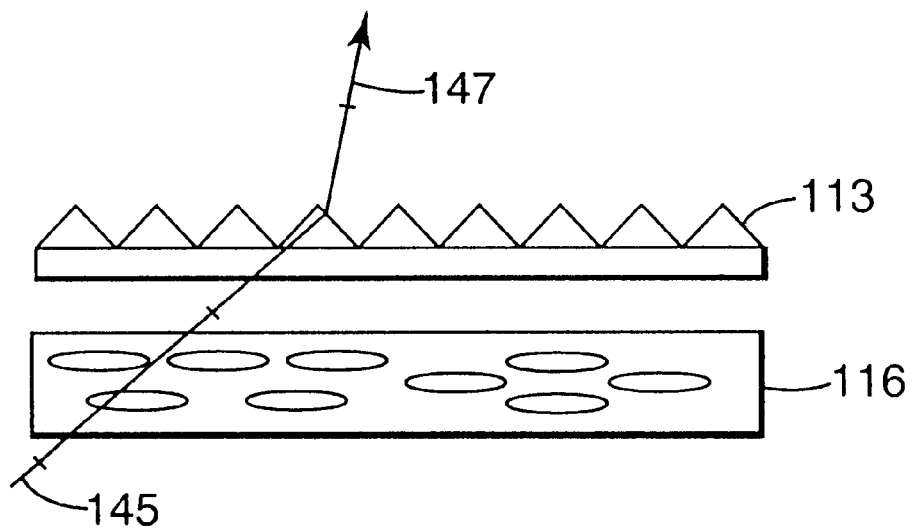

The combination of a DRST polarizer with the illustrative light directing material will now be described with respect to FIGS. 12A, 12B, 13A and 13B. FIGS. 12A and 12B show the reflectance and the transmittance properties, respectively, of a a first preferred embodiment of the direction control polarizer 110. In this embodiment, the DRST 116 is placed below the light directing material 113, and light is incident upon the combination from the DRST side. Due to the inherent polarizing nature of an array of structures, generally speaking, optimum performance is achieved when the axes of orientation of the prisms run parallel to the direction in which the DRST polarizer was oriented.

In FIG. 12A, ray 133 is of the polarization that is specularly transmitted by DRST 116, but is traveling in a direction such that it is totally internally reflected to become ray 135 by light directing material 113. Ray 137 is of the polarization that is diffusely reflected by DRST 116, and thus forms diffusely reflected reflected rays 139, 141 and 143.

In FIG. 12B, ray 145 is of the polarization that is specularly transmitted by DRST 116, and is traveling in a direction such that it is refracted to become ray 147 by light directing material 113. The result of the reflectances and transmittances shown in FIGS. 12A and 12B mean that light of one polarization is transmitted by the direction control polarizer, and that light that is transmitted is directed into a desired angular zone, whereas light of the other polarization is diffusely reflected, and light which would not exit the light directing material within the desired angular zone is also reflected.

Figure 13A:
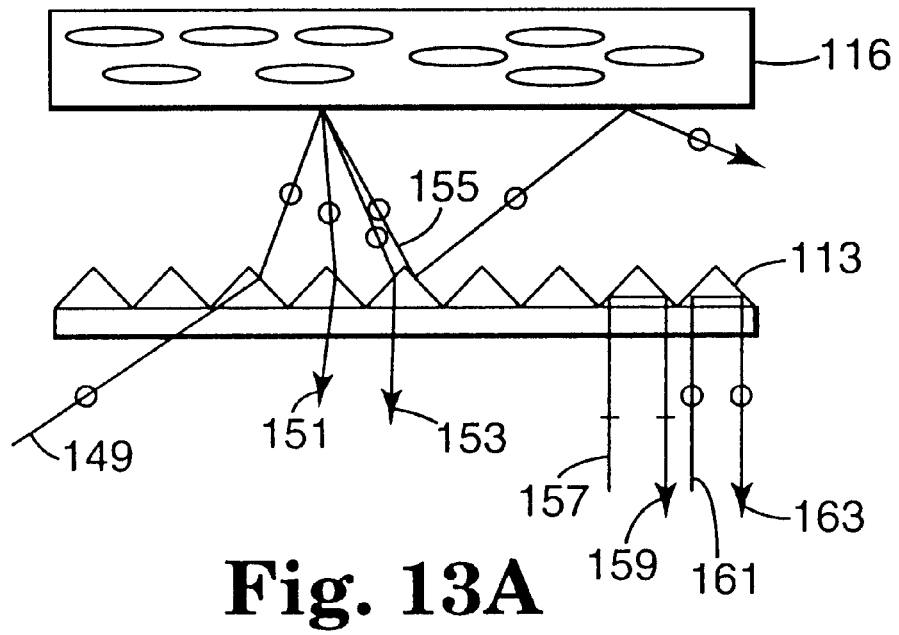
FIGS. 13A and 13B show the reflectance and the transmittance properties, respectively, of a second preferred embodiment of the direction control polarizer.
Figure 13B:
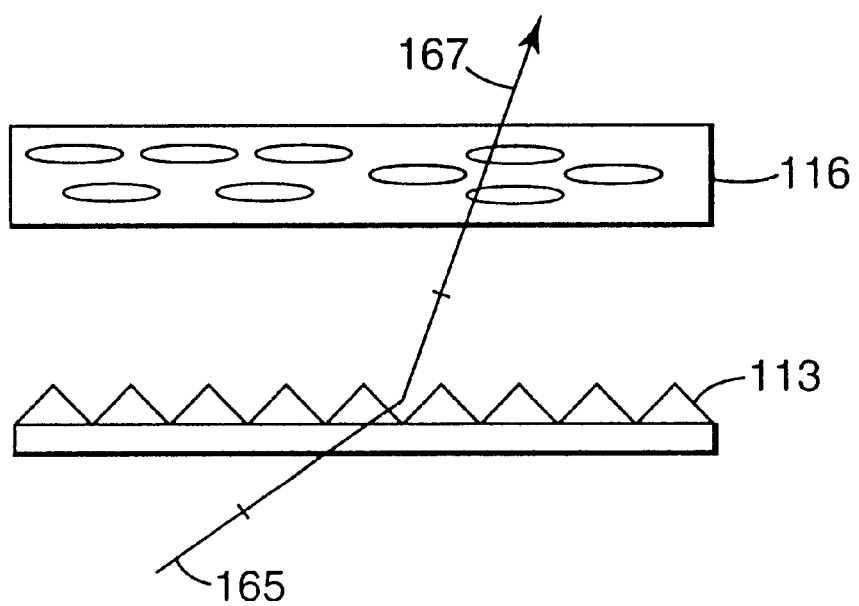

FIGS. 13A and 13B show the reflectance and the transmittance properties, respectively, of a second preferred embodiment of the direction control polarizer. In this embodiment, the DRST 116 is placed above the light directing material 113, and light is incident upon the combination from the smooth side of the light directing material 113. In FIG. 13A, ray 149 is traveling in a direction such that it is refracted by light directing material 113. However, ray 149 is also of the polarization that is diffusely reflected by DRST 116 into rays such as 151, 153 and 155. Rays 151 and 153 are scattered back toward the light directing material 113, and are incident upon the structured surface side at angles such that they are refracted through the structured side and exit out the smooth side. Ray 155 is scattered back toward light directing material 113. However, this ray is incident upon the structured side at an angle where it is completely reflected off of the structured surface back toward the DRST 116. Ray 155 is of the polarization that is diffusely reflected by DRST 116 (only one reflected ray is shown, however). The so-reflected ray is shown exiting out the side of the direction control polarizer and is one example of how some light can be "lost" in this embodiment of the direction control polarizer. Rays 157 and 159 strike light directing material 113 at angles below the cutoff angle, and are therefore reflected.

In FIG. 13B, ray 165 is traveling in a direction such that it is refracted by structured surface material 113. Ray 165 is also of the polarization that is specularly transmitted into ray 167 by DRST 116. The result of the reflectances and transmittances shown in FIGS. 13A and 13B mean that light of one polarization is transmitted by the direction control polarizer, and that light that is transmitted is directed into a desired angular zone, whereas light of the other polarization is diffusely reflected, and light which would not exit the light directing material within the desired angular zone is also reflected.

Displays incorporating the DRST and the direction control polarizer

Several display configurations incorporating the DRST polarizer alone or the direction control polarizers described above are possible. A side view of one such display incorporating the DRST polarizer is shown schematically in FIG. 14. This display includes a display module 142, DRST polarizer 116 and optical cavity 140. Preferably, the optical cavity is a diffusely reflecting optical cavity such as a light guide coated with diffusely reflecting dots, an electroluminescent panel, or by other technicques known in the art. Light that is emitted by the optical cavity is illustrated by ray bundle 38. This ray bundle is incident on the DRST polarizer 116 which specularly transmits light having a first polarization orientation referred to as "(a)" and diffusely reflects light having the orthogonal polarization orientation "(b)". Consequently, a certain amount of light, depicted by ray bundle 42, will be transmitted by the DRST polarizer 116 while the remaining light will be reflected as indicated by ray bundle 40.

The light having polarization state (b) reflected by the DRST polarizer 116 reenters the optical cavity 140 where it strikes the diffusely reflective surfaces within the optical cavity. The diffusely reflective surfaces within the optical cavity serve to alter the polarization state and the direction of at least some of the light reflected by the optical cavity 140. Thus, at least some of the light of polarization (b) reflected by the DRST polariazer 116 is converted to polarization (a) by the diffusely reflecting surfaces within the optical cavity. This recirculation, or recycling process is depicted as path 48. The multiple recirculations effected by the combination of the optical cavity 140 and the DRST polarizer 116 form an efficient mechanism for converting light from state (b) to state (a) for transmission of ray 45 by the DRST and ultimate transmission of rays 47 to the viewer 146.

Figure 15:
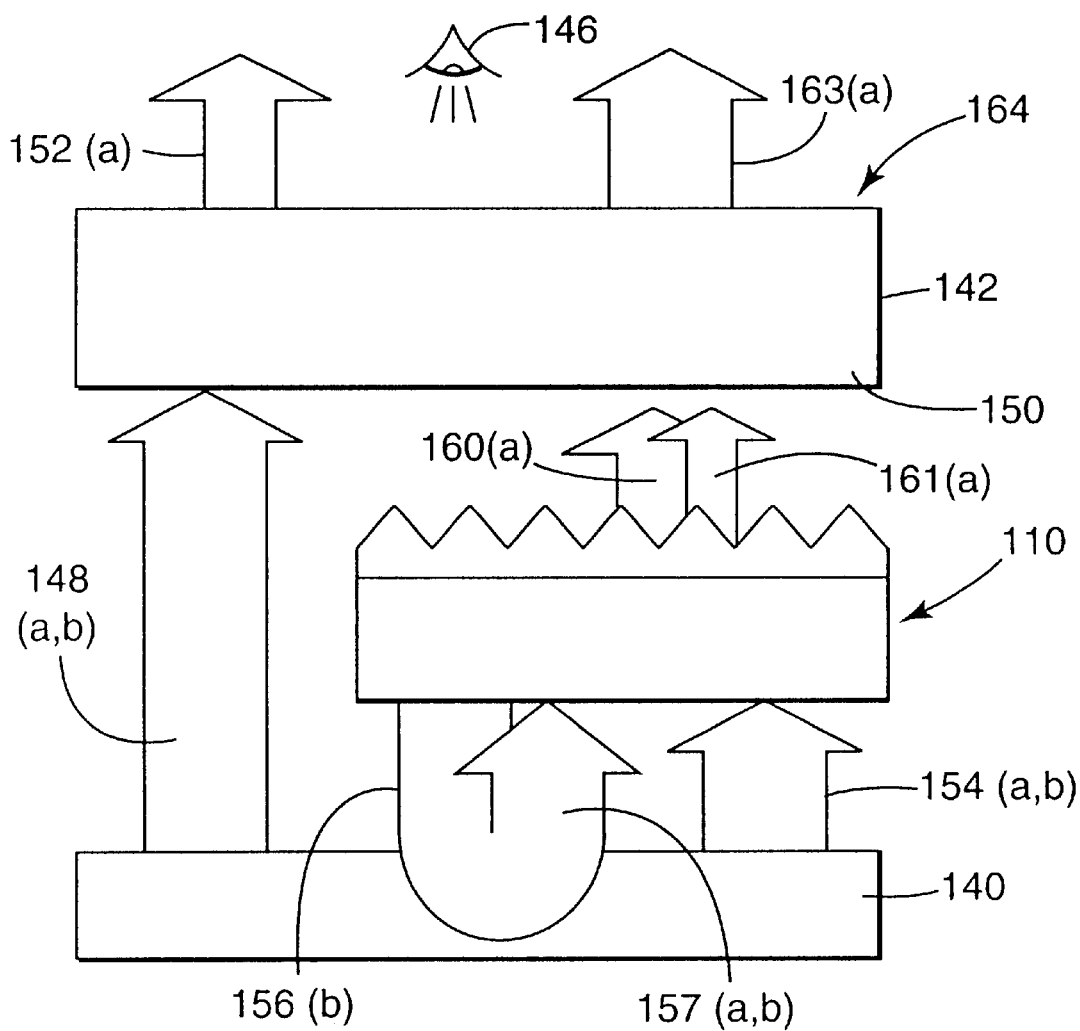
FIG. 15 shows a schematic side view of a display incorporating the first preferred embodiment of the direction control polarizer.

In another display embodiment, the apparent brightness of the display may be increased by the use of a direction control polarizer such as that described above with respect to FIGS. 12A, 12B, 13A and 13B. Such a display is shown schematically in FIG. 15. FIG. 15 shows a display 164 which has three primary components. These are the display module 142, the direction control polarizer 110 and the optical cavity 140.

The left half of FIG. 15 shows a portion of the display 164 without the direction control polarizer 110 material to permit a comparison of the displays performance with and without the direction control polarizer 110. In general, the light emerging from a unit area of the optical cavity 140 depicted by ray bundle 148 will be randomly polarized and will include both polarizations (a) and (b). Approximately half of this light, light of state (b), is absorbed by a dichroic absorptive polarizer 150 that forms a part of the display module 142. The remainder of the light, state (a), is passed through the dichroic absorptive polarizer 150 and is used to create the images on the display. The light emerging from the display module 142, depicted by ray bundle 152, thus contains light of states (a) only. However, only a portion of this light of state (a) is directed within an angular zone that is useful for the observer 146. Thus, less than half of the light provided by optical cavity 140 (the portion of state (a) that is within a useable angular zone of the observer actually contributes to the brightness of the display as viewed by observer 146.

The direction control polarizer operates to make more efficient use of the light made available by optical cavity 140. If the same unit amount of light, depicted by ray bundle 154, is directed to the direction control polarizer 110, light of state (a) will pass through the direction control polarizer 110 on the first pass. This light will have the correct polarization to match the transmission axis of the dichroic absorptive polarizer in the display module, and is depicted as ray bundle 161. The remaining light of state (b) will be reflected back into the optical cavity by the direction control polarizer 110.

At least some of this light reflected by the direction control polarizer will be altered in terms of polarization to state (a) and also in direction by the optical cavity 140. Thus, this light will emerge from the optical cavity with states (a) and (b) as indicted by ray bundle 157. The recirculated light of state (a) will then be added to the originally transmitted light as depicted by ray bundle 160. Thus, the total amount of light depicted by ray bundle 160 and ray bundle 161 is increased by this recirculation or recycling effect. Because only light of the correct polarization to match the transmission axis of the dichroic absorptive polarizer (state (a)) is passed through the direction control polarizer 110, much more of the light emitted from the display, depicted by ray bundle 163, is directed toward the observer 146. In addition, because light of state (b) is reflected by the direction control polarizer 110, very little is absorbed by the dichroic absorptive polarizer 150. The result is a display in which the amount of light emerging from the display, depicted by ray bundle 163, may be 70 percent brighter than the amount of light indicated by ray bundle 152.

Figure 16:
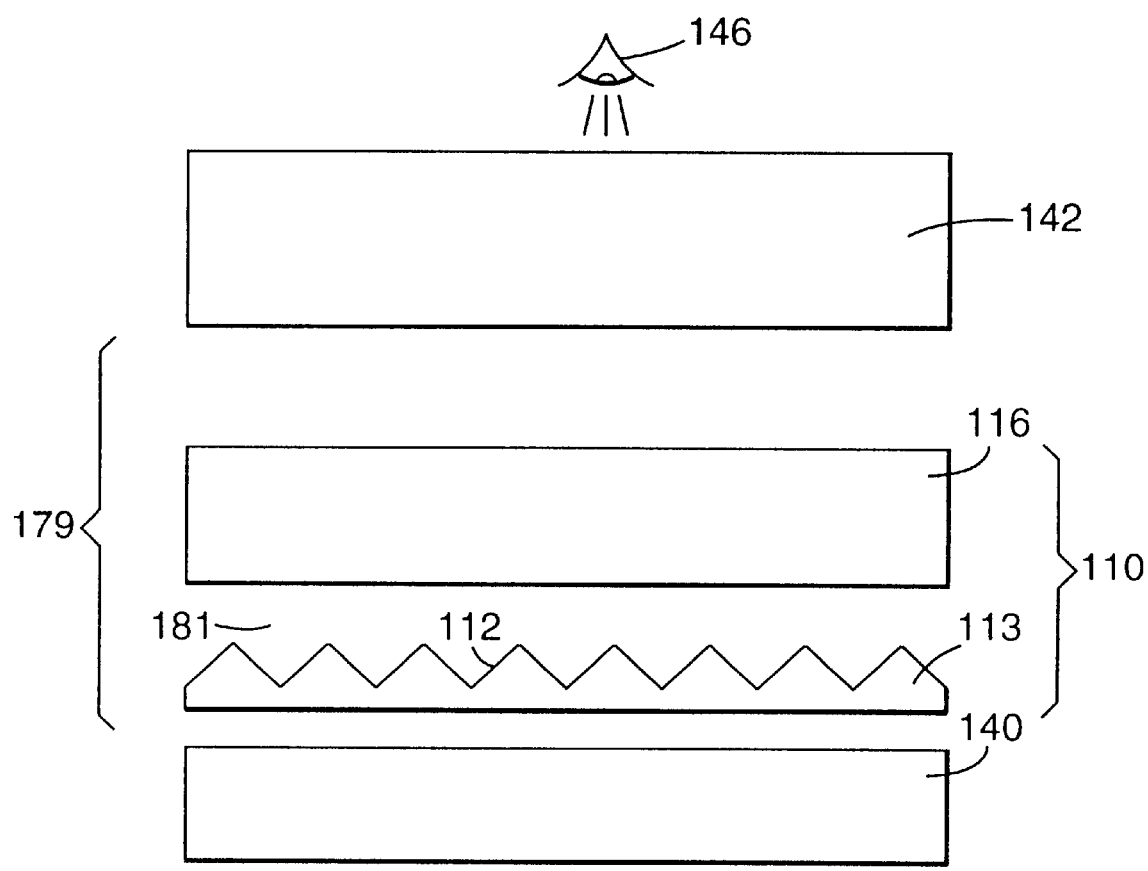
FIG. 16 shows a side view of a display incorporating the second preferred embodiment of the direction control polarizer.

FIG. 16 shows a display 179 where direction control polarizer 110 is incorporated into a liquid crystal display. Light directing material 113 is located between the optical cavity and the DRST polarizer 116 such that from the optical cavity is incident on the smooth side of the light directing material 113. Together these two components along with the gap 181 make up the direction control polarizer 110. In use, the optical cavity 140 will provide light for the display and will also act to reorient the polarization and direction of light returned from the direction control polarizer 110 as discussed above. One difference between the display embodiment shown in FIG. 16 and that of FIG. 15 is that light approaching the light directing material 113 at an angle less than the cuttoff angle 134 is returned to the optical cavity by total internal reflection regardless of its state of polarization (see FIG. 13A). Another difference is that the light trans-mitted by light directing material 113 passes through the DRST polarizer 116 at near normal angles (see FIG. 13B).

Figure 17:
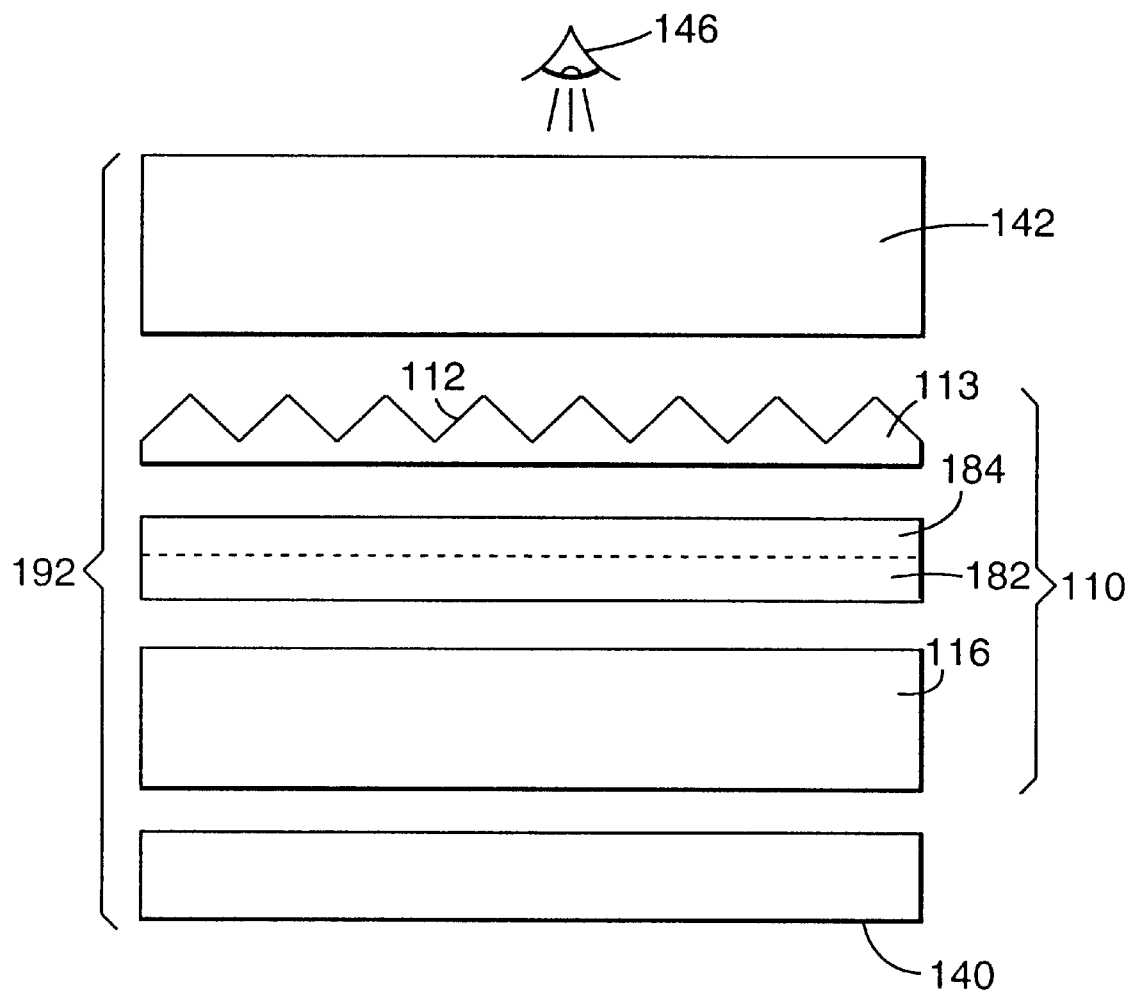
FIG. 17 shows a side view of a display incorporating the first preferred embodiment of the direction control polarizer and a second layer of light directing material.

Two dimensional control of the rays exiting the direction control polarizer can be achieved using the alternate preferred display configuration 192 shown in FIG. 17. There, two light directing materials 113 and 182, each having a structured surface 112 and 184, respectively, are proximate to each other and to a DRST polarizer 116. These three elements comprise the direction control polarizer 111. Although in FIG. 17 the two light directing materials are shown above the DRST polarizer 116, it shall be understood that the DRST polarizer 116 could also be placed between or below the light directing materials 112 and 182 without departing from the scope of the present invention. Two dimensional control is achieved by crossing the axes of orientation of the structured surfaces 112 and 184. The axes may be oriented anywhere between 60–120 degrees, 80–100 degrees, 85–95 degrees or at about 90 degrees depending upon the particular display application and associated polarization requirements.

In operation, using the light directing materials described above with respect to FIGS. 10 and 11, first light directing material 182 results in a viewing zone of approximately 70 degrees in the Y, Z plane and 110 degrees in the X, Z plane. The light exiting the first light directing material 182 then becomes the source for the second light directing material 113, whose structured surface 112 has a different axes of orientation than does the structured surface 184 of light directing material 182. If the axes of the two light directing materials 113 and 184 are oriented at 90 degrees, for example, light directing material 113 operates on the light within the 110 degree angle of the X, Z plane and compresses the viewing angle in the X, Z plane to a narrower field of something less than 70 degrees, thereby further increasing brightness.

Figure 18:
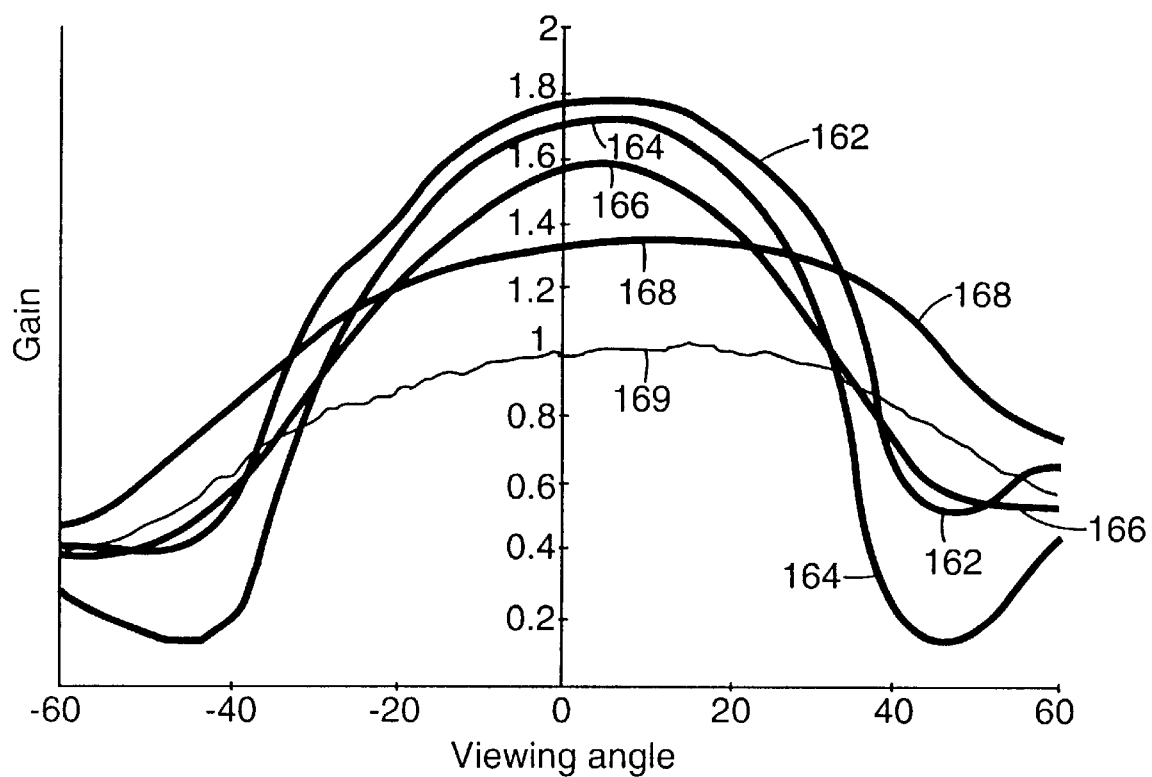
FIG. 18 shows a graph of test results comparing the gain achieved in the display configurations shown in FIGS. 11–14.

FIG. 18 shows test results of the relative screen brightness of a standard LCD panel illuminated by a standard optical cavity for various combinations of DRST polarizer and light directing material. The screen brightness at various viewing angles, taken in a plane perpendicular to the stretched direction of the DRST polarizer, was measured relative to screen brightness at zero degrees (normal) viewing angle with no DRST polarizer or light directing material being present in the system. Curve 169 in FIG. 18 is the relative brightness at various viewing angles, measured relative to a viewing angle of zero degrees, of the standard display and optical cavity used in the tests without any optical body, such as a DRST polarizer, or any light directing optically structured layer being present. Curve 168 is the relative brightness for the display shown schematically in FIG. 14, wherein only DRST polarizer 116, acting as a reflective polarizer, is present between optical cavity 140 and liquid crystal display module 142. Curve 166 is the relative brightness for the display shown in FIG. 15, wherein a light directing material is laminated to the DRST polarizer of the present invention. Curve 164 is the relative brightness for an arrangement wherein the DRST polarizer and the light directing material are present in the display, but wherein the light from the optical cavity passes through the DRST before passing through the light directing material. Curve 162 is the relative brightness for the display shown in FIG. 16, wherein DRST polarizer 116 and the light directing material 113 are present in the display, and wherein the light from optical cavity 140 passes through DRST polarizer 116 before passing through the light directing material 113. It will be noted that the addition of the light directing material, whether it be attached to the DRST polarizer without a gap as in curve 166, or present but separated from the optical body by a gap, as in curves 164 and 162, has the effect of brightening the screen at lower viewing angles and dimming it at larger viewing angles. This may be desirable, depending upon the range of viewing angles contemplated in the intended use. The presence of the DRST polarizer by itself, with no light directing material present, provides, on the other hand, a more widely distributed increase in brightness, with less brightness at lower viewing angles but greater brightness at larger viewing angles.

Over-all screen brightness will also depend on the type of optical cavity used, for example, whether an electroluminescent backlight or a standard backlight is used. The reflectance and losses of each type of optical cavity effects the overall brightness increase that can be achieved. In general, the gain of the display system is dependent on the efficiency of both the DRST polarizer and the optical cavity. Performance is maximized with a highly reflective optical cavity consistent with the requirement of alteration of the polarization and direction of light, and a very low loss DRST polarizer.

When separate direction control films are coupled to the DRST polarizer, they may be either optically coupled or they may be adjacent sheets that are not optically coupled. A unitary, optically coupled structure of the DRST polarizer and light directing material may be formed by various known techniques of attaching two films, such as by heat lamination or adhering the films with an indexing matching adhesive. Alternately, a unitary structure of the DRST polarizer and light directing material may be formed by embossing the light directing structure directly on the surface of the DRST polarizer, such as embossing structure on the skin layer, if present, or the light directing structure may be cast and cured directly on the surface of the reflective polarizer wherein the reflective polarizer acts as the substrate in a process such as is described in U.S. Pat. No. 5,175,030. Various combinations of direction control films or embossed or cast structured surfaces are contemplated. For example, the direction control film that is laminated or otherwise adhered to the DRST polarizer surface, or the directly structured light controlling surface of the DRST polarizer, may be a two-dimensional structure, or it may be a linearly structured surface with a separately linearly structured direction control film that is crossed at some angle, preferably 90 degrees, to the linearly structured surface of the DRST polarizer or combined DRST polarizer/linearly structured film surface. Furthermore, a linearly structured surface may be laminated, embossed, or cast and cured on one surface of the DRST polarizer, and another linearly structured surface may be laminated, embossed, or cast and cured at some crossed angle, preferably 90 degrees, on the opposite surface of the DRST polarizer. Whether present as separate films or a unitary structure, the linearly structured light control surfaces may be at any angle to each other, and at any angle to the polarizing direction of the DRST polarizer. Similarly, when used in a display, the combination of DRST polarizer and light controlling structure(s) may be at any angle to the display polarizer, so that the first light controlling structure, DRST polarizer, optional second light controlling structure, and display polarizer may be at any angle or combination of angles with respect to each other. In the displays shown and described above, the direction control polarizer could be laminated or otherwise similarly adhered to or attached to the optical cavity and/or to the rear of the display module. Laminating the direction control polarizer to the optical cavity or the display module eliminates the air gap between them and thus reduces surface reflections which would otherwise occur at the air/reflective polarizer boundary. These reflection reduce the total transmission of the desired polarization. By attaching the reflective polarizer to the optical cavity or the display module, the surface reflections are reduced and total transmission of the desired polarization is increased. If the reflective polarizer is not so attached to the optical cavity or the display module, use of an antireflective (AR) coating may be desirable.

In the case shown in FIG. 16, it may not possible to laminate the reflective polarizer to the structured side of the structured surface material. In this case, it may be desirable to use an AR coated reflective polarizer to reduce surface reflections at the air/reflective polarizer interface.

Overview of Examples

The following Examples illustrate the production of various optical materials in accordance with the present invention, as well as the spectral properties of these materials. Unless otherwise indicated, percent composition refers to percent composition by weight. The polyethylene naphthalate resin used was produced for these samples using ethylene glycol and dimethyl-2,6-naphthalenedicarboxylate, available from Amoco Corp., Chicago, Ill. These reagents were polymerized to various intrinsic viscosities (IV) using conventional polyester resin polymerization techniques. Syndiotactic polystyrene (sPS) may be produced in accordance with the method disclosed in U.S. Pat. No. 4,680,353 (Ishihara et al). The examples includes various polymer pairs, various fractions of continuous and disperse phases and other additives or process changes as discussed below.

Stretching or orienting of the samples was provided using either conventional orientation equipment used for making polyester film or a laboratory batch orienter. The laboratory batch orienter used was designed to use a small piece of cast material (7.5 cm by 7.5 cm) cut from the extruded cast web and held by a square array of 24 grippers (6 on each side). The orientation temperature of the sample was controlled a hot air blower and the film sample was oriented through a mechanical system that increased the distance between the grippers in one or both directions at a controlled rate. Samples stretched in both directions could be oriented sequentially or simultaneously. For samples that were oriented in the constrained mode (C), all grippers hold the web and the grippers move only in one dimension. Whereas, in the unconstrained mode (U), the grippers that hold the film at a fixed dimension perpendicular to the direction of stretch are not engaged and the film is allowed to relax or neckdown in that dimension.

Polarized diffuse transmission and reflection were measured using a Perkin Elmer Lambda 19 ultraviolet/visible/near infrared spectrophotometer equipped with a Perkin Elmer Labsphere S900-1000 150 millimeter integrating sphere accessory and a Glan-Thompson cube polarizer. Parallel and crossed transmission and reflection values were measured with the e-vector of the polarized light parallel or perpendicular, respectively, to the stretch direction of the film. All scans were continuous and were conducted with a scan rate of 480 nanometers per minute and a slit width of 2 nanometers. Reflection was performed in the "V-reflection" mode. Transmission and reflectance values are averages of all wavelengths from 400 to 700 nanometers.

Transmission electron micrographs were taken of finished film, cross-sectioned in a plan perpendicular to the machine direction to determine the nature of the dispersed phase. The outer layers of three-layer constructions were removed from oriented film, leaving only the blend layer for embedding. Samples were embedded in 3M Scotchcast™ 5 Electrical Resin which was cured at room temperature. The embedded samples were microtomed using a diamond knife, on a Reichert Ultracut™ S microtome at room temperature, into thin sections of approximately 90 nm thickness, using a cutting rate of 0.2 millimeters per second. The thin sections were floated onto distilled, deionized water and collected for transmission electron microscopic evaluation on a 200 mesh copper grid reinforced with a carbon/formvor substrate. Photomicrographs were taken using a JEOL 200CX Transmission Electron Microscope.

Scanning electron microscopic evaluations were performed on cast webs prior to film orientation to determine the nature of the disperse phase. Pieces of web were fractured to expose a plane perpendicular to the machine direction while immersed in liquid nitrogen. Samples were then trimmed and mounted on aluminum stubs prior to sputter coating with gold palladium. Photomicrographs were taken using a Hitachi S530 Scanning Electron Microscope.

EXAMPLE 1

In Example 1, an optical film was made in accordance with the invention by extruding a blend of 75% polyethylene naphthalate (PEN) as the continuous or major phase and 25% of polymethylmethacrylate (PMMA) as the disperse or minor phase into a cast film or sheet about 380 microns thick using conventional extrusion and casting techniques. The PEN had an intrinsic viscosity (IV) of 0.52 (measured in 60% phenol, 40% dichlorobenzene). The PMMA was obtained from ICI Americas, Inc., Wilmington, Del., under the product designation CP82. The extruder used was a 3.15 cm (1.24") Brabender with a 1 tube 60 μm Tegra filter. The die was a 30.4 cm (12") EDI Ultraflex™ 40.

About 24 hours after the film was extruded, the cast film was oriented in the width or transverse direction (TD) on a polyester film tentering device. The stretching was accomplished at about 9.1 meters per minute (30 ft/min) with an output width of about 140 cm (55 inches) and a stretching temperature of about 160° C. (320° F.). The total reflectivity of the stretched sample was measured with an integrating sphere attachment on a Lambda 19 spectrophotometer with the sample beam polarized with a Glan-Thompson cube polarizer. The sample had a 75% parallel reflectivity (i.e., reflectivity was measured with the stretch direction of the film parallel to the e-vector of the polarized light), and 52% crossed reflectivity (i.e., reflectivity was measured with the e-vector of the polarized light perpendicular to the stretch direction).

EXAMPLE 2

In Example 2, an optical film was made and evaluated in a manner similar to Example 1 except using a blend of 75% PEN, 25% syndiotactic polystyrene (sPS), 0.2% of a polystyrene glycidyl methacrylate compatibilizer, and 0.25% each of Irganox™ 1010 and Ultranox™ 626. The synthesis of polystyrene glycidyl methacrylate is described in Polymer Processes, "Chemical Technology of Plastics, Resins, Rubbers, Adhesives and Fibers", Vol. 10, Chap. 3, pp. 69–109 (1956)(Ed. by Calvin E. Schildknecht).

The PEN had an intrinsic viscosity of 0.52 measured in 60% phenol, 40% dichlorobenzene. The sPS was obtained from Dow Chemical Co. and had a weight average molecular weight of about 200,000, designated subsequently as sPS-200-0. The parallel reflectivity on the stretched film sample was determined to be 73.3%, and the crossed reflectivity was determined to be 35%.

EXAMPLE 3

In Example 3, an optical film was made and evaluated in a manner similar to Example 2 except the compatibilizer level was raised to 0.6%. The resulting parallel reflectivity was determined to be 81% and the crossed reflectivity was determined to be 35.6%.

EXAMPLE 4

In Example 4, an three layer optical film was made in accordance with the present invention utilizing conventional three layer coextrusion techniques. The film had a core layer and a skin layer on each side of the core layer. The core layer consisted of a blend of 75% PEN and 25% sPS 200-4 (the designation sPS-200-4 refers to a copolymer of syndiotactic-polystyrene containing 4 mole % of paramethyl styrene), and each skin layer consisted of 100% PEN having an intrinsic viscosity of 0.56 measured in 60% phenol, 40% dichlorobenzene.

The resulting three-layer cast film had a core layer thickness of about 415 microns, and each skin layer was about 110 microns thick for a total thickness of about 635 microns. A laboratory batch stretcher was used to stretch the resulting three-layer cast film about 6 to 1 in the machine direction (MD) at a temperature of about 129° C. Because the edges of the film sample parallel to the stretch direction were not gripped by the lab stretcher, the sample was unconstrained in the transverse direction (TD) and the sample necked-down in the TD about 50% as a result of the stretch procedure.

Optical performance was evaluated in a manner similar to Example 1. The parallel reflectivity was determined to be 80.1%, and the crossed reflectivity was determined to be 15%. These results demonstrate that the film performs as a low absorbing, energy conserving system.

EXAMPLES 5–29

In Examples 5–29, a series of optical films were produced and evaluated in a manner similar to Example 4, except the sPS fraction in the core layer and the IV of the PEN resin used were varied as shown in Table 1. The IV of the PEN resin in the core layer and that in the skin layers was the same for a given sample. The total thickness of the cast sheet was about 625 microns with about two-thirds of this total in the core layer and the balance in the skin layers which were approximately equal in thickness. Various blends of PEN and sPS in the core layer were produced, as indicated in Table 1. The films were stretched to a stretch ratio of about 6:1 in either the machine direction (MD) or in the transverse direction (TD) at various temperatures as indicated in Table 1. Some of the samples were constrained (C) in the direction perpendicular to the stretch direction to prevent the sample from necking down during stretching. The samples labeled "U" in Table 1 were unconstrained and permitted to neckdown in the unconstrained dimension. Certain optical properties of the stretched samples, including percent transmission, reflection, and absorption, were measured along axes both parallel and crossed or perpendicular to the direction of stretch. The results are summarized in TABLE 1.

Heat setting, as indicated for Examples 24–27, was accomplished by manually constraining the two edges of the stretched sample which were perpendicular to the direction of stretch by clamping to an appropriately sized rigid frame and placing the clamped sample in an oven at the indicated temperature for 1 minute. The two sides of the sample parallel to the direction of stretch were unconstrained (U) or not clamped and allowed to neckdown. The heatsetting of Example 29 was similar except all four of the edges of the stretched sample were constrained (C) or clamped. Example 28 was not heat set.

TABLE 1

| Example Number | Stretch Temp. (° C.) | Stretch Direction (MD/TD) | Stretch Constrained (C/U) | PEN IV | Fraction (sPS) | Heat Set Temp. | (Constrained Heat Set | Trans. (Perp.) | Trans. (Para.) | Reflec. (Perp.) | Reflec. (Para.) |
|---|---|---|---|---|---|---|---|---|---|---|---|
| 5 | 135 | TD | C | 0.53 | 0.25 | | | 76.2 | 20.4 | 22.6 | 75.3 |
| 6 | 135 | TD | C | 0.47 | 0.75 | | | 80.2 | 58.4 | 19.4 | 40 |
| 7 | 142 | TD | C | 0.53 | 0.25 | | | 74.2 | 21.8 | 25.3 | 77.3 |
| 8 | 142 | TD | C | 0.47 | 0.75 | | | 76.0 | 41.0 | 23.8 | 55.6 |
| 9 | 129 | TD | C | 0.53 | 0.25 | | | 71.2 | 21.2 | 26.5 | 76.2 |
| 10 | 129 | TD | C | 0.47 | 0.75 | | | 76.8 | 48.9 | 22.4 | 49.6 |
| 11 | 129 | MD | U | 0.53 | 0.25 | | | 81.5 | 27.6 | 17.2 | 67 |
| 12 | 129 | TD | U | 0.53 | 0.25 | | | 66.8 | 22.1 | 25 | 71.9 |
| 13 | 129 | MD | U | 0.47 | 0.25 | | | 79.5 | 20.3 | 19.3 | 73.7 |
| 14 | 129 | TD | U | 0.47 | 0.25 | | | 66.3 | 26.2 | 32.5 | 69.4 |
| 15 | 129 | TD | U | 0.47 | 0.5 | | | 73.0 | 26.2 | 24.7 | 68.7 |
| 16 | 129 | MD | U | 0.47 | 0.5 | | | 75.4 | 20.6 | 23.2 | 76.1 |
| 17 | 129 | MD | U | 0.47 | 0.1 | | | 82.1 | 27.3 | 16.9 | 67 |
| 18 | 129 | MD | U | 0.56 | 0.25 | | | 80.1 | 15.0 | 18 | 80.3 |
| 19 | 129 | TD | U | 0.56 | 0.25 | | | 70.2 | 21.6 | 25.2 | 70.7 |
| 20 | 129 | MD | C | 0.47 | 0.25 | | | 75.8 | 28.7 | 23.4 | 70.1 |
| 21 | 129 | MD | C | 0.47 | 0.5 | | | 79.8 | 27.8 | 19.7 | 70.8 |
| 22 | 135 | MD | C | 0.47 | 0.1 | | | 80.5 | 36.7 | 19.2 | 62.6 |
| 23 | 135 | MD | C | 0.53 | 0.25 | | | 77.2 | 21.1 | 21.8 | 76.6 |
| 24 | 129 | MD | U | 0.56 | 0.25 | 150 | U | 83.7 | 17.3 | 17.3 | 74 |
| 25 | 129 | MD | U | 0.56 | 0.25 | 220 | U | 82.1 | 16 | 18 | 75.8 |
| 26 | 129 | MD | U | 0.56 | 0.25 | 135 | U | 84.7 | 17 | 18 | 75.3 |
| 27 | 129 | MD | U | 0.56 | 0.25 | 165 | U | 83 | 16 | 16.5 | 76.3 |
| 28 | 129 | MD | U | 0.56 | 0.25 | CNTRL | | 83.7 | 17 | 17.5 | 76 |
| 29 | 129 | MD | U | 0.56 | 0.25 | 230 | C | | | | |
| 29 | 129 | MD | U | 0.56 | 0.25 | 230 | C | | | | |

All of the above samples were observed to contain varying shapes of the disperse phase depending on the location of the disperse phase within the body of the film sample. The disperse phase inclusions located nearer the surfaces of the samples were observed to be of an elongated shape rather than more nearly spherical. The inclusions which are more nearly centered between the surfaces of the samples may be more nearly spherical. This is true even for the samples with the skin layers, but the magnitude of the effect is reduced with the skin layers. The addition of the skin layers improves the processing of the films by reducing the tendency for splitting during the stretching operation.

Without wishing to be bound by theory, the elongation of the inclusions (disperse phase) in the core layer of the cast film is thought to be the result of shear on the blend as it is transported through the die. This elongation feature may be altered by varying physical dimensions of the die, extrusion temperatures, flow rate of the extrudate, as well as chemical aspects of the continuous and disperse phase materials which would alter their relative melt viscosities. Certain applications or uses may benefit from providing some elongation to the disperse phase during extrusion. For those applications which are subsequently stretched in the machine direction, starting with a disperse phase elongated during extrusion may allow a higher aspect ratio to be reached in the resulting disperse phase.

Another notable feature is the fact that a noticeable improvement in performance is observed when the same sample is stretched unconstrained. Thus, in Example 9, the % transmission was 79.5% and 20.3% in the parallel and perpendicular directions, respectively. By contrast, the transmission in Example 16 was only 75.8% and 28.7% in the parallel and perpendicular directions, respectively. There is a thickness increase relative to constrained stretching when samples are stretched unconstrained, but since both transmission and extinction improve, the index match is probably being improved.

An alternative way to provide refractive index control is to modify the chemistry of the materials. For example, a copolymer of 30 wt % of interpolymerized units derived from terephthalic acid and 70 wt % of units derived from 2,6-naphthalic acid has a refractive index 0.02 units lower than a 100% PEN polymer. Other monomers or ratios may have slightly different results. This type of change may be used to more closely match the refractive indices in one axis while only causing a slight reduction in the axis which desires a large difference. In other words, the benefits attained by more closely matching the index values in one axis more than compensate for the reduction in an orthogonal axis in which a large difference is desired. Secondly, a chemical change may be desirable to alter the temperature range in which stretching occurs. A copolymer of sPS and varying ratios of para methyl styrene monomer will alter the optimum stretch-temperature range. A combination of these techniques may be necessary to most effectively optimize the total system for processing and resulting refractive index matches and differences. Thus, an improved control of the final performance may be attained by optimizing the process and chemistry in terms of stretching conditions and further adjusting the chemistry of the materials to maximize the difference in refractive index in at least one axis and minimizing the difference at least one orthogonal axis.

These samples displayed better optical performance if oriented in the MD rather than TD direction (compare Examples 14–15). Without wishing to be bound by theory, it is believed that different geometry inclusions are developed with an MD orientation than with a TD orientation and that these inclusions have higher aspect ratios, making non-ideal end effects less important. The non-ideal end effects refers to the complex geometry/index of refraction relationship at the tip of each end of the elongated particles. The interior or non-end of the particles are thought to have a uniform geometry and refractive index which is thought to be desirable. Thus, the higher the percentage of the elongated particle that is uniform, the better the optical performance.

The extinction ratio of these materials is the ratio of the transmission for polarizations perpendicular to the stretch direction to that parallel to the stretch direction. For the examples cited in Table 1, the extinction ratio ranges between about 2 and about 5, although extinction ratios up to 7 have been observed in optical bodies made in accordance with the present invention without any attempt to optimize the extinction ratio. It is expected that even higher extinction ratios (e.g., greater than 100) can be achieved by adjusting film thickness, inclusion volume fraction, particle size, and the degree of index match and mismatch, or through the use of iodine or other dyes.

EXAMPLES 30–100

In Examples 30–100, samples of the invention were made using various materials as listed in Table 2. PEN 42, PEN 47, PEN 53, PEN 56, and PEN 60 refer to polyethylene naphthalate having an intrinsic viscosity (IV) of 0.42, 0.47, 0.53, 0.56, and 0.60, respectively, measured in 60% phenol, 40% dichlorobenzene. The particular sPS-200-4 used was obtained from Dow Chemical Co. Ecdel™ 9967 and Eastar™ are copolyesters which are available commercially from Eastman Chemical Co., Rochester, N.Y. Surlyn™ 1706 is an ionomer resin available from E.I. du Pont de Nemours & Co., Wilmington, Del. The materials listed as Additive 1 or 2 include polystyrene glycidyl methacrylate. The designations GMAPS2, GMAPS5, and GMAPS8 refer to glycidyl methacrylate having 2, 5, and 8% by weight, respectively, of glycidyl methacrylate in the total copolymer. ETPB refers to the crosslinking agent ethyltriphenylphosphonium bromide. PMMA VO44 refers to a polymethylmethacrylate available commercially from Atohaas North America, Inc.

The optical film samples were produced in a manner similar to Example 4 except for the differences noted in Table 2 and discussed below. The continuous phase and its ratio of the total is reported as major phase. The disperse phase and its ratio of the total is reported as minor phase. The value reported for blend thickness represents the approximate thickness of the core layer in microns. The thickness of the skin layers varied when the core layer thickness varied, but was kept to a constant ratio, i.e., the skin layers were approximately equal and the total of the two skin layers was about one-third of the total thickness. The size of the disperse phase was determined for some samples by either scanning electron microscope (SEM) or transmission electron microscope (TEM). Those examples which were subsequently stretched using the laboratory batch orienter are shown by an "X" in the column labeled Batch Stretched.

TABLE 2

| Example Number | Major Phase | Major Phase (%) | Minor Phase | Minor Phase (%) | Core Layer (microns) | Additive 1 | Additive 2 | SEMs | TEM (microns) | Batch Stretched |
|---|---|---|---|---|---|---|---|---|---|---|
| 30 | PEN.42 | 75 | sPS-200-4 | 25 | 9.8 | — | — | — | — | — |
| 31 | PEN.42 | 75 | sPS-200-4 | 25 | 16.3 | — | — | 10 | — | — |
| 32 | PEN.47 | 75 | sPS-200-4 | 25 | 9.8 | — | — | — | — | x |
| 33 | PEN.47 | 75 | sPS-200-4 | 25 | 16.3 | — | — | 8 | — | x |
| 34 | PEN.47 | 50 | sPS-200-4 | 50 | 9.8 | — | — | — | — | — |
| 35 | PEN.47 | 50 | sPS-200-4 | 50 | 16.3 | — | — | 5 | — | x |
| 36 | PEN.47 | 90 | sPS-200-4 | 10 | 9.8 | — | — | — | — | — |
| 37 | PEN.47 | 90 | sPS-200-4 | 10 | 16.3 | — | — | 3 | — | x |
| 38 | PEN.53 | 75 | sPS-200-4 | 25 | 9.8 | — | — | — | — | — |
| 39 | PEN.53 | 75 | sPS-200-4 | 25 | 16.3 | — | — | 7 | — | x |
| 40 | PEN.56 | 75 | sPS-200-4 | 25 | 9.8 | — | — | — | — | — |
| 41 | PEN.56 | 75 | sPS-200-4 | 25 | 16.3 | — | — | 6 | — | x |
| 42 | sPS-200-4 | 75 | PEN.42 | 25 | 9.8 | — | — | — | — | — |
| 43 | sPS-200-4 | 75 | PEN.42 | 25 | 16.3 | — | — | — | — | — |
| 44 | sPS-200-4 | 75 | PEN.47 | 25 | 9.8 | — | — | — | — | — |
| 45 | sPS-200-4 | 75 | PEN.47 | 25 | 16.3 | — | — | — | — | x |
| 46 | sPS-200-4 | 75 | PEN.53 | 25 | 16.3 | — | — | — | — | — |
| 47 | sPS-200-4 | 75 | PEN.53 | 25 | 9.8 | — | — | — | — | — |
| 48 | sPS-200-4 | 75 | PEN.56 | 25 | 9.8 | — | — | — | — | — |
| 49 | sPS-200-4 | 75 | PEN.56 | 25 | 16.3 | — | — | — | — | — |
| 50 | PET.60 | 75 | Ecdel ™ 9967 | 25 | 16.3 | — | — | — | — | — |
| 51 | PET.60 | 75 | Surlyn ™ 1706 | 25 | 16.3 | — | — | 2 | — | — |
| 52 | PEN.47 | 75 | Ecdel ™ 9967 | 25 | 16.3 | — | — | 2 | — | x |
| 53 | PEN.47 | 100 | — | — | 16.3 | — | — | — | — | — |
| 54 | PBN.47 | 75 | sPS-200 | 25 | 16.3 | — | — | — | — | — |
| 55 | PEN.47 | 75 | sPS-200 | 25 | 9.8 | — | — | 10 | — | — |
| 56 | PEN.47 | 75 | sPS-320 | 25 | 9.8 | — | — | 12 | — | — |
| 57 | PEN.47 | 75 | sPS-320 | 25 | 16.3 | — | — | — | — | — |
| 58 | PEN.47 | 95 | sPS-320 | 5 | 9.8 | — | — | — | — | — |
| 59 | PEN.47 | 95 | sPS-320 | 5 | 16.3 | — | — | — | — | — |
| 60 | PEN.56 | 100 | — | — | 16.3, 9.8 | — | — | — | — | x |

TABLE 2-continued

| Example Number | Major Phase | Major Phase (%) | Minor Phase | Minor Phase (%) | Core Layer (microns) | Additive 1 | Additive 2 | SEMs | TEM (microns) | Batch Stretched |
|---|---|---|---|---|---|---|---|---|---|---|
| 61 | PEN.56 | 75 | sPS-200 | 25 | 9.8 | — | — | 10 | — | — |
| 62 | PBN.56 | 75 | sPS-200 | 25 | 16.3 | — | — | — | — | x |
| 63 | PEN.56 | 95 | sPS-200 | 5 | 9.8 | — | — | — | — | — |
| 64 | PEN.56 | 95 | sPS-200 | 5 | 16.3 | — | — | — | — | x |
| 65 | PEN.56 | 75 | sPS-320 | 25 | 9.8 | — | — | 10 | — | — |
| 66 | PEN.56 | 75 | sPS-320 | 25 | 16.3 | — | — | — | — | — |
| 67 | PEN.47 | 95 | sPS-200 | 5 | 16.3 | 2% GMAPS2 | 0.25% ETPB | 1 | 0.3 | x |
| 68 | PEN.47 | 95 | sPS-200 | 5 | 9.8 | 2% GMAPS2 | 0.25% ETPB | — | — | — |
| 69 | PEN.56 | 75 | sPS-200 | 25 | 9.8 | 6% GMAPS2 | 0.25% ETPB | — | — | — |
| 70 | PEN.56 | 75 | sPS-200 | 25 | 16.3 | 6% GMAPS2 | 0.25% ETPB | 0.5 | 2.5 | x |
| 71 | PEN.56 | 75 | sPS-200 | 25 | 9.8 | 2% GMAPS2 | 0.25% ETPB | — | 0.8 | — |
| 72 | PEN.56 | 75 | sPS-200 | 25 | 16.3 | 2% GMAPS2 | 0.25% ETPB | 1 | — | — |
| 73 | PEN.56 | 95 | sPS-200 | 5 | 9.8 | 2% GMAPS2 | 0.25% ETPB | — | — | — |
| 74 | PEN.56 | 95 | sPS-200 | 5 | 16.3 | 2% GMAPS2 | 0.25% ETPB | — | — | — |
| 75 | PEN.56 | 75 | sPS-200 | 25 | 9.8 | 6% GMAPS2 | 0.25% ETPB | — | — | — |
| 76 | PEN.56 | 75 | sPS-200 | 25 | 16.3 | 6% GMAPS2 | 0.25% ETPB | 0.8 | 1 | x |
| 77 | PEN.56 | 75 | sPS-200 | 25 | 9.8 | 2% GMAPS2 | 0.25% ETPB | — | — | — |
| 78 | PEN.56 | 75 | sPS-200 | 25 | 16.3 | 2% GMAPS2 | 0.25% ETPB | — | — | — |
| 79 | PEN.56 | 75 | sPS-200 | 25 | 9.8 | 6% GMAPS2 | 0.25% ETPB | — | — | — |
| 80 | PEN.56 | 75 | sPS-200 | 25 | 16.3 | 6% GMAPS2 | 0.25% ETPB | — | — | x |
| 81 | PEN.56 | 75 | sPS-200 | 25 | 9.8 | 6% GMAPS2 | 0.25% ETPB | — | — | — |
| 82 | PEN.56 | 75 | sPS-200 | 25 | 16.3 | 6% GMAPS2 | 0.25% ETPB | 0.5 | — | — |
| 83 | PEN.56 | 95 | sPS-200 | 5 | 9.8 | 2% GMAPS2 | 0.25% ETPB | — | — | — |
| 84 | PEN.56 | 95 | sPS-200 | 5 | 16.3 | 2% GMAPS2 | 0.25% ETPB | — | — | — |
| 85 | PEN.56 | 75 | sPS-200 | 25 | 9.8 | 0.5% GMAPS2 | 0.25% ETPB | — | — | — |
| 86 | PEN.56 | 75 | sPS-200 | 25 | 9.8 | 0.5% GMAPS2 | 0.25% ETPB | — | — | — |
| 87 | PEN.47 | 75 | Eastar | 25 | 16.3 | — | — | — | — | x |
| 88 | PEN.47 | 75 | Eastar | 25 | 9.8 | — | — | — | — | — |
| 89 | PEN.47 | 75 | Eastar | 25 | 16.3 | — | — | — | — | — |
| 90 | PEN.47 | 75 | Eastar | 25 | 9.8 | — | — | — | — | — |
| 91 | PEN.47 | 75 | PMMA VO44 | 25 | 9.8 | — | — | — | — | — |
| 92 | PEN.47 | 75 | PMMA VO44 | 25 | 16.3 | — | — | 10 | — | — |
| 93 | PEN.47 | 75 | PMMA VO44 | 25 | 16.3 | 6% MMA/GMA | — | — | 0.7 | — |
| 94 | PEN.47 | 75 | PMMA VO44 | 25 | 9.8 | 6% MMA/GMA | — | — | — | — |
| 95 | PEN.47 | 75 | PMMA VO44 | 25 | 9.8 | 2% MMA/GMA | — | — | 1.2 | — |
| 96 | PEN.47 | 75 | PMMA | 25 | 16.3 | 2% MMA/GMA | — | — | — | x |
| 97 | PEN.47 | 75 | sPS-200-4 VO44 | 25 | 916.3 Red | 0.5% Congo | — | — | — | x |
| 98 | PEN.47 | 75 | sPS-200-4 | 25 | 16.3 | 0.15% Congo Red | — | — | — | x |
| 99 | PEN.47 | 75 | sPS-200-4 | 25 | 9.8 | 0.25% Blue | — | — | — | — |
| 100 | PEN.47 | 75 | sPS-200-4 | 25 | 9.8 | 0–0.25% Methylene Blue | — | — | — | — |

The presence of the various compatibilizers was found to reduce the size of the included or disperse phase.

EXAMPLE 101

In Example 101, an optical film was made in a manner similar to Example 4 except the resulting core thickness was about 420 microns thick, and each skin layer was about 105 microns thick. The PEN had a 0.56 IV. The cast film was oriented as in Example 1, except the temperature of stretch was 165° C. and there was a 15 day delay between casting and stretching. The transmission was 87.1% and 39.7% for parallel and perpendicularly polarized light, respectively.

EXAMPLES 102–121

In Examples 102–121, optical films were made as in Example 101, except that orientation conditions were varied and/or the sPS-200-0 was replaced with either copolymers of sPS containing either 4 or 8 mole % of para-methyl styrene or with an atactic-form of styrene, Styron 663 (available from Dow Chemical Company, Midland, Mich.) as listed in Table 3. Evaluations of transmission properties are also reported. Transmission values are averaged over all wavelengths between 450–700 nm.

TABLE 3

| Ex. | % sPS | PS | PEN IV | Temperature of Draw (° C.) | Rail Setting (cm) | Perpendicular Transmission (%) | Parallel Transmission (%) |
|---|---|---|---|---|---|---|---|
| 101 | 25 | 200-0 | 0.56 | 165 | 152 | 87.1 | 39.7 |
| 102 | 35 | 200-0 | 0.56 | 165 | 152 | 87.8 | 44.4 |
| 103 | 15 | 200-4 | 0.56 | 165 | 152 | 86.1 | 43.5 |
| 104 | 25 | 200-4 | 0.56 | 165 | 152 | 86.5 | 43.6 |
| 105 | 35 | 200-4 | 0.56 | 165 | 152 | 88.2 | 50.7 |
| 106 | 15 | 200-8 | 0.56 | 165 | 152 | 89.3 | 40.7 |
| 107 | 25 | 200-8 | 0.56 | 165 | 152 | 88.5 | 42.8 |
| 108 | 35 | 200-8 | 0.56 | 165 | 152 | 88.6 | 43.3 |
| 109 | 15 | Styron 663 | 0.56 | 165 | 152 | 89.3 | 45.7 |
| 110 | 25 | Styron 663 | 0.56 | 165 | 152 | 87.8 | 41.6 |
| 111 | 35 | Styron 663 | 0.56 | 165 | 152 | 88.8 | 48.2 |
| 112 | 15 | Styron 663 | 0.48 | 165 | 152 | 88.5 | 62.8 |
| 113 | 25 | Styron 663 | 0.48 | 165 | 152 | 87.1 | 59.6 |
| 114 | 35 | Styron 663 | 0.48 | 165 | 152 | 86.8 | 59.6 |
| 115 | 15 | 200-0 | 0.48 | 165 | 152 | 88.0 | 58.3 |
| 116 | 25 | 200-0 | 0.48 | 165 | 152 | 88.0 | 58.7 |
| 117 | 35 | 200-0 | 0.48 | 165 | 152 | 88.5 | 60.6 |
| 118 | 15 | 200-4 | 0.48 | 165 | 152 | 89.0 | 57.4 |
| 119 | 35 | 200-4 | 0.48 | 165 | 152 | 87.3 | 64.0 |
| 120 | 35 | 200-0 | 0.56 | 171 | 127 | 86.5 | 65.1 |
| 121 | 35 | 200-0 | 0.56 | 171 | 152 | 88.1 | 61.5 |

These examples indicate that the particles of the included phase are elongated more in the machine direction in high IV PEN than in low IV PEN. This is consistent with the observation that, in low IV PEN, stretching occurs to a greater extent near the surface of the film than at points interior to the film, with the result that fibrillar structures are formed near the surface and spherical structures are formed towards the center.

Some of these Examples suggest that the orientation temperatures and degree of orientation are important variables in achieving the desired effect. Examples 109 to 114 suggest that quiescent crystallization need not be the only reason for the lack of transmission of a preferred polarization of light.

EXAMPLES 122–124

In Example 122, a multilayer optical film was made in accordance with the invention by means of a 209 layer feedblock. The feedblock was fed with two materials: (1) PEN at 38.6 kg per hour (intrinsic viscosity of 0.48); and (2) a blend of 95% coPEN and 5% by weight of sPS homopolymer (200,000 molecular weight). The coPEN was a copolymer based on 70 mole % naphthalene dicarboxylate and 30 mole % dimethyl isophthalate polymerized with ethylene glycol to an intrinsic viscosity of 0.59. The coPEN/sPS blend was fed into the feedblock at a rate of 34.1 kg per hour.

The coPEN blend material was on the outside of the extrudate, and the layer composition of the resulting stack of layers alternated between the two materials. The thicknesses of the layers was designed to result in a one-quarter wavelength stack with a linear gradient of thicknesses, and having a 1.3 ratio from the thinnest to the thickest layer. Then, a thicker skin layer of coPEN (made in accordance with the method described above to make the coPEN/sPS blend, except the molar ratios were 70/15/15 naphthalene dicarboxylate/dimethyl terephthalate/dimethyl isophthalate) devoid of sPS was added to each side of the 209 layer composite. The total skin layer was added at a rate of 29.5 kg per hour, with about one-half of this quantity on each side or surface of the stack.

The resulting skin layer clad multilayer composite was extruded through a multiplier to achieve a multilayer composite of 421 layers. The resulting multilayer composite was then clad with another skin layer of the 70/15/15 coPEN on each surface at a total rate of 29.5 kg per hour with about one-half of this quantity on each side. Since this second skin layer may not be separately detectable from the existing skin layer (as the material is the same), for the purposes of this discussion, the resulting extra thick skin layer will be counted as only one layer.

The resulting 421 layer composite was again extruded through a 1.40 ratio asymmetric multiplier to achieve a 841 layer film which was then cast into a sheet by extruding through a die and quenching into a sheet about 30 mils thick. The resulting cast sheet was then oriented in the width direction using a conventional film making tentering device. The sheet was stretched at a temperature of about 300° F. (149° C.) to a stretch ratio of about 6:1 and at a stretch rate of about 20% per second. The resulting stretched film was about 5 mils thick.

In Example 123, a multilayer optical film was made as in Example 122, except that the amount of sPS in the coPEN/sPS blend was 20% instead of 5%.

In Example 124, a multilayer optical film was made as in Example 122, except that no sPS was added to the film.

The results reported in Table 4 include a measure of the optical gain of the film. The optical gain of a film is the ratio of light transmitted through an LCD panel from a backlight with the film inserted between the two to the light transmitted without the film in place. The significance of optical gain in the context of optical films is described in WO 95/17692 in relation to FIG. 2 of that reference. A higher gain value is generally desirable. The transmission values include values obtained when the light source was polarized parallel to the stretch direction ($T_\parallel$) and light polarized perpendicular to the stretch direction ($T_\perp$). Off-angle-color (OAC) was measured using an Oriel spectrophotometer as the root mean square deviation of p-polarized transmission at 50 degree incident light of wavelength between 400 and 700 nm.

TABLE 4

| Ex. | mole % sPS | Gain | $T_\perp$ (%) | $T_\parallel$ (%) | OAC (%) |
|---|---|---|---|---|---|
| 122 | 5 | 1.5 | 83 | 2 | 1.5 |
| 123 | 20 | 1.45 | 81 | 1.5 | 1.2 |
| 124 | 0 | 1.6 | 87 | 5 | 3.5 |

The value of off-angle-color (OAC) demonstrates the advantage of using a multilayer construction within the context of the present invention. In particular, such a construction can be used to substantially reduce OAC with only a modest reduction in gain. This tradeoff may have advantages in some applications. The values of $T_\parallel$ for the examples of the invention may be lower than expected because light scattered by the sPS dispersed phase may not be received by the detector.

EXAMPLE 125

A three layer film was made in accordance with Example 4. The core layer consisted of 70% coPEN whose intrinsic viscosity was 0.55 measured in 60% phenol, 40% dichlorobenzene, 70% sPS 200-7, plus an additional 2% Dylark 332-80 (available from NOVA Chemical). Each skin consisted of 100% coPET having an intrinsic viscosity of 0.65 measured in methylene chloride.

The coPEN was a copolymer based on 62 mole % naphthalene dicarboxylate and 38 mole % dimethyl terephthalate. The coPET was a copolymer based on 80 mole % dimethyl carboxylate and 20 mole % dimethyl isophthalate.

The cast film was oriented in a manner consistent with Example 1. The stretching was accomplished at 5.8 meters per minute (19 feet per minute) with an output width of 147 cm (58 inches). The stretch temperature was 124° C. The heat set temperature was 163° C. The perpendicular transmission was 85.3%, and the parallel transmission was 21.7%.

EXAMPLES 126–130

The following examples illustrate the production of a co-continuous morphology in an optical system of the present invention.

In Examples 126 through 130, a series of optical films were produced and evaluated in a manner similar to Example 125, except the sPS fraction in the core layer and the stretch temperature were varied as shown in Table 5.

TABLE 5

| Example Number | Fraction sPS | Dispersed or Co-continuous | Stretch Temperature (° C.) | Trans. (Perp.) | Trans. (Para.) |
|---|---|---|---|---|---|
| 125 | 0.30 | D | 124 | 85.3 | 21.7 |
| 126 | 0.35 | D | 135 | 86.3 | 21.1 |
| 127 | 0.40 | D | 129 | 86.4 | 21.9 |
| 128 | 0.44 | — | 124 | 85.8 | 25.9 |
| 129 | 0.53 | C | 129 | 86.6 | 33.6 |
| 130 | 0.81 | D | 135 | 88.1 | 69 |

The parallel and perpendicular transmission values for Examples 125 to 130 show good optical performance. The high value for perpendicular transmission for Example 130 transmission suggests an effective match in the refractive indices in both phases for polarized light aligned in the direction perpendicular to the stretch direction.

Figure 6A:
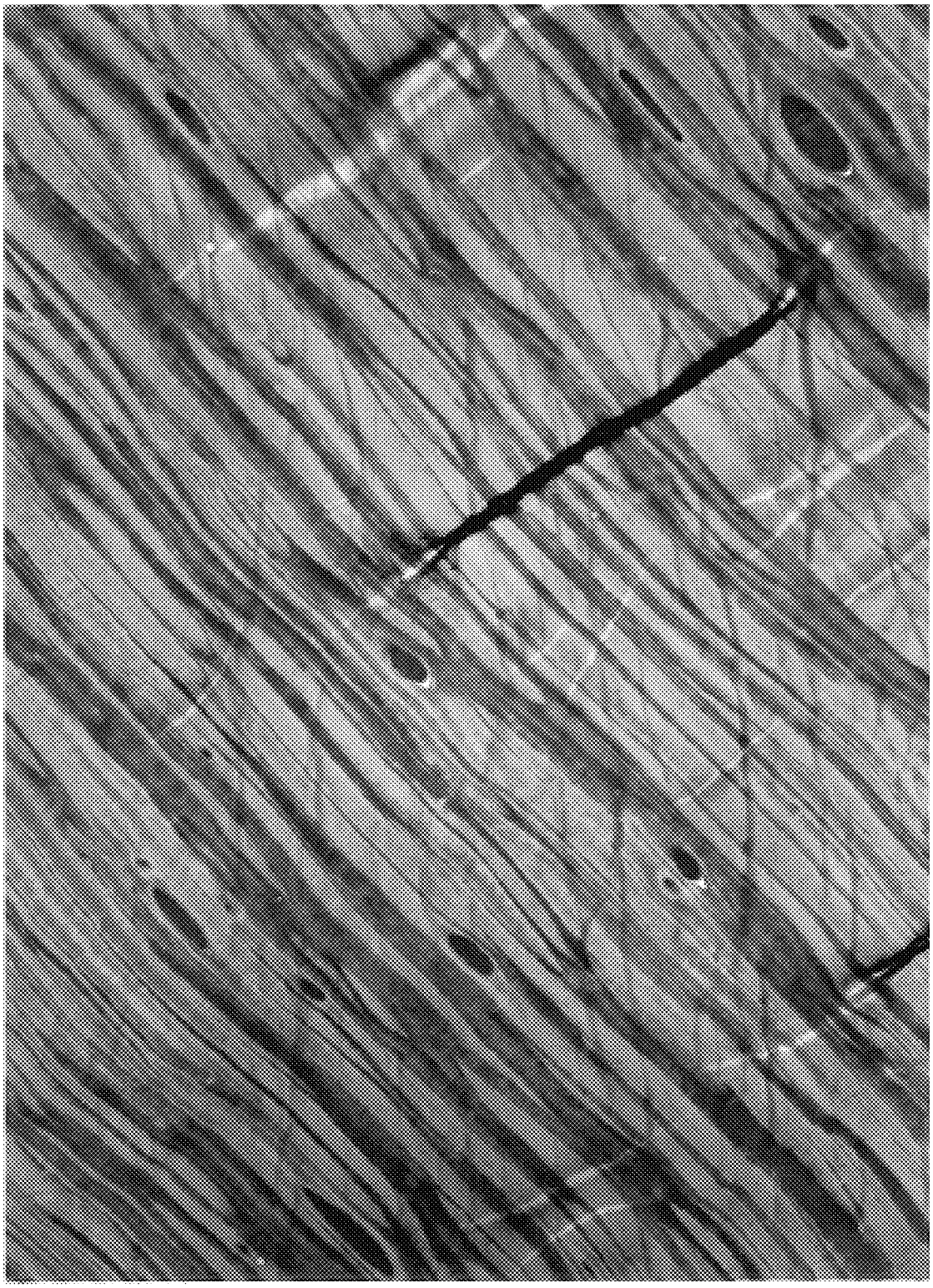
FIGS. 6a and 6b are electron micrographs of optical films made in accordance with the present invention.
Figure 6B:
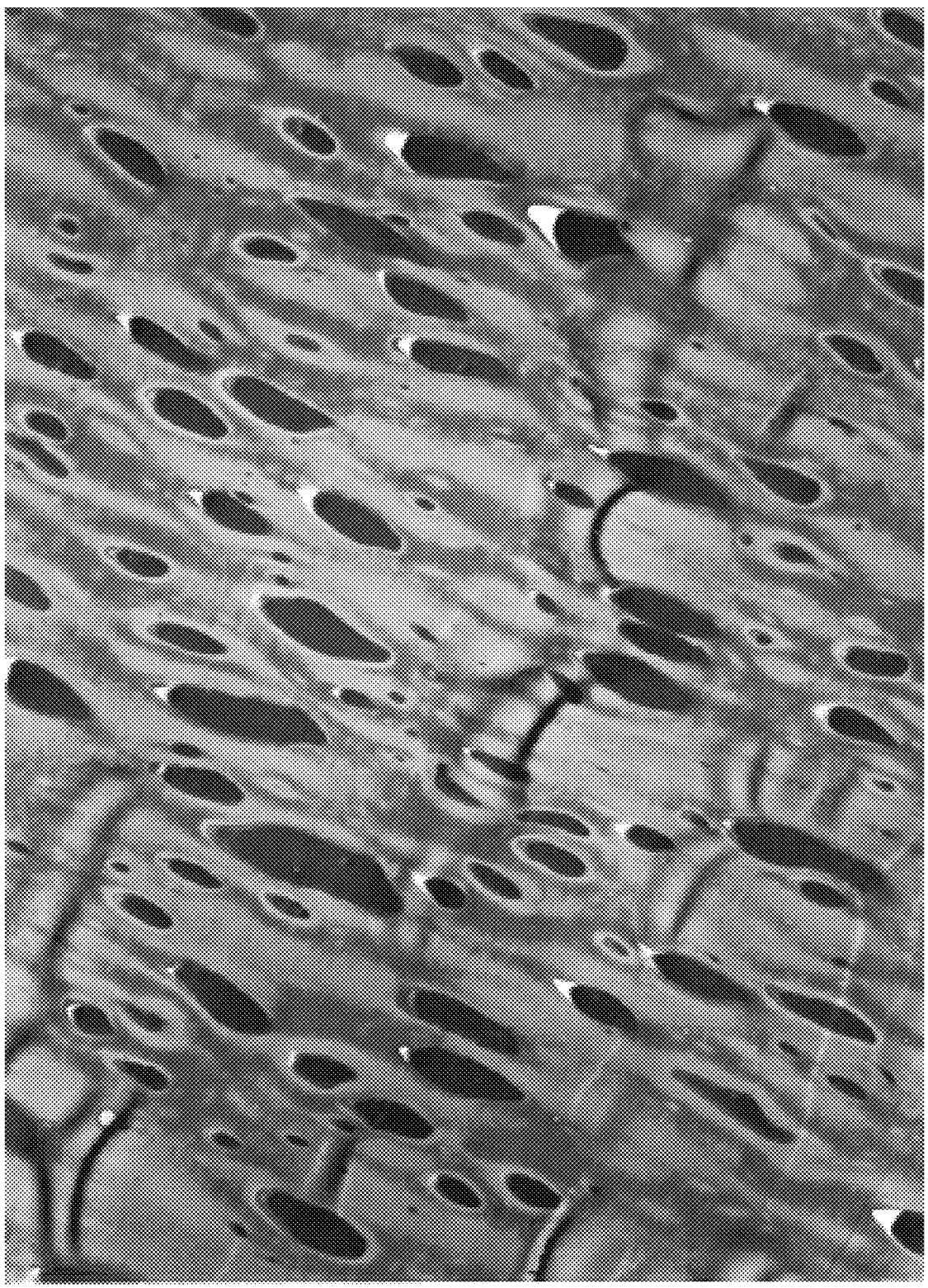

Scanning electron micrographs were taken of fracture surfaces of cast web for Examples 126 and 127. As in Example 125, there was clear evidence of spherical or elliptical particles dispersed in an otherwise continuous matrix. Transmission electron micrographs were taken for Examples 129 and 130; these are shown in FIGS. 6a and 6b, respectively. FIG. 6a illustrates the morphology of co-continuous phases. Inspection of the micrograph shows inclusions of both the coPEN and the sPS phases, as well as regions where each appears to be the continuous phase. By contrast, FIG. 6b shows coPEN dispersed into an sPS matrix.

EXAMPLE 131

A three layer film was made in accordance with Example 4. The core layer consisted of 85% coPEN whose instrinsic viscosity was 0.51 measured in a solution of 60% phenol and 40% dichlorobenzene, and 15% 250k-7, plus an additional 2% Dylark™ 332-80. Each skin consisted of 100% coPEN.

The coPEN used as part of the core was a copolymer based on 70 mole % naphthalene dicarboxylate and 30 mole % dimethyl terephthalate. The coPEN used in the skin layers was a copolymer based on 70 mole % naphthalene dicarboxylate and 30 mole % dimethyl isophthalate.

The cast film was oriented in a manner consistent with Example 1. The stretching was accomplished at 5.3 meters per minute (17.4 feet per minute) with an output width of 124.5 cm (49 inches). The stretch temperature was 118° C. The heat set temperature was 141° C. The perpendicular transmission was 81.9%, and the parallel transmission was 32.7%. The perpendicular transmission spectrum is presented in FIG. 7.

EXAMPLE 132

A film with an antireflection layer was prepared by first adding 10 grams of Remet™ SP-30 (Remet Coporation, Chadwicks, N.Y.) with 1 gram TritoX™ X-100 (Rohm and Haas, Philadelphia, Pa.) into 89 grams of deionized water. The solution was coated onto a piece of film from Example 131 utilizing a #3 wire wound rod to yield a dry coating thickness of approximately 200 nanometers. The perpendicular transmission was 83.8%, and the parallel transmission was 33.3%.

EXAMPLE 133

Example 131 was repeated, except that both sides of the film were coated with an antireflection layer. The perpendicular transmission was 86.2%, and the parallel transmission was 33.8%.

Figure 7:
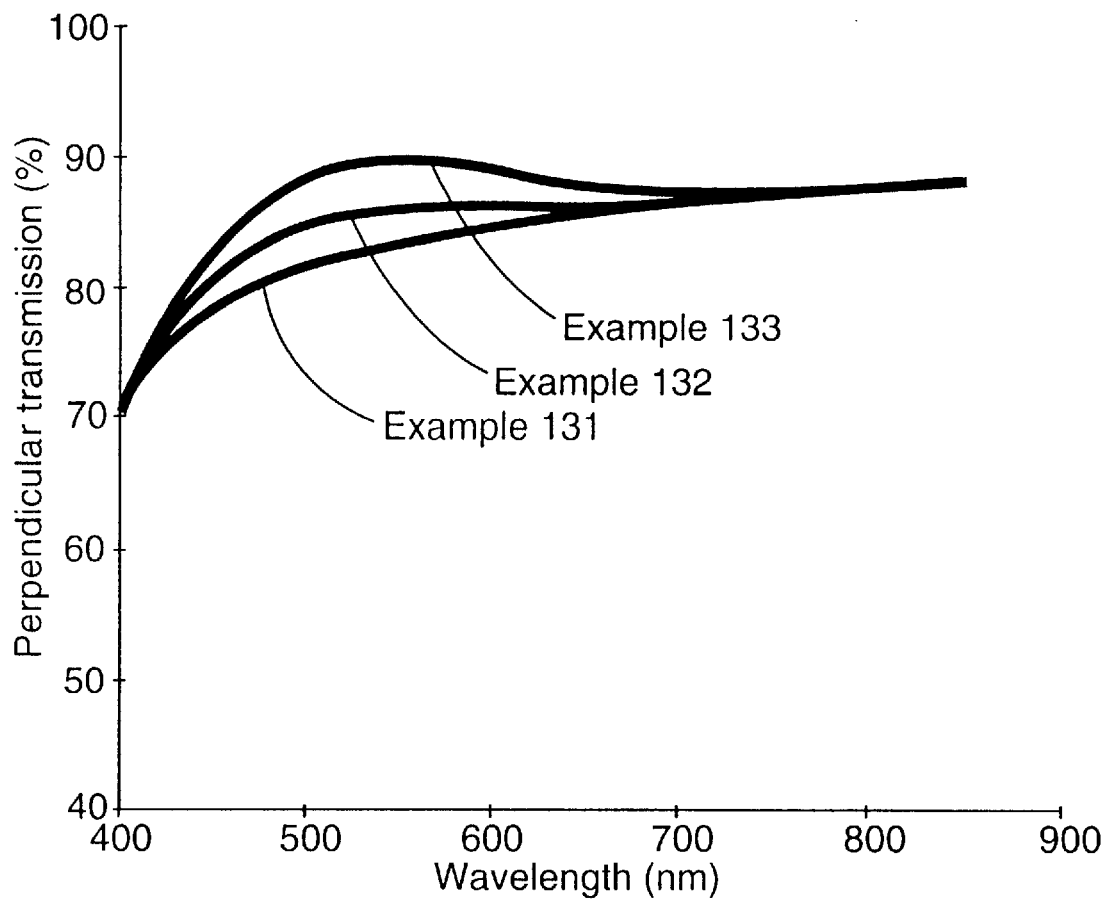
FIG. 7 is a perpendicular transmission spectrum for films made in accordance with the present invention.

The perpendicular transmission spectra for Examples 131–133 are presented in FIG. 7. One can see from FIG. 7 that the overall slope of the perpendicular transmission as a function of wavelength is lower for Examples 132–133 relative to Example 131, particularly for the range of wavelength from. One skilled in the art will appreciate that a film exhibiting a flat transmission curve as a function of the wavelength of light will minimize any changes in color to a resultant display device into which the reflective polarizer might be incorporated.

EXAMPLES 134–135

These examples illustrates the use of the films of the present invention as high efficiency light extractors for light guiding structures.

In Example 134, an optical film was made in accordance with the present invention by extruding a composition consisting of 30% sPS in a matrix of 70/30/0 coPEN. The extruded film was oriented in the machine direction to a stretch ratio of 2.5:1.

In Example 135, a second film was made from the same composition as Example 134 and using a similar procedure. However, instead of orienting the film in the machine direction, the film was oriented uniaxially in the direction transverse to the machine direction using a tenter stretch of 4.8:1.

The films of Examples 134 and 135 were mechanically fastened as cladding to separate optical fibers, using a silica grease to eliminate the fiber-air interface. The experimental set-up is depicted schematically in FIG. 8. The fibers were then connected to a 60 watt xenon metal halide short arc lamp obtained from General Electric Company, Danbury, Conn. The optical fibers had a thickness of 1.2 cm and consisted of a low Tg acrylic polymer.

When the lamp was turned on, the two samples became illuminated and produced diffusely scattered light. When the two film samples were viewed through a polarizing film at an orientation perpendicular to one plane of polarization, both samples appeared substantially darkened. However, when the polarizing film was rotated 90° in the same plane, both samples appeared diffusely bright, indicating that the transmission of light through the films was polarization specific.

The effect of capping the ends of the fibers was also investigated. When the ends were reflectively capped so that a portion of the light escaping from the ends of the fibers was reflected back into the fibers, the intensity of light produced by the films increased. This is consistent with the creation of a light cavity in which light of the non-extracted polarization undergoes further reflections within the optical fiber until it is converted, by degrees, into the extracted polarization. With the light within the fiber being unable to exit the fiber except through the extractor, the extraction efficiency increased. In addition, polarization conversion of the light interacting with the fiber/air interface caused a greater portion of light to be extracted from the fiber in the desired polarization.

EXAMPLE 136

The following example illustrates the increase in gain achievable at non-normal incident angles with the optical films of the present invention.

A three layer film was made in accordance with Example 4. The core layer consisted of 70% PEN whose instrinsic viscosity was 0.48 (measured in 60% phenol, 40% dichlorobenzene) and 30% sPS 200-8. Each skin consisted of 100% coPEN and comprised about 17% of the total thickness of the cast film.

The coPEN was a copolymer of 70 mole % naphthalene dicarboxylate and 30 mole % dimethyl isophthalate. The viscosity of the coPEN was not measured.

The cast film was oriented in a manner consistent with Example 1. The stretching was accomplished at 5.5 meters per minute (18 feet per minute) with an output width of 141 cm (55.5 inches). The stretch temperature was 154° C. The heat set temperature was 164° C. The resultant film was 128 micrometers thick.

A Sharp C12P backlight was placed against the one face of a standard dichroic polarizer. The intensity of the light radiating from the backlight/polarizer assembly was measured using a Photo research PR650 Spectra Colorimeter. The backlight/polarizer assembly is oriented relative to the detector of the PR650 prior to the start of the measurement such that the plane containing the arc swept by the detector arm also contains the axis of high transmission for the polarizer. The detector arm is swept plus and minus 60 degrees about a direction perpendicular to the backlight/polarizer assembly. A second intensity measurement was made with piece of film 23 cm square placed between the backlight and the polarizer such that the perpendicular transmission axis of the film was coincident with the high transmission direction of the polarizer. The ratio of the two intensities for each angular position with the optical film in place to that without is reported as the Relative Gain.

Figure 9A:
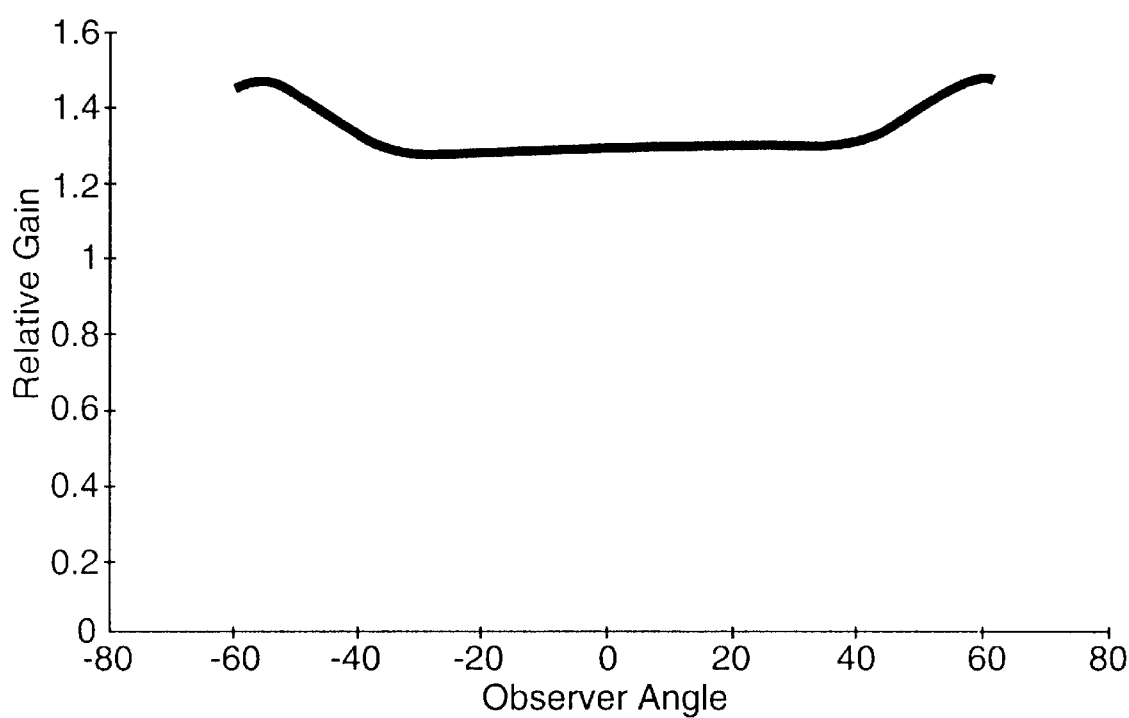
FIGS. 9A and 9B are graphs showing relative gain as a function of angle for the films of the present invention and for a commercially available optical film, respectively.

The data for Example 136 is shown in FIG. 9A. The average relative gain at the angles plus and minus 60 degrees from the normal was 1.45. This data demonstrates that the relative gain for the film of Example 136 increases at non-normal incident angles, particularly for angles from 30° to 60° away from normal incidence.

COMPARATIVE EXAMPLE 1

The following example illustrates the decrease in gain at non-normal incident angles for a typical commercially available optical film.

Figure 9B:
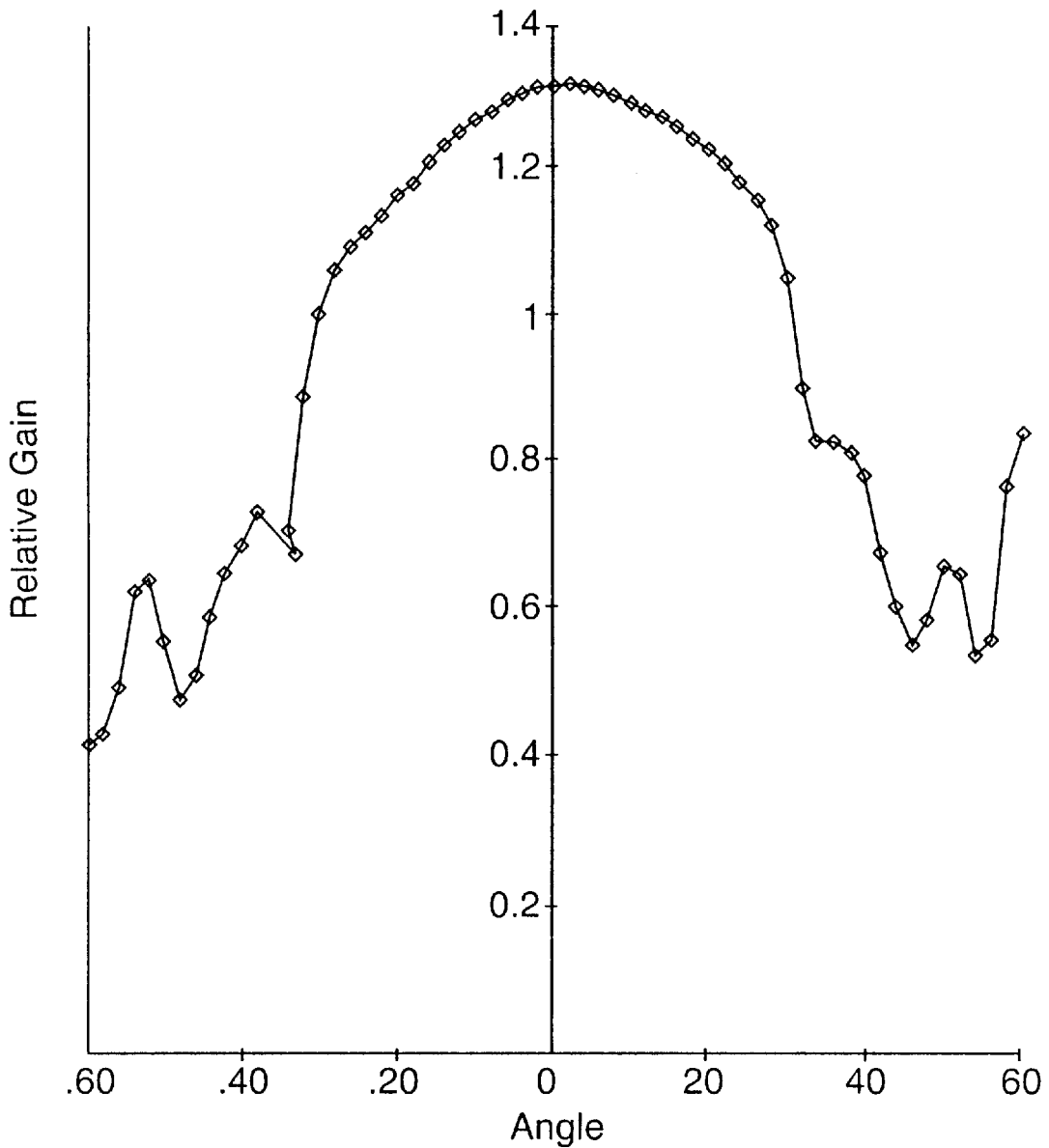

A piece of microreplicated brightness enhancement film from Sekisui W518 (Osaka, Japan) was measured using the Eldim 120D as described in Example 136. The ratio of the intensities for each angular position with the Sekisui W518 film in place to that without the Sekisui film is shown as FIG. 9B. The average relative gain at the angles plus and minus 60 degrees from the normal was 0.65, indicating that the gain for the film peaks at normal incidence and declines for all angles away from normal incidence.

As demonstrated by Example 136 and Comparative Example 1, films can be made in accordance with the present invention in which the relative gain increases at non-normal incident angles, particularly for angles from 30° to 60° away from normal incidence. By contrast, the relative gain for commercially available optical films typically peaks at normal incidence and declines for all angles away from normal incidence. This feature of the films of the present invention make them particularly advantageous for use in applications such as brightness enhancement films for large displays, where one will likely view the display across a wide range of angles.

EXAMPLES 137–150

The following examples further illustrate the increase in gain at non-normal angles of incidence achieved with the films of the present invention.

A series of examples were made in a manner similar to Example 136, except that material and process changes were made as indicated. In some of the examples, Irganox™ 1425 antioxidant (available from Ciba Geigy) and/or Dylark™ 332-80 (available from NOVA Chemicals) were added. The average relative gain for the angles plus and minus 60 degrees from the normal as well as the relative gain at normal incidence (0 degrees) are reported in Table 6.

TABLE 6

| Ex. | sPS | % Irganox 1425 | % Dylark | Stretch Temp. | Heat Set Temp. | Relative Gain (0°) | Relative Gain (+/− 60°) |
|---|---|---|---|---|---|---|---|
| 137 | 30%, 200-8 | 0 | 0 | 160 | 164 | 1.18 | 1.40 |

TABLE 6-continued

| Ex. | sPS | % Irganox 1425 | % Dylark | Stretch Temp. | Heat Set Temp. | Relative Gain (0°) | Relative Gain (+/− 60°) |
|---|---|---|---|---|---|---|---|
| 138 | 30%, 200-8 | 0 | 0 | 154 | 199 | 1.21 | 1.48 |
| 139 | 30%, 200-8 | 0.5 | 2 | 154 | 199 | 1.20 | 1.46 |
| 140 | 30%, 200-8 | 0 | 2 | 154 | 199 | 1.18 | 1.47 |
| 141 | 15%, 200-8 | 0.5 | 0 | 154 | 199 | 1.15 | 1.48 |
| 142 | 15%, 200-8 | 0.5 | 0 | 154 | 199 | 1.21 | 1.47 |
| 143 | 30%, 200-4 | 0 | 0 | 154 | 199 | 1.16 | 1.47 |
| 144 | 30%, 200-4 | 0.5 | 0 | 154 | 199 | 1.29 | 1.47 |
| 145 | 30%, 290-8 | 0.5 | 0 | 154 | 199 | 1.06 | 1.35 |
| 146 | 30%, 290-8 | 0.5 | 2 | 154 | 199 | 1.13 | 1.43 |
| 147 | 30%, 200-8 | 0.5 | 2 | 154 | 164 | 1.21 | 1.47 |
| 148 | 30%, 200-8 | 0 | 2 | 154 | 164 | 1.17 | 1.47 |
| 149 | 15%, 200-8 | 0.5 | 0 | 154 | 164 | 1.21 | 1.47 |
| 150 | 30%, 200-4 | 0 | 0 | 154 | 164 | 1.23 | 1.38 |

The preceding description of the present invention is merely illustrative, and is not intended to be limiting. Therefore, the scope of the present invention should be construed solely by reference to the appended claims.

What is claimed is:

1. A display, comprising:
   a light source;
   an LCD panel; and
   a polarizer, disposed between said light source and said LCD panel;
   wherein said polarizer comprises a polymeric continuous phase and a disperse phase, disposed within said continuous phase, and wherein said display exhibits a relative gain at 60° that is at least equal to the relative gain exhibited by said display at normal incidence.

2. The display of claim 1, wherein the difference between the relative gain exhibited by said display at 60° and the relative gain exhibited by said display at normal incidence is at least about 0.1.

3. The display of claim 1, wherein the difference between the relative gain exhibited by said display at 60° and the relative gain exhibited by said display at normal incidence is at least about 0.2.

4. The display of claim 1, wherein the difference between the relative gain exhibited by said display at 60° and the relative gain exhibited by said polarizer at normal incidence is at least about 0.3.

5. The display of claim 1, wherein said continuous and disperse phases comprise first and second diverse thermoplastic polymers, respectively.

6. The display of claim 5, wherein said first polymer is a polyester.

7. The display of claim 5, wherein said polarizer further comprises a compatibilizer.

8. The display of claim 1, wherein said disperse phase is randomly distributed throughout said continuous phase.

9. The display of claim 1, wherein said polarizer comprises a plurality of layers arranged in a repeating sequence of at least a first and second layer type, and wherein said first layer type comprises said continuous and disperse phases.

10. A display, comprising:
    a light source;
    an LCD panel; and
    a polarizer, disposed between said light source and said LCD panel;
    wherein said polarizer comprises a polymeric continuous phase and a disperse phase, disposed within said continuous phase, and wherein said display exhibits a relative gain as a function of angle within the range of 30° to 60°.

11. The display of claim 10, wherein said disperse phase is present in an amount of about 5% to about 50% by volume relative to said continuous phase.

12. The display of claim 10, wherein said disperse phase is present in an amount of about 15% to about 30% by volume relative to said continuous phase.

13. The display of claim 10, wherein said polarizer is a film, and wherein the index difference between said continuous and disperse phases is less than about 0.05 along an axis perpendicular to the surface of said film.

14. The display of claim 10, wherein said continuous phase has a larger birefringence than said disperse phase.

15. A display, comprising:
    a light source;
    an LCD panel; and
    a polarizer, disposed between said light source and said LCD panel;
    wherein said polarizer comprises a polymeric continuous phase and a disperse phase, disposed within said continuous phase, and wherein the average of the relative gain for said display taken over the range of 30° to 60° is greater than the relative gain of said display at normal incidence.

16. The display of claim 15, wherein said continuous and disperse phases comprise first and second diverse polymers, respectively.

17. The display of claim 16, wherein said polarizer further comprises a compatibilizer.

18. The display of claim 15, wherein said polarizer further comprises a dichroic dye.

19. The display of claim 15, wherein said polarizer comprises a plurality of layers arranged in a repeating sequence of at least a first and second layer type, and wherein said first layer type comprises said continuous and disperse phases.

20. The display of claim 15, wherein said polarizer is a film, and wherein the difference in indices of refraction between said continuous and disperse phases for visible light polarized along an axis perpendicular to the surface of said film is less than about 0.05.

21. The display of claim 20, wherein said polarizer has a total diffuse reflectivity of at least about 30%.

22. A display, comprising:
    an LCD panel; and
    a polarizer, disposed between said light source and said LCD panel;
    wherein said polarizer comprises a birefringent polymeric continuous phase and a disperse phase, disposed within said continuous phase, wherein said display exhibits a maximum relative gain as a function of angle within the range of 30° to 60°, and wherein said polarizer has a total diffuse reflectivity of at least about 30%.

23. A display, comprising:
    a display module;
    a light source adapted to illuminate the display module; and a polarizer, positioned between the display module and the light source, said polarizer being adapted to transmit toward the display module light from the light source which has a first polarization orientation, and being further adapted to reflect away from the display module light from the light source which has a second polarization orientation; wherein the polarizer comprises a polymeric continuous phase and a disperse phase, disposed within said continuous phase, and wherein said display exhibits a relative gain at 60° that is at least equal to the relative gain exhibited by said display at normal incidence.

24. The display of claim 23, wherein the display further comprises a first light directing element adapted to reflect light incident within a first input wedge and further adapted to redirect light incident within a second input wedge into an output wedge that is narrower than the second input wedge, and wherein the first input wedge is narrower than the second input wedge.

25. The display of claim 24, wherein at least some the reflected light having the second polarization orientation is converted to the first polarization orientation by the light source, and wherein at least some of the light converted to the first polarization orientation is transmitted by the polarizer toward the display module.

26. The display of claim 25, wherein the light source is further adapted to convert the direction of light incident upon a surface within the light source, wherein at least some of the reflected light within the first input wedge is converted to light of the second input wedge by the light source, and wherein at least some of the light converted to the second input wedge is directed by the first light directing element toward the display module.

27. The display of claim 24, therein the light directing element comprises a structured surface material.

28. The display of claim 27, wherein the first light directing element has a smooth side and a structured side.

29. The display of claim 28, wherein the structured side is toward the display module.

30. The display of claim 28, wherein the structured side comprises a plurality of triangular prisms.

31. The display of claim 28, wherein the plurality of triangular prisms define an axis of orientation.

32. The display of claim 31, wherein the axis of orientation of the first light directing element is aligned with the first in-plane direction of the polarizer.

33. The display of claim 30, wherein the triangular prisms are isosceles triangular prisms.

34. The display of claim 30, wherein the triangular prisms have included angles in the range of 70 degrees to 110 degrees.

35. The display of claim 34, wherein the triangular prisms have included angles in the range of 80 degrees to 100 degrees.

36. The display of claim 35, wherein the triangular prisms have included angles in the range of 85 degrees to 95 degrees.

37. The display of claim 36, wherein the triangular prisms have included angles of about 90 degrees.

38. The display of claim 24, wherein the light directing element is positioned between the polarizer and the display module.

39. The display of claim 24, wherein the first light directing element is positioned between the polarizer and the light source.

40. The display of claim 39, wherein the structured side of the first light directing element is disposed toward the display module.

41. The display of claim 24, further comprising a second light directing element adapted to reflect light incident within a third input wedge, and further adapted to redirect light incident within a fourth input wedge into a second output wedge that is narrower than the fourth input wedge, wherein the third input wedge is narrower than the fourth input wedge, and further wherein the third input wedge, fourth input wedge and second output wedge are defined relative to an axis perpendicular to the second light directing element.

42. The display of claim 41, wherein the second light directing element further includes a smooth side and a structured side, wherein the structured side of the second light directing element defines an associated axis of orientation.

43. The display of claim 42, wherein the axis of orientation of the first light directing element is positioned with respect to the axis of orientation of the second light directing element so as to provide two dimensional control of light transmitted by the first and second light directing elements.

44. The display of claim 43, wherein the axis of orientation of the first light directing element is at an angle greater than 0 degrees with respect to the axis of orientation of the second light directing element.

45. The display of claim 44, wherein the angle is between 70–110 degrees.

46. The display of claim 45, wherein the angle is between 85–95 degrees.

47. The display of claim 44, wherein the angle is about 90 degrees.

48. The display of claim 43, wherein the structured side of the first light directing element is positioned toward the smooth side of the second light directing element.

49. The display of claim 48, wherein the structured sides of both the first and second light directing elements are positioned toward the display module.

50. The display of claim 43, wherein the first and second light directing elements are positioned between the polarizer and the light source.

51. The display of claim 50, wherein the first and second light directing elements are positioned between the polarizer and the display module.

52. The display of claim 51, wherein the first light directing element is positioned between the polarizer and the light source, and wherein the second light directing element is positioned between the polarizer and the display module.

53. The display of claim 23, wherein said continuous and disperse phases have indices of refraction which differ along a first axis by more than about 0.05, and which differ along a second axis orthogonal to said first axis by less than about 0.05.

54. The display of claim 23, further comprising a polarization conversion element which converts at least a portion of the light of the second polarization orientation into light of the first polarization orientation.

55. The display of claim 54, wherein the polarization conversion element is a diffusely reflective surface.

56. The display element of claim 55, wherein the diffusely reflective surface is a component of the light source.

* * * * *

UNITED STATES PATENT AND TRADEMARK OFFICE
CERTIFICATE OF CORRECTION

PATENT NO. : 6,111,696
DATED : August 29, 2000
INVENTOR(S) : Allen et al.

It is certified that error appears in the above-identified patent and that said Letters Patent is hereby corrected as shown below:

Column 47, Table 2,
Example Number 54, "PBN.47" should read -- PEN.47 --

Column 49, Table 2,
Example Number 62, "PBN.56" should read -- PEN.56 --

Column 54,
Line 36, "TritoX™" should read -- Tritox™ --

Signed and Sealed this

Eighteenth Day of December, 2001

Attest:

JAMES E. ROGAN
Attesting Officer      Director of the United States Patent and Trademark Office